United States Patent [19]

Toma

[11] Patent Number: 4,706,212

[45] Date of Patent: Nov. 10, 1987

[54] METHOD USING A PROGRAMMED DIGITAL COMPUTER SYSTEM FOR TRANSLATION BETWEEN NATURAL LANGUAGES

[76] Inventor: Peter P. Toma, 5467 Bahia La., La Jolla, Calif. 92037

[21] Appl. No.: 176,672

[22] Filed: Mar. 31, 1971

[51] Int. Cl.[4] ............................................. G06T 15/38
[52] U.S. Cl. .................................. 364/900; 364/419; 434/157
[58] Field of Search .................... 444/1; 364/300, 200, 364/900, 419; 434/157, 167, 159; 400/109

[56] References Cited

PUBLICATIONS

Booth, *Machine Translation*, pp. 1–49, 51–76, 98–134, 138–168, 229–313, 429–448, 451–517, 1967.

1961 *Int. Conf. on Machine Trans. of Languages and Applied Lang. Analysis*, vol. 1, pp. 125–142, 281–310, 317–340, 343–362, 1962.

Proceedings of the Nat. Symposium on Machine Translation, Edmunson, editor, pp. 160–180, 254–279, 382–435, 436–479, 1961.

Oettinger, *Automatic Language Translation*, Harvard University Press, Cambridge, Mass., 1960, pp. 4, 6–13 and 127–302.

Garvin, P. L., "Machine Translation—Fact or Fancy?" *Datamation*, vol. 13, Issue 4, Apr. 1967, pp. 29–31, L71401078.

*Primary Examiner*—Eddie Chan
*Attorney, Agent, or Firm*—Christie, Parker & Hale

[57] ABSTRACT

A computerized translation method with universal application to all natural languages is provided. With this method, parameters are changed only when source or target languages are changed. The computerized method can be regarded as a self-contained system, having been developed to accept input tests in the source language, and look up individual (or sequences of) textwords in various dictionaries. On the basis of the dictionary information, sequences of operations are carried out which gradually generate the multiplicity of computer codes needed to express all the syntactic and semantic functions of the words in the sentence. On the basis of all the codes and target meanings in the dictionary, plus synthesis codes of such meanings, translation is carried out automatically. Procedures which generate and easily update main dictionaries, idiom dictionaries, high frequency dictionaries and compound dictionaries are integral parts of the system.

24 Claims, 37 Drawing Figures

Microfiche Appendix Included
(21 Microfiche, 1235 Pages)

SYSTRAN Translation System

Fig 1-A
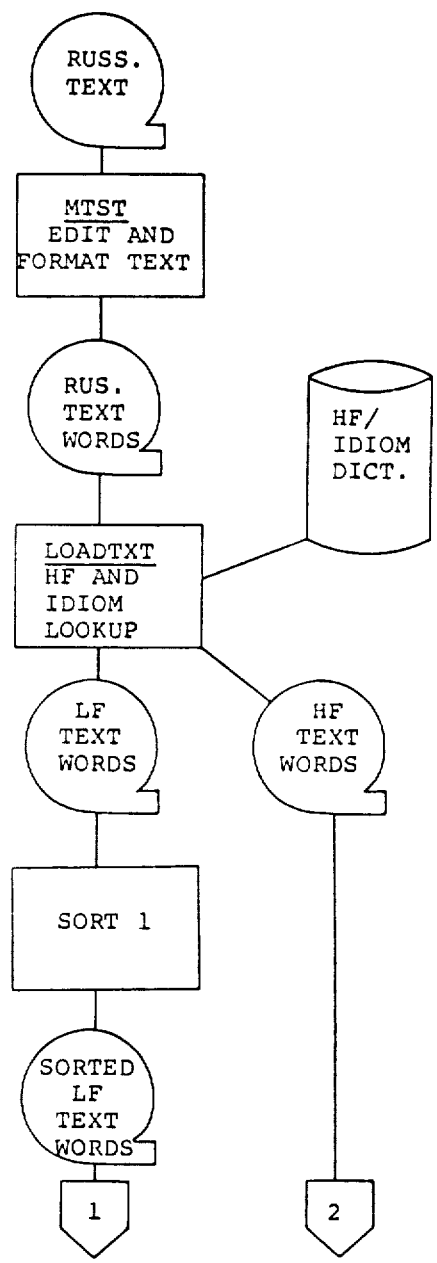
SYSTRAN 360/65 Operation
FLOW DIAGRAM

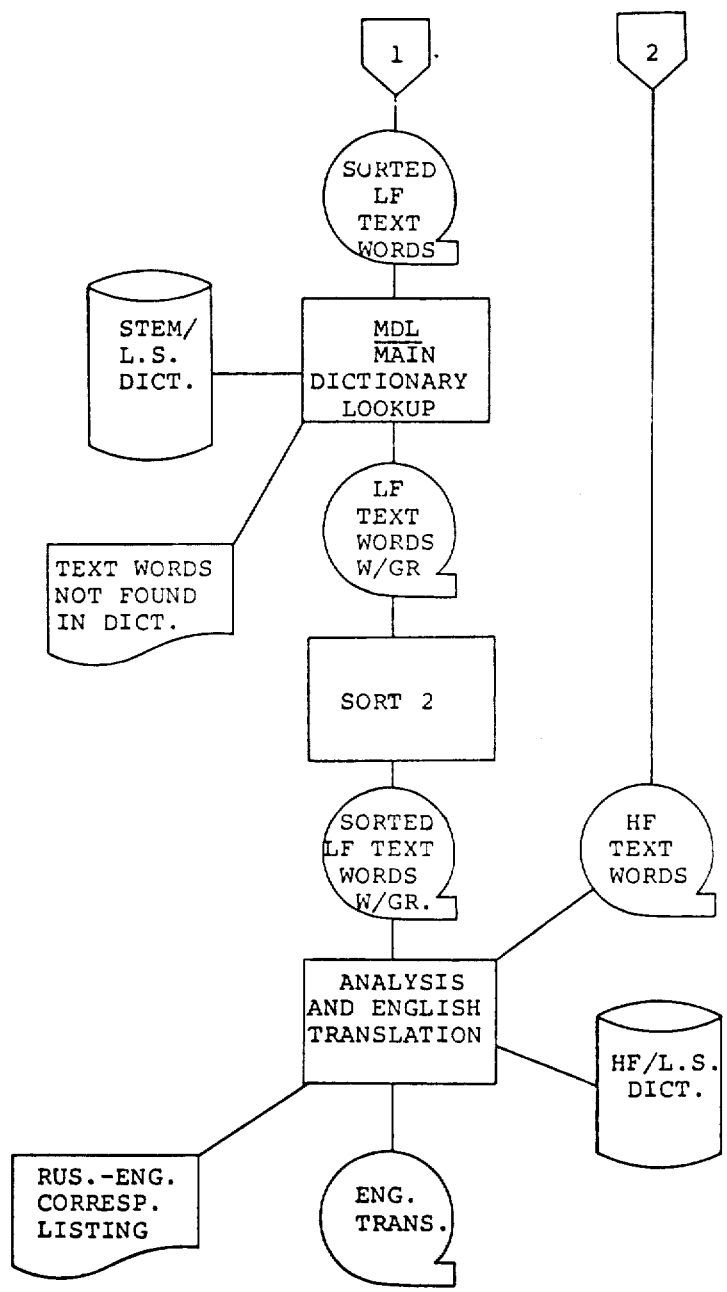
FIG 1-A CON'T

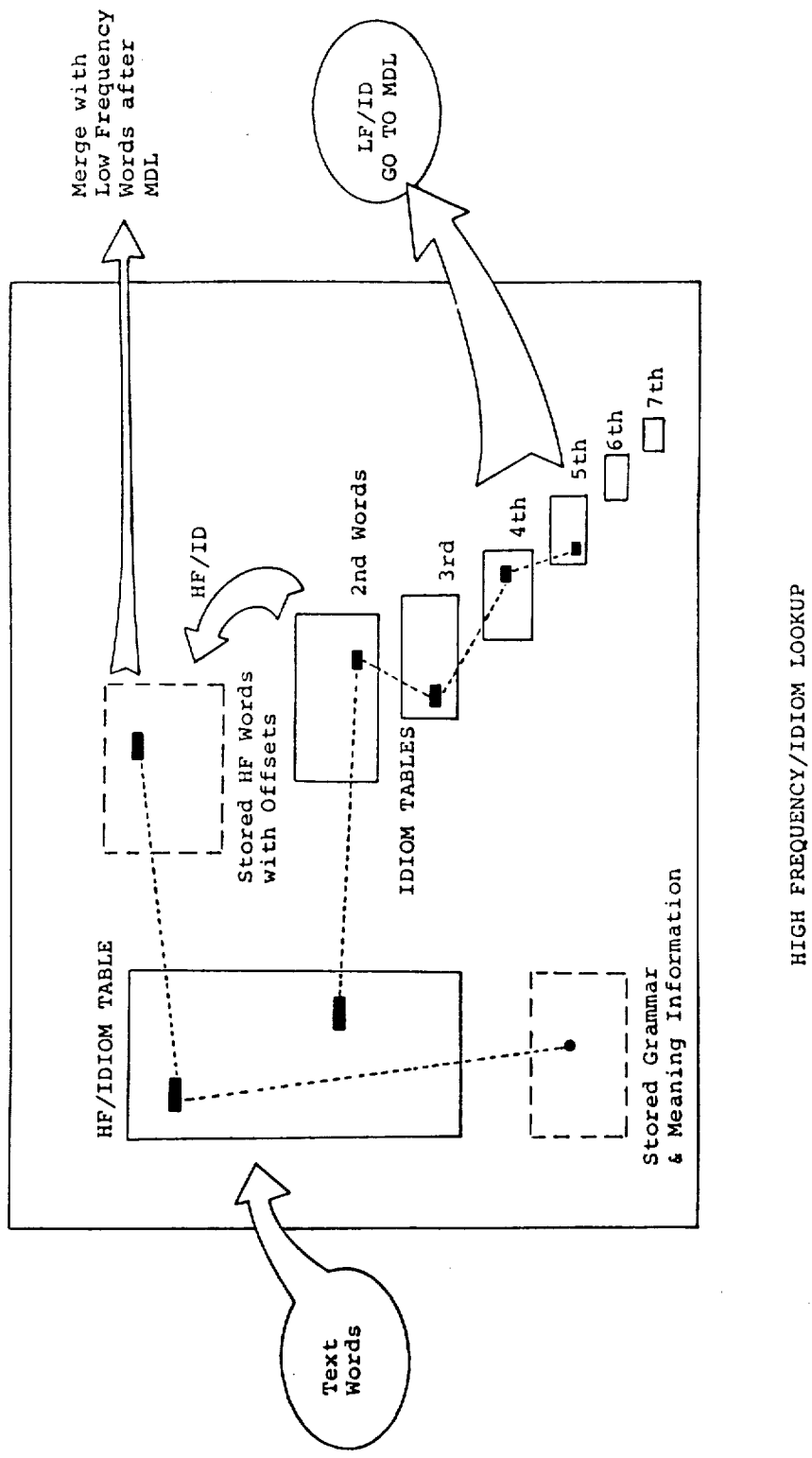
FIG_2

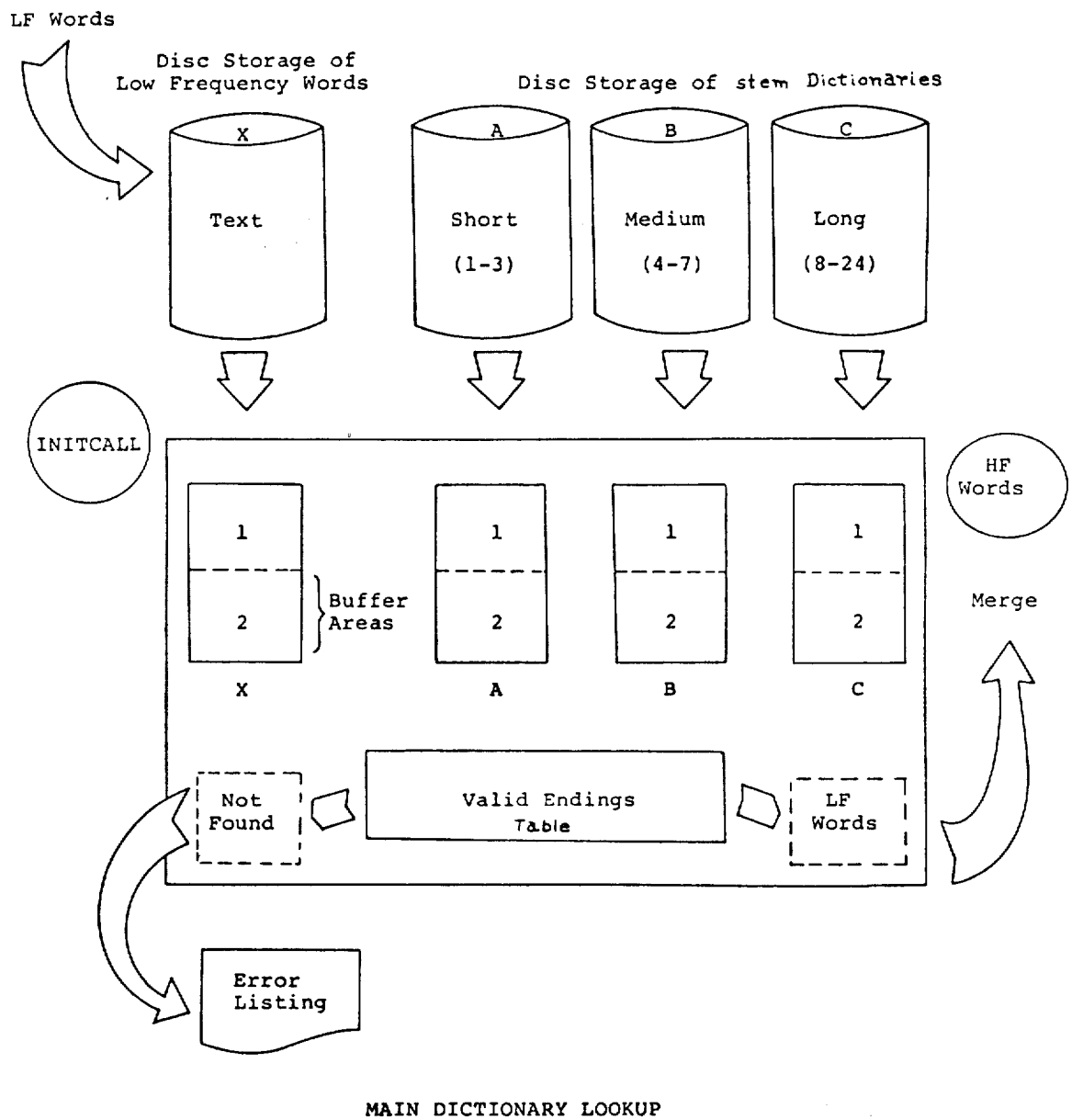
Fig_3
MAIN DICTIONARY LOOKUP

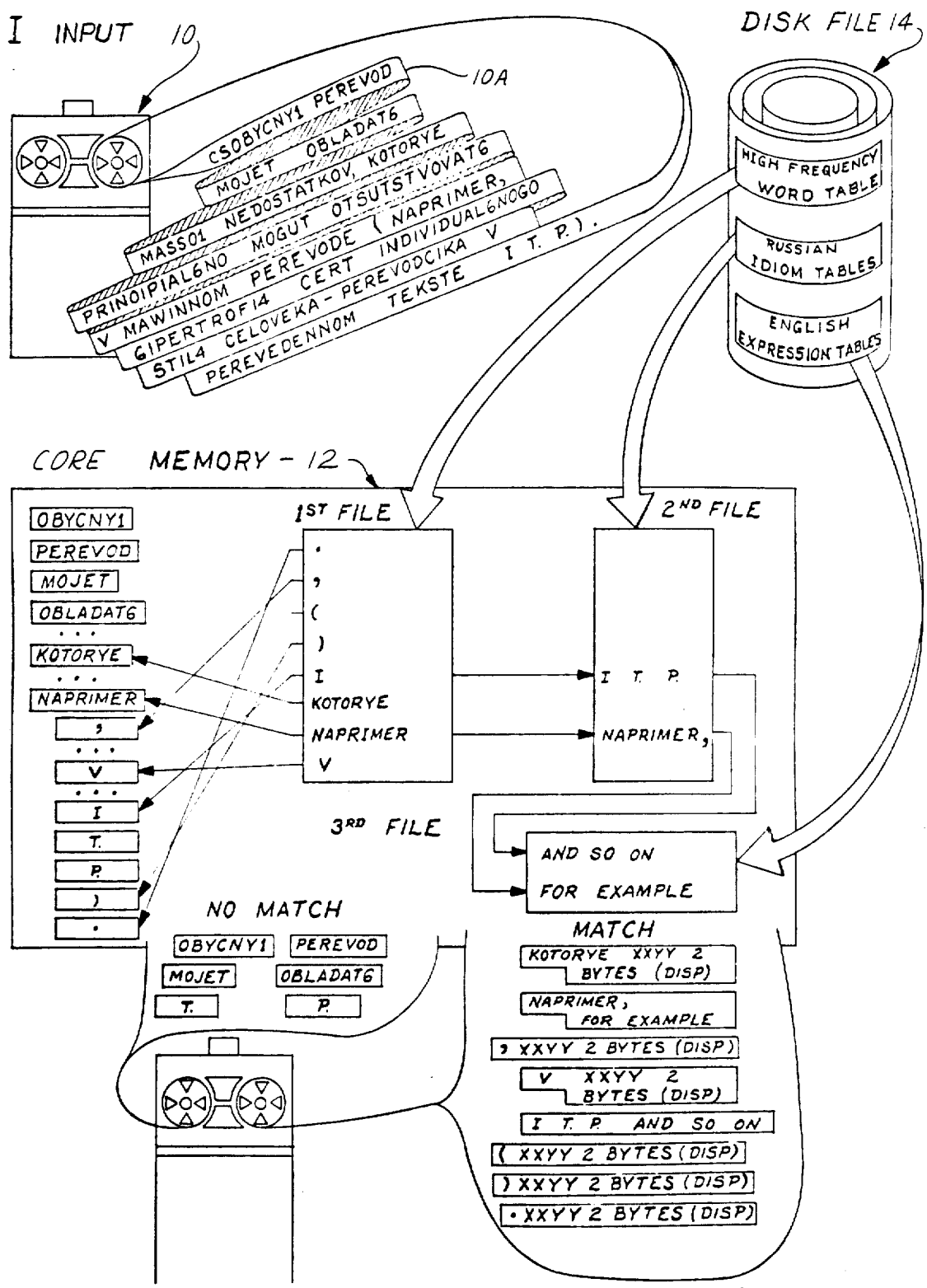
FIG_4

FIG. 5

DISK FILE 14
LOW FREQUENCY OR STEM DICTIONARY

CERT CELOVEKA-PEREVODCIKA
GIPERTROFI4 INDIVIDUAL6NOGO
... OBLADAT6 OBYCNY1 P
PEREVEDENNOM PEREVOD PEREVODE

WORD I

| | | | | | | | |
|---|---|---|---|---|---|---|---|
| 1 | O | B | Y | C | N | Y | 1 | NO MATCH
| 2 | O | B | Y | C | N | Y | | NO MATCH
| 3 | O | B | Y | C | N | | | MATCH

OBYCN    20 80 202000 197*    PS 0 81000004 USUAL
                                 1 81000000E USUAL
OBYCNO   00 00 303F00 0000       3 92000104 ORDINARY
                                 PS 0 00000000 USUALLY

Y1  OGO OMU OGO  YM OM
A4  O1  O1  O1   OH O1        YE YX YM YE YMI YX
                                     YX
OE  OGO OMU OE   YM OM

Short forms = -, A, O, Y;  Adverb = 0
Comparative = EE

* 197 NOV

WORD II

| 1 | P | E | R | E | V | O | D |
|---|---|---|---|---|---|---|---|

PEREVOD 10 40 101080 044*    PS 0 40040104 TRANSLATION
                                1 40000104 CONVERSION/TRANSLATION
CASES = (NONE,NONE,NONE,NONE)   50000104 CONVERSION
PRI   = (NONF,DURING)           5000104 TRANSLATION
NA    = (INTO,NONE,NONE)     2 40000104 TRANSFER
                                40000007 TRANSFERRING
                             3 40040104 TRANSLATION
                                40000104 CONVERSION
                                40000104 REDUCTION

MATCH →

* 044 STAKAN — A U — OM E — Y OV AM Y AMI AX

EXAMPLE OF MAIN DICTIONARY LOOK-UP

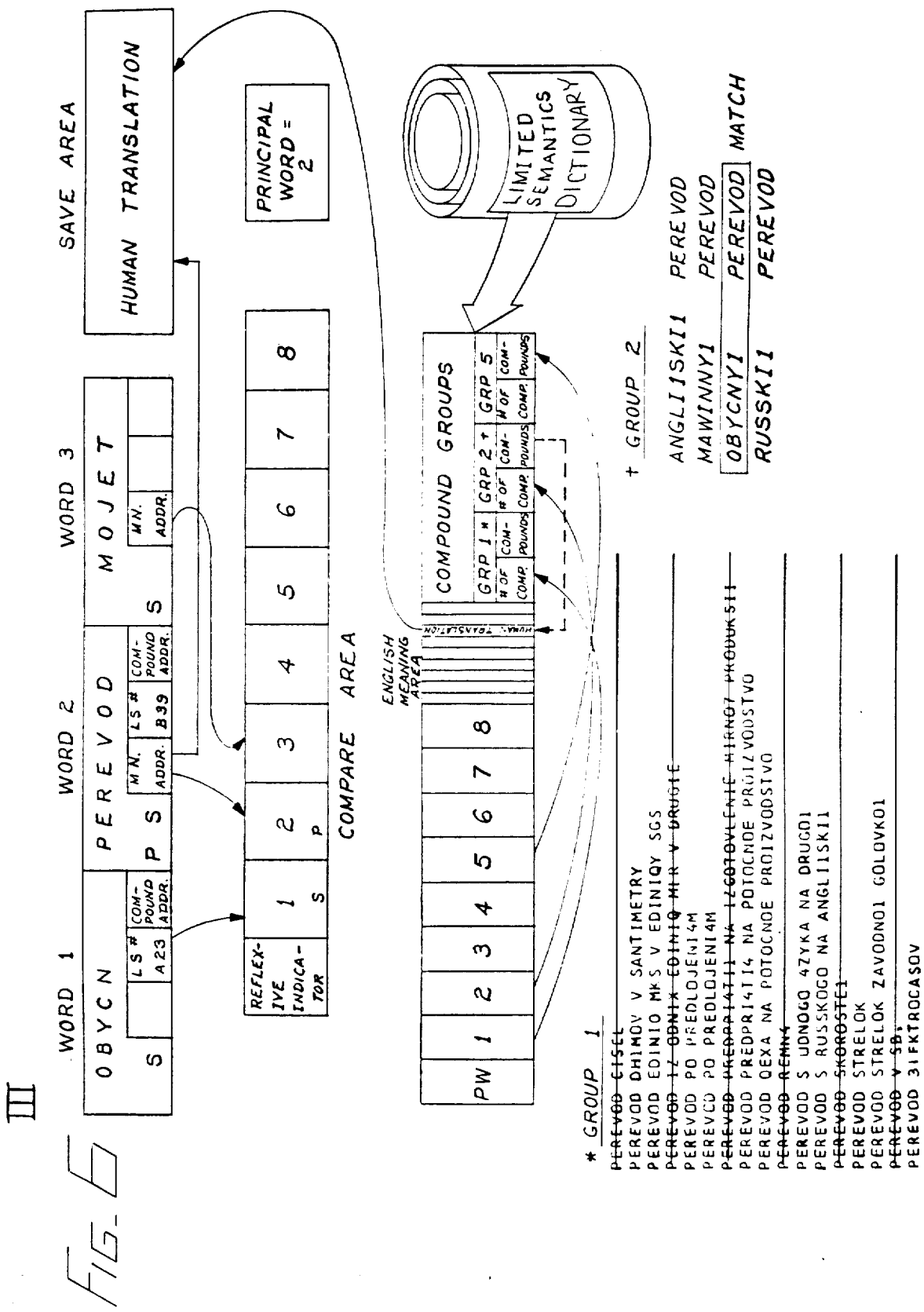

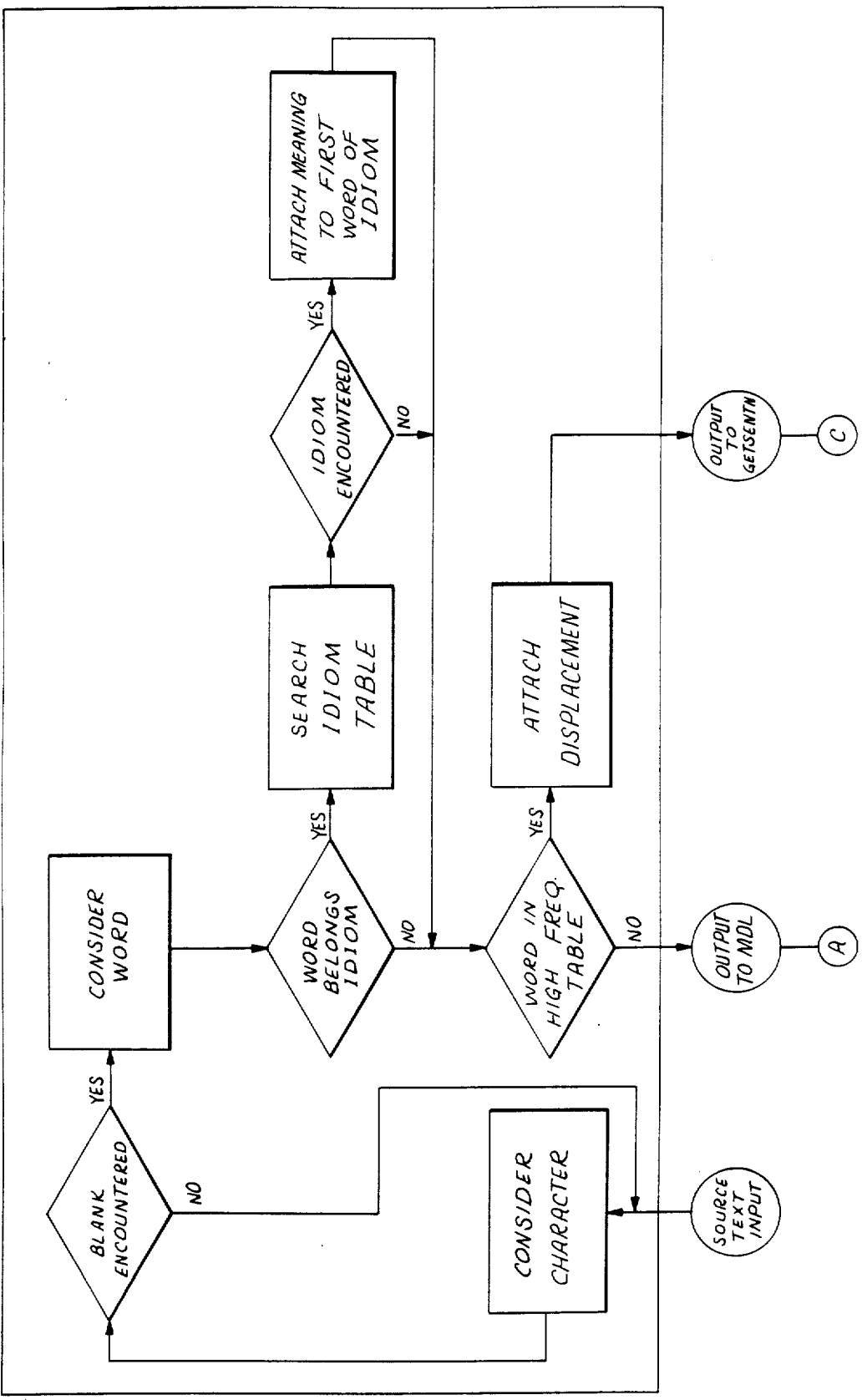

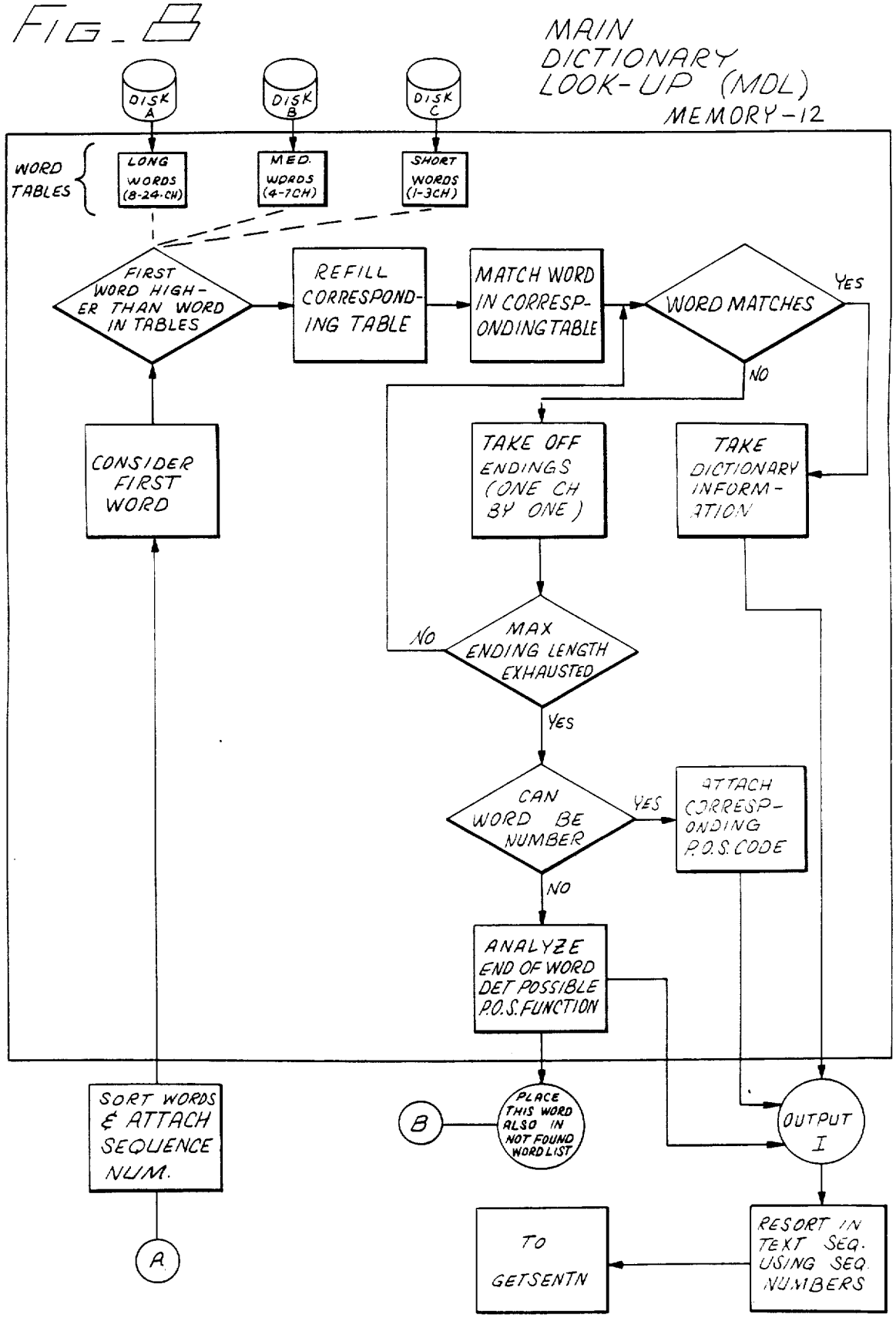

Fig_10

FIG_12  STRPASS 1

FIG_14

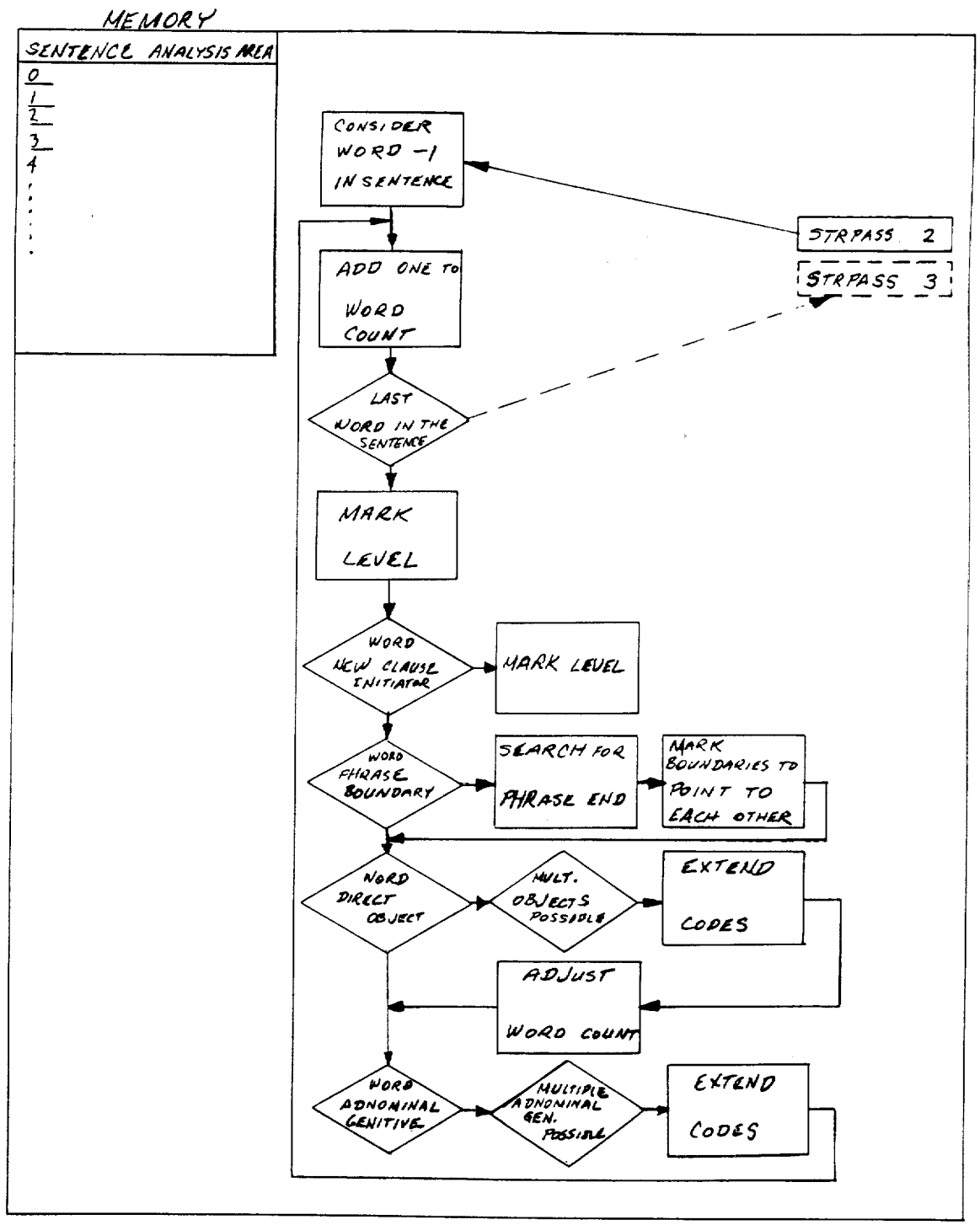
Fig_16  STR PASS 2

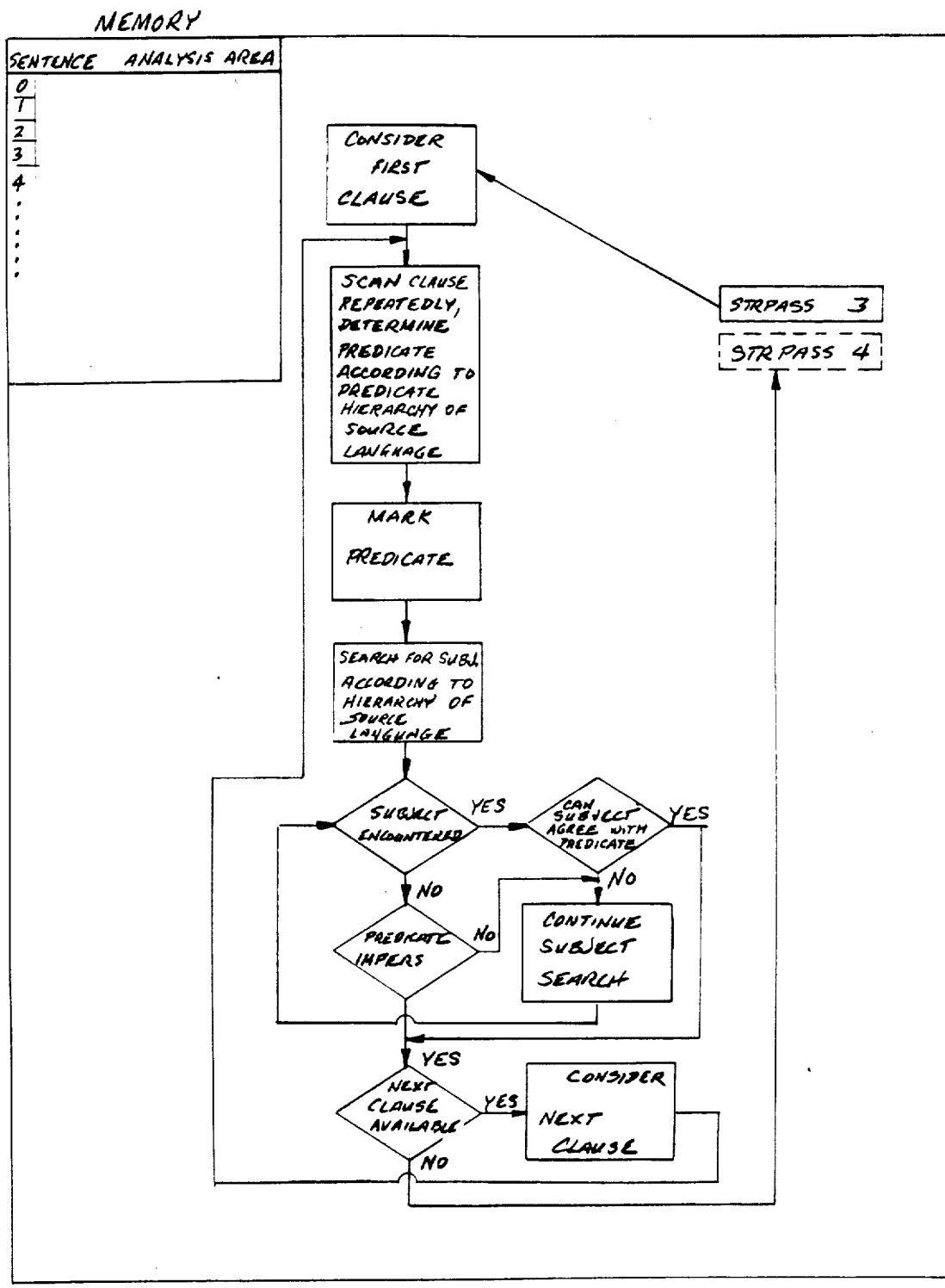

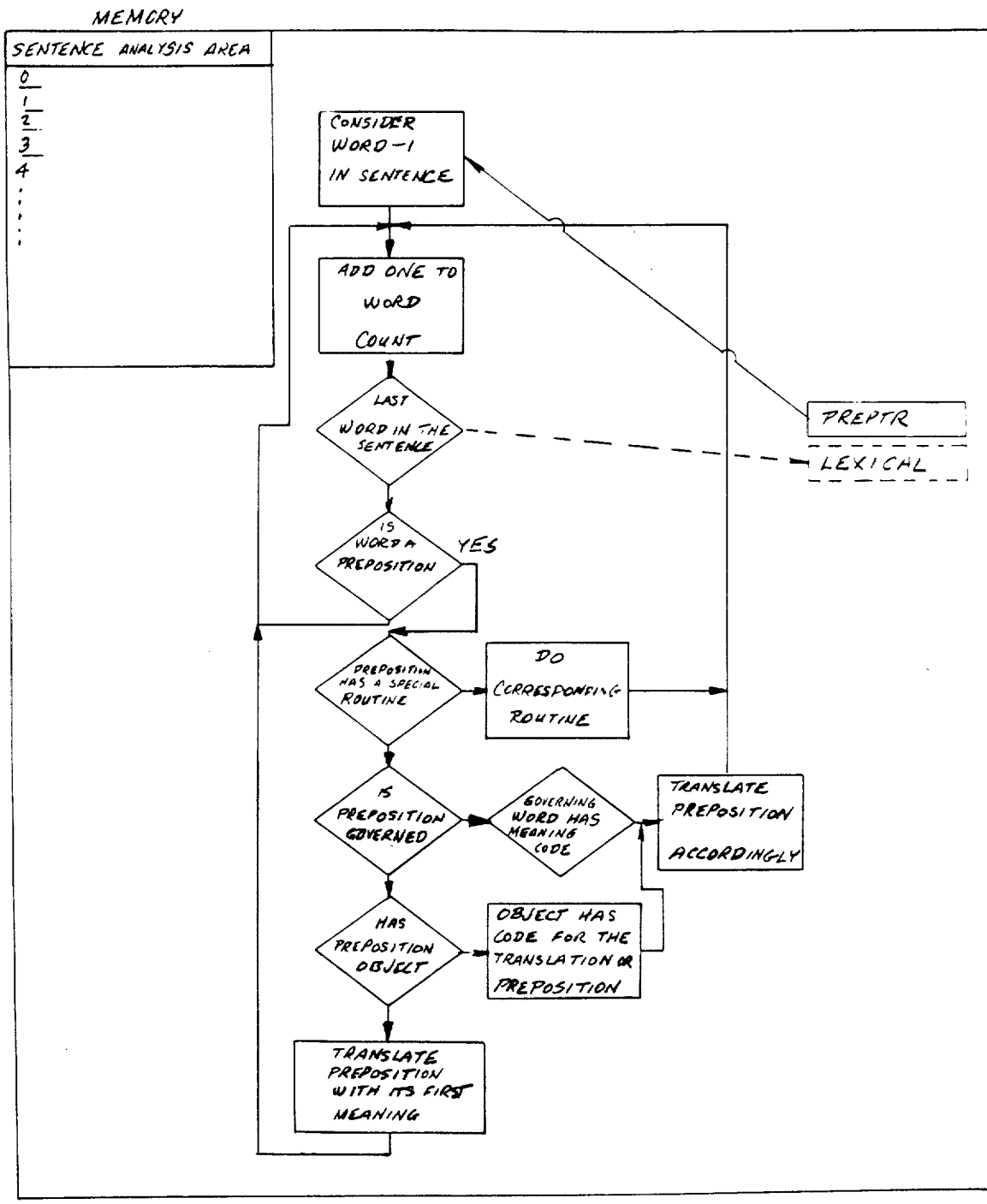
Fig_19

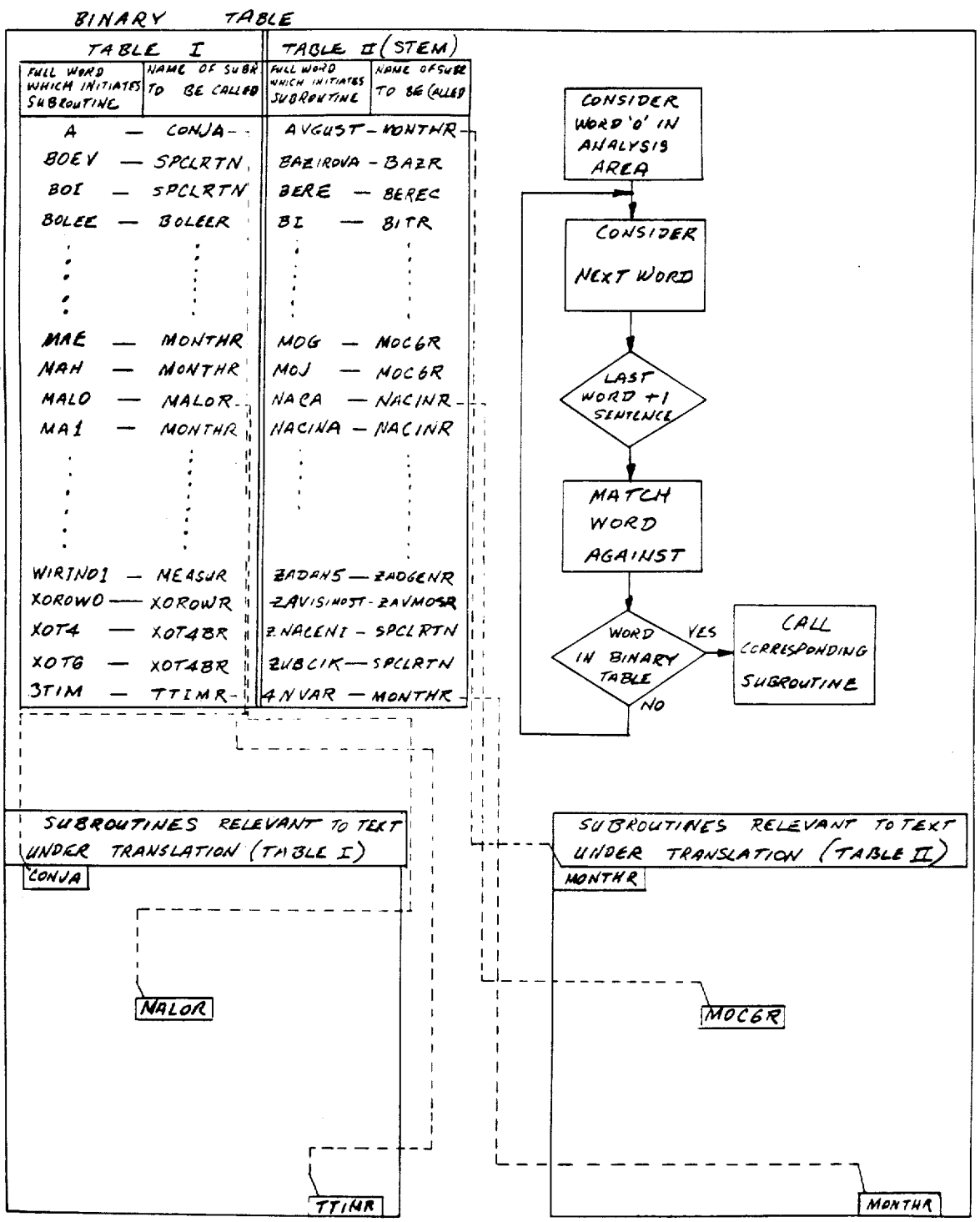

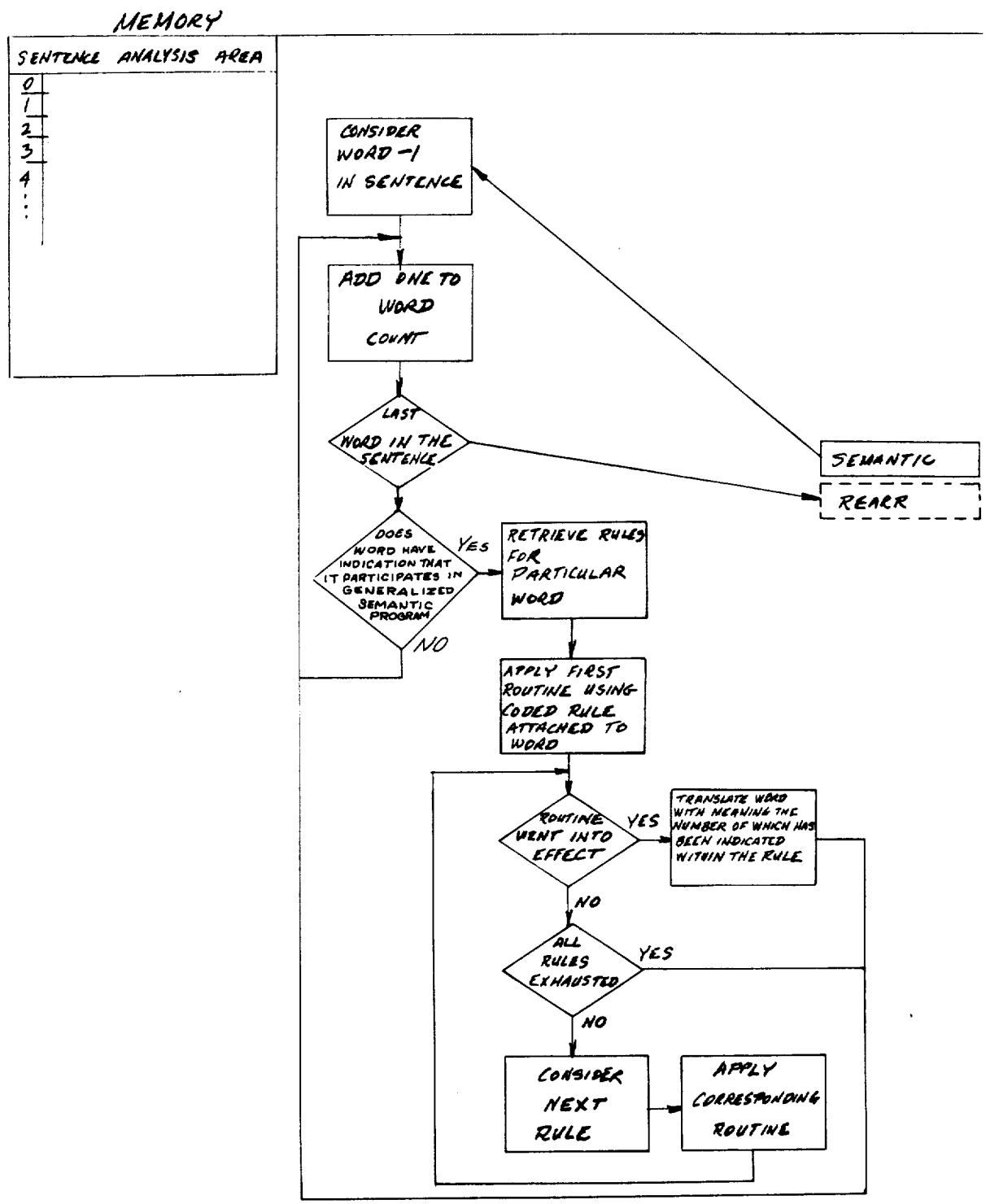
Fig. 21 SEMANTIC

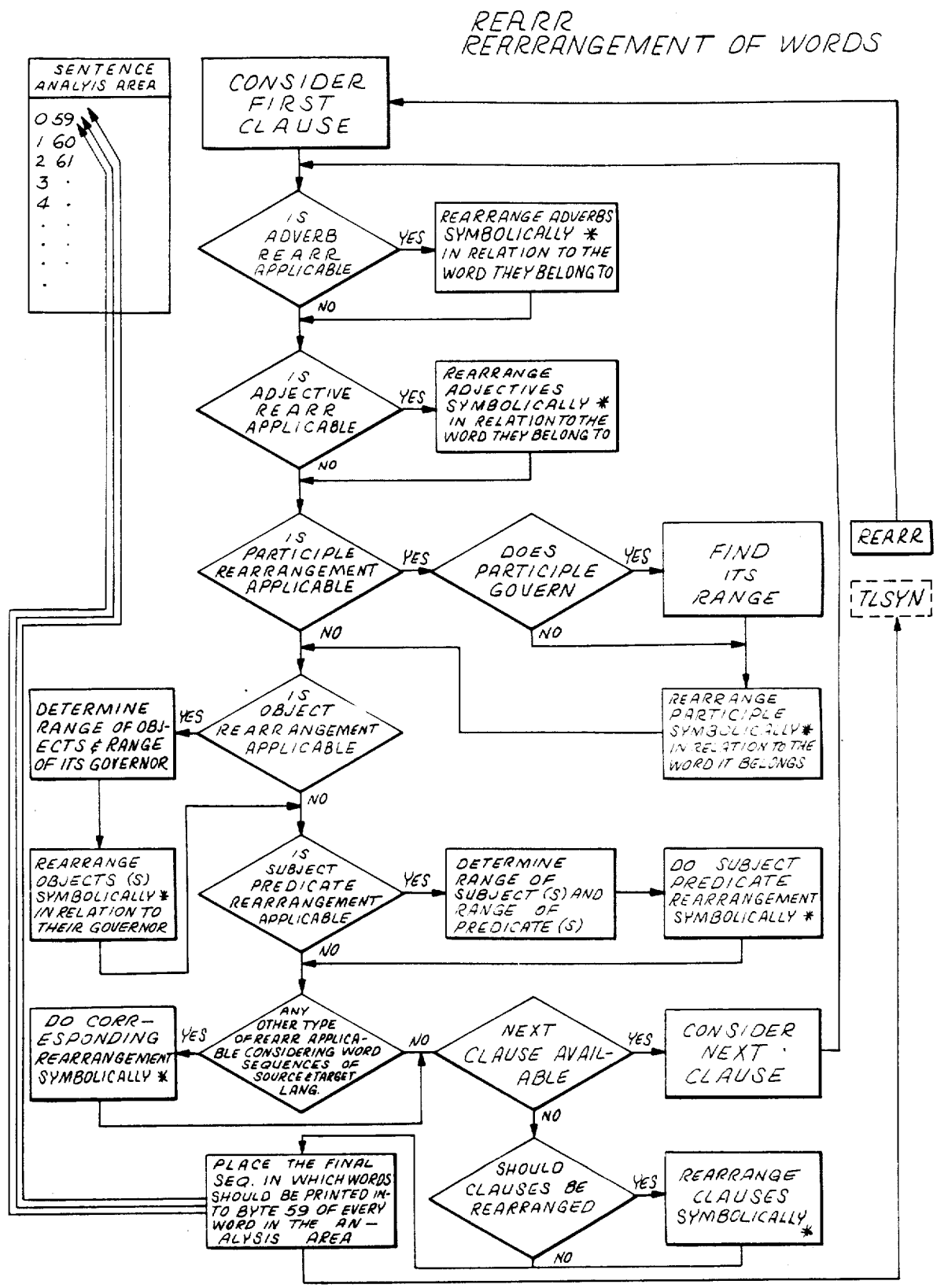

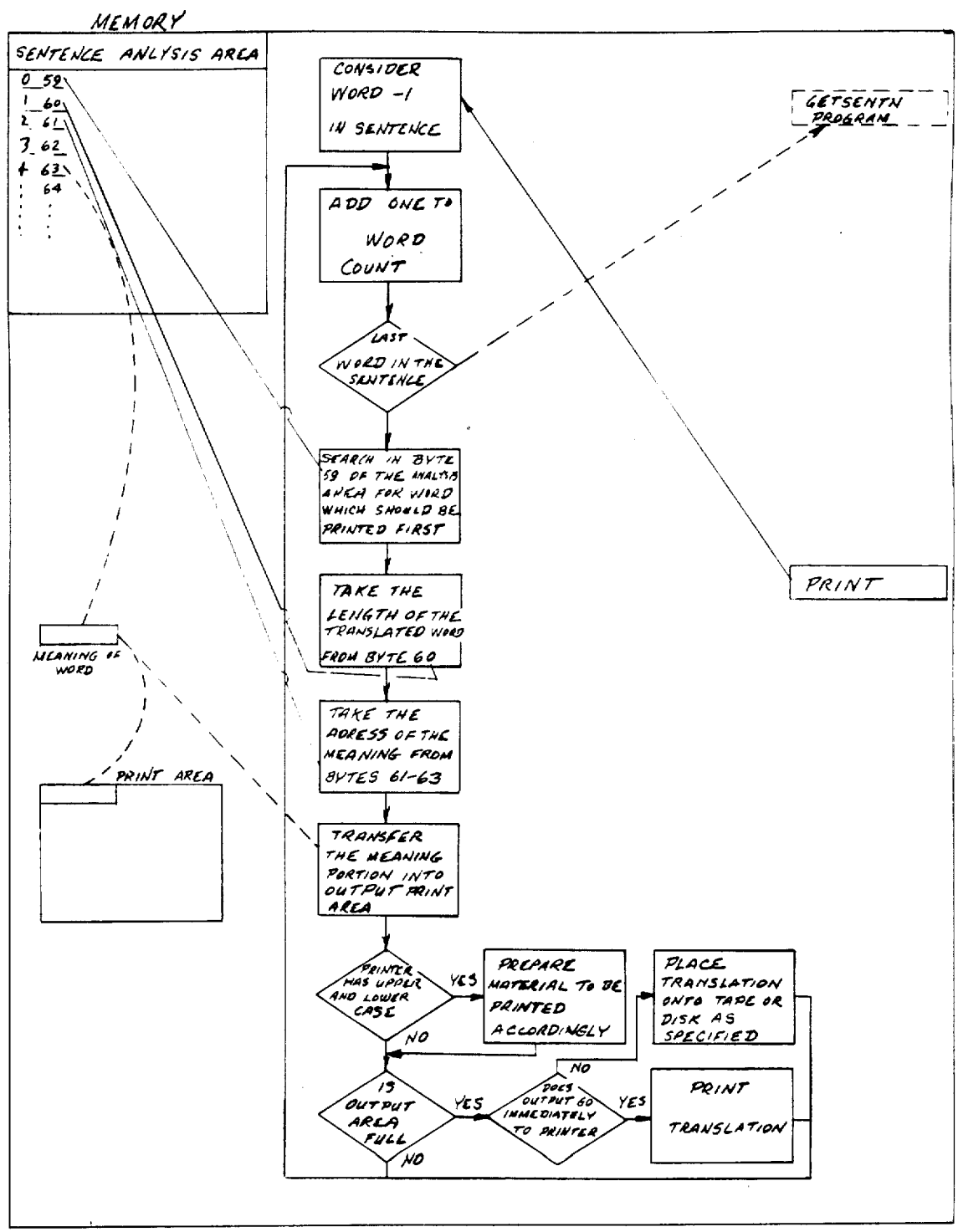

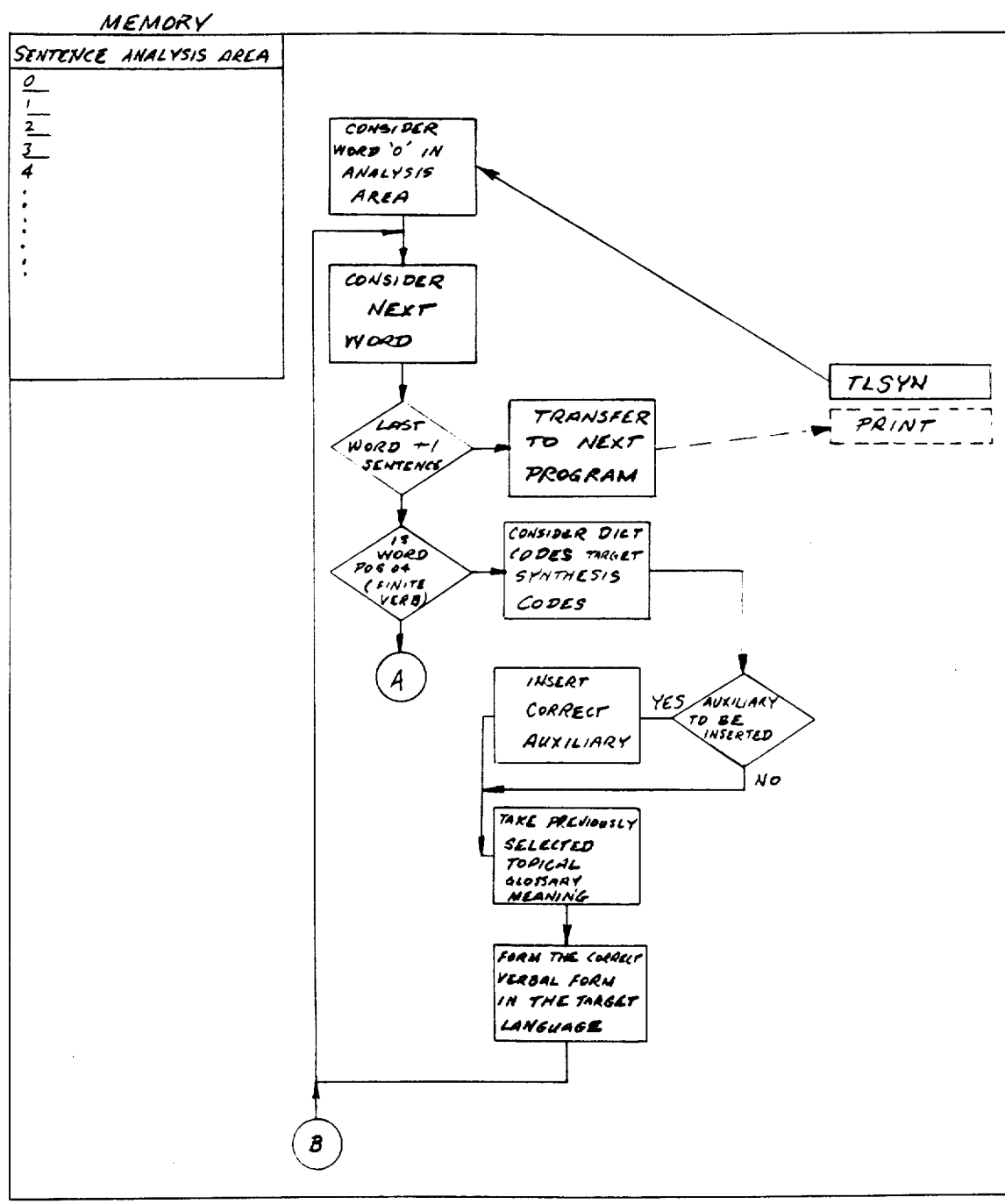

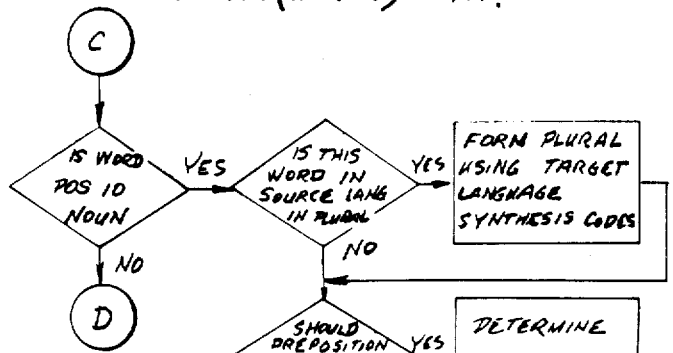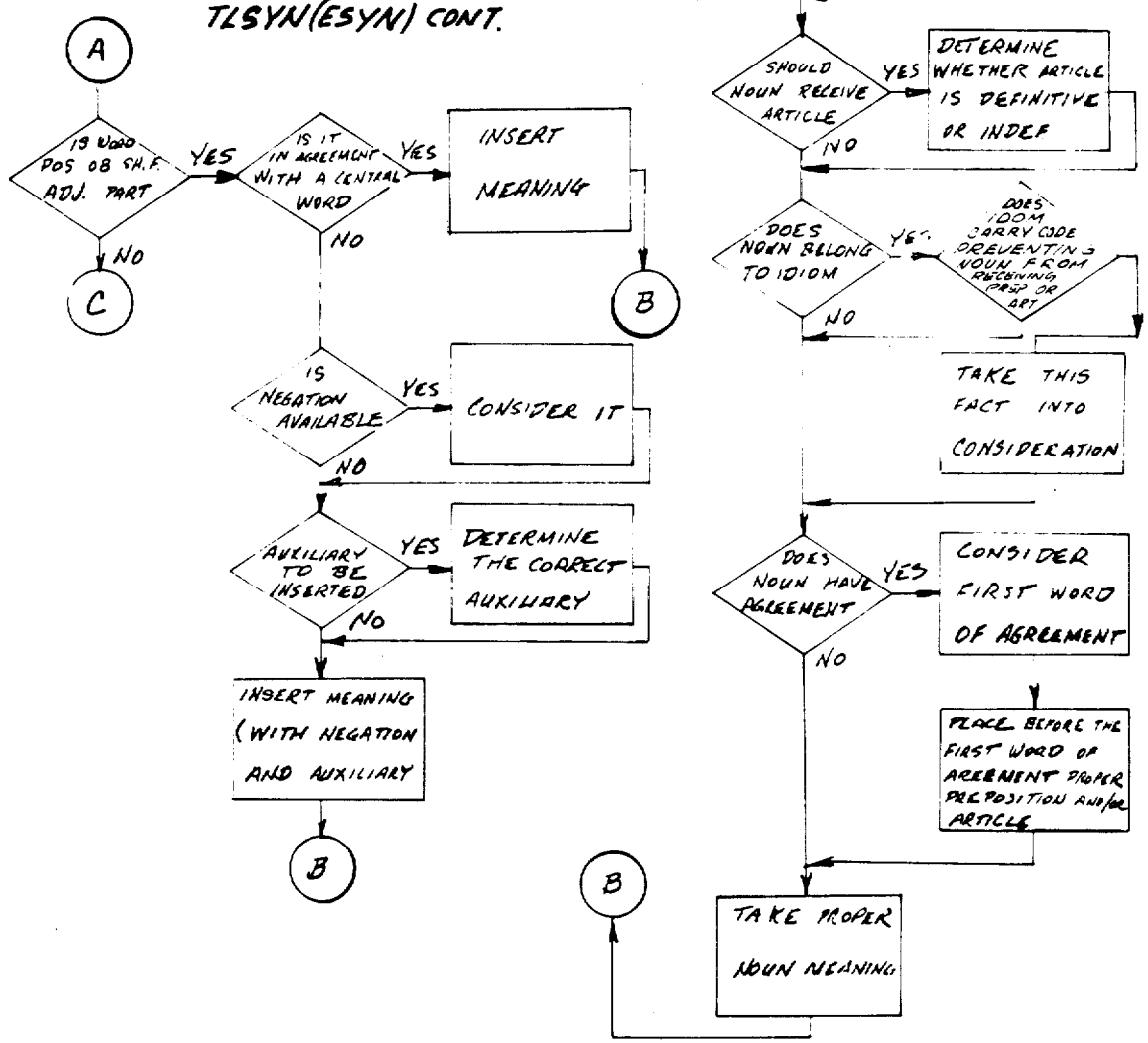

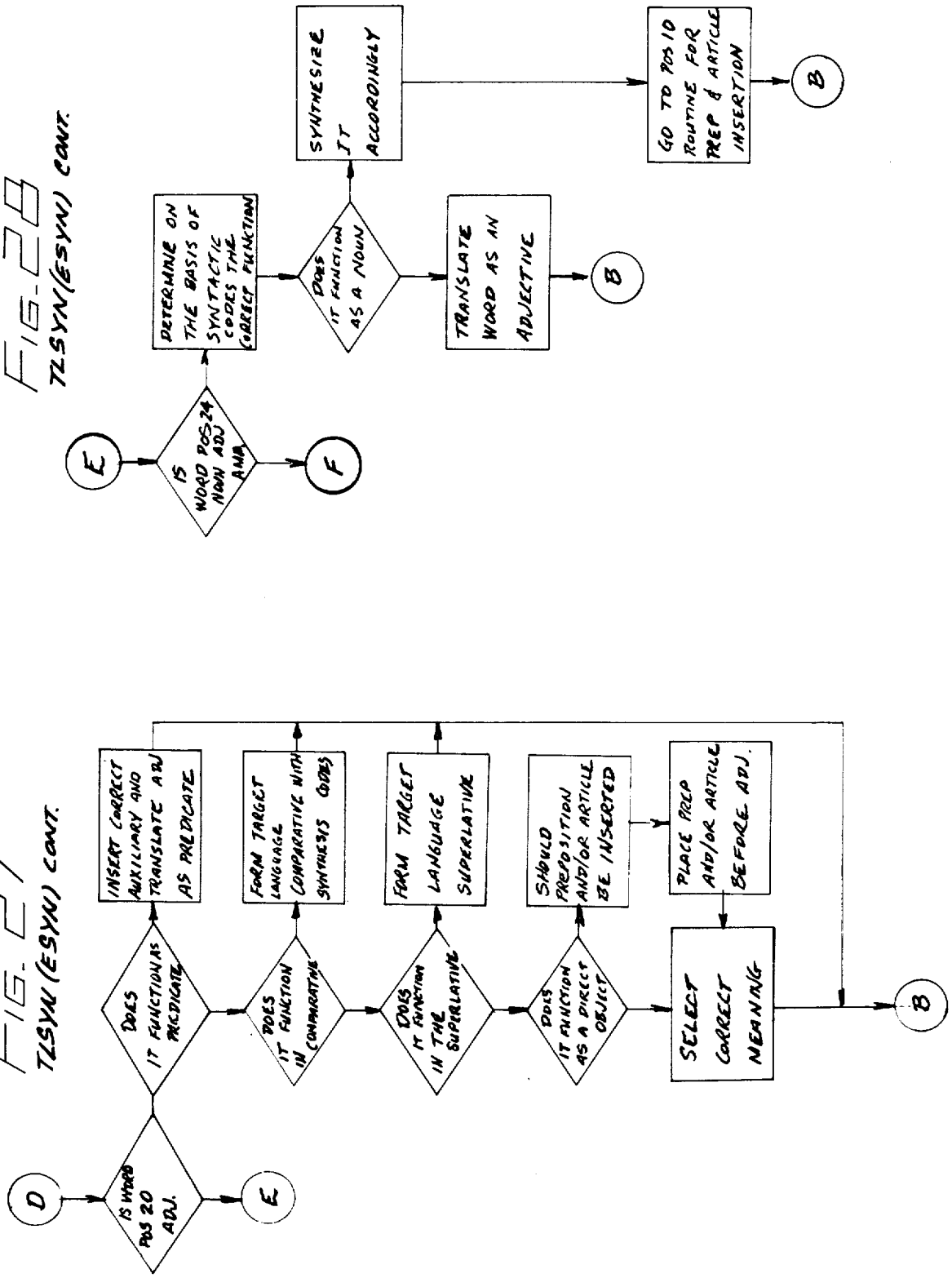

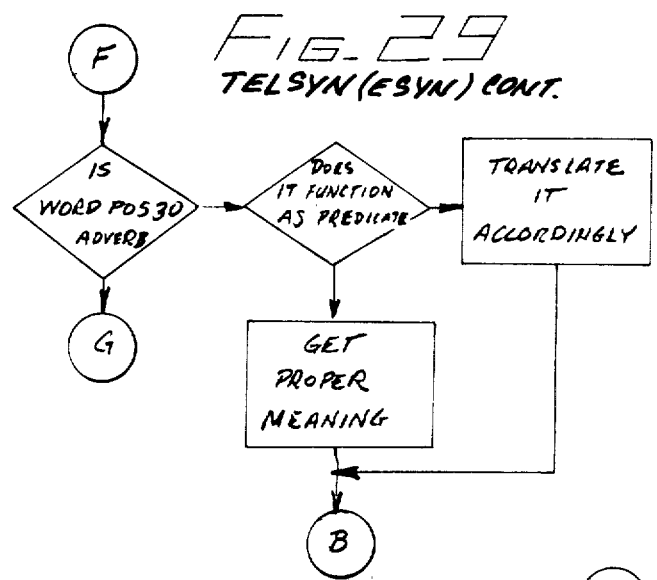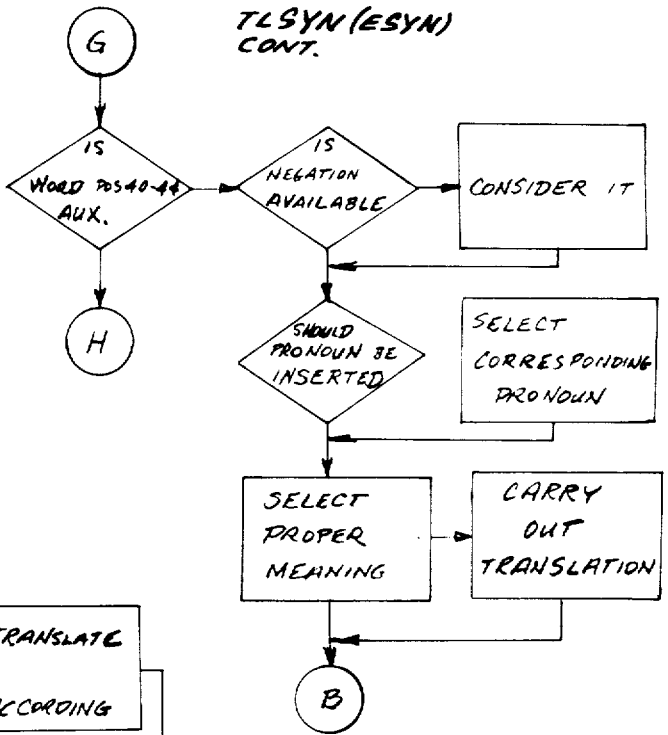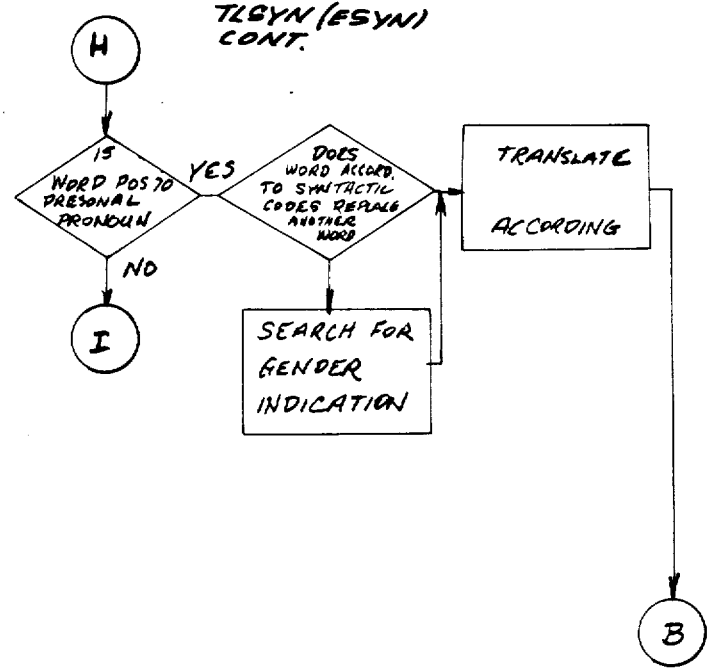

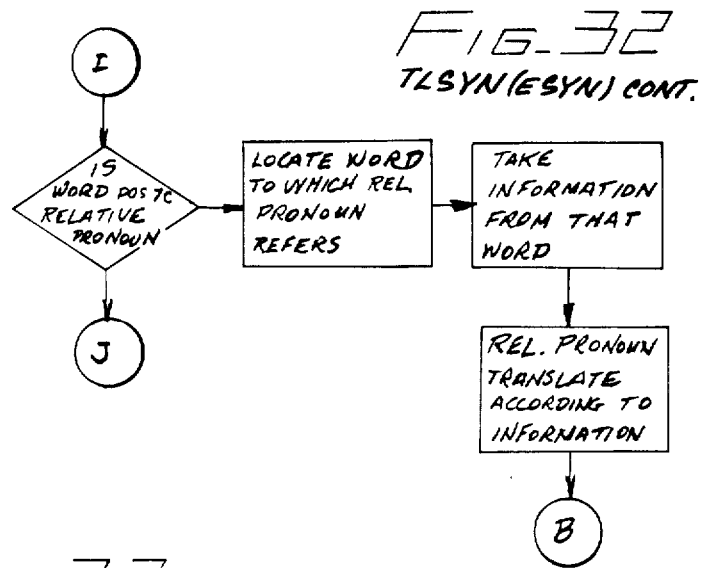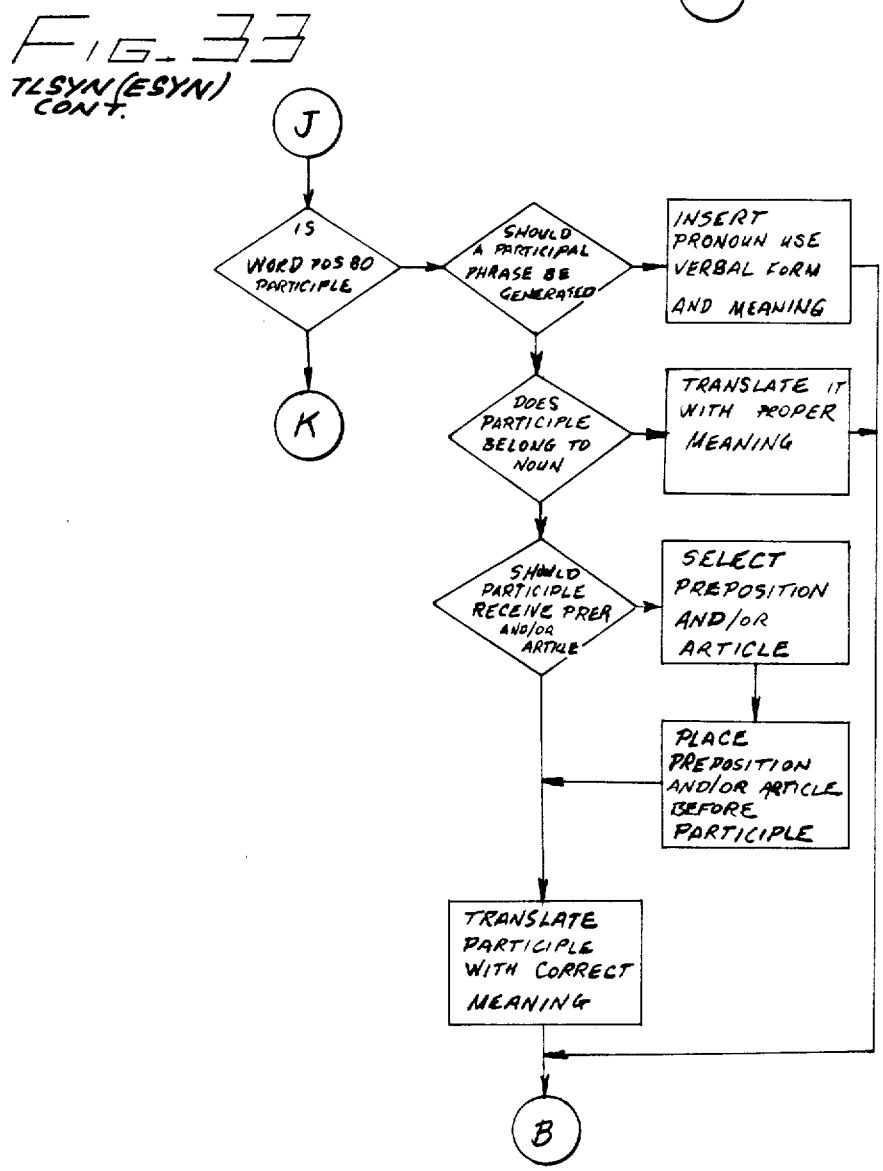

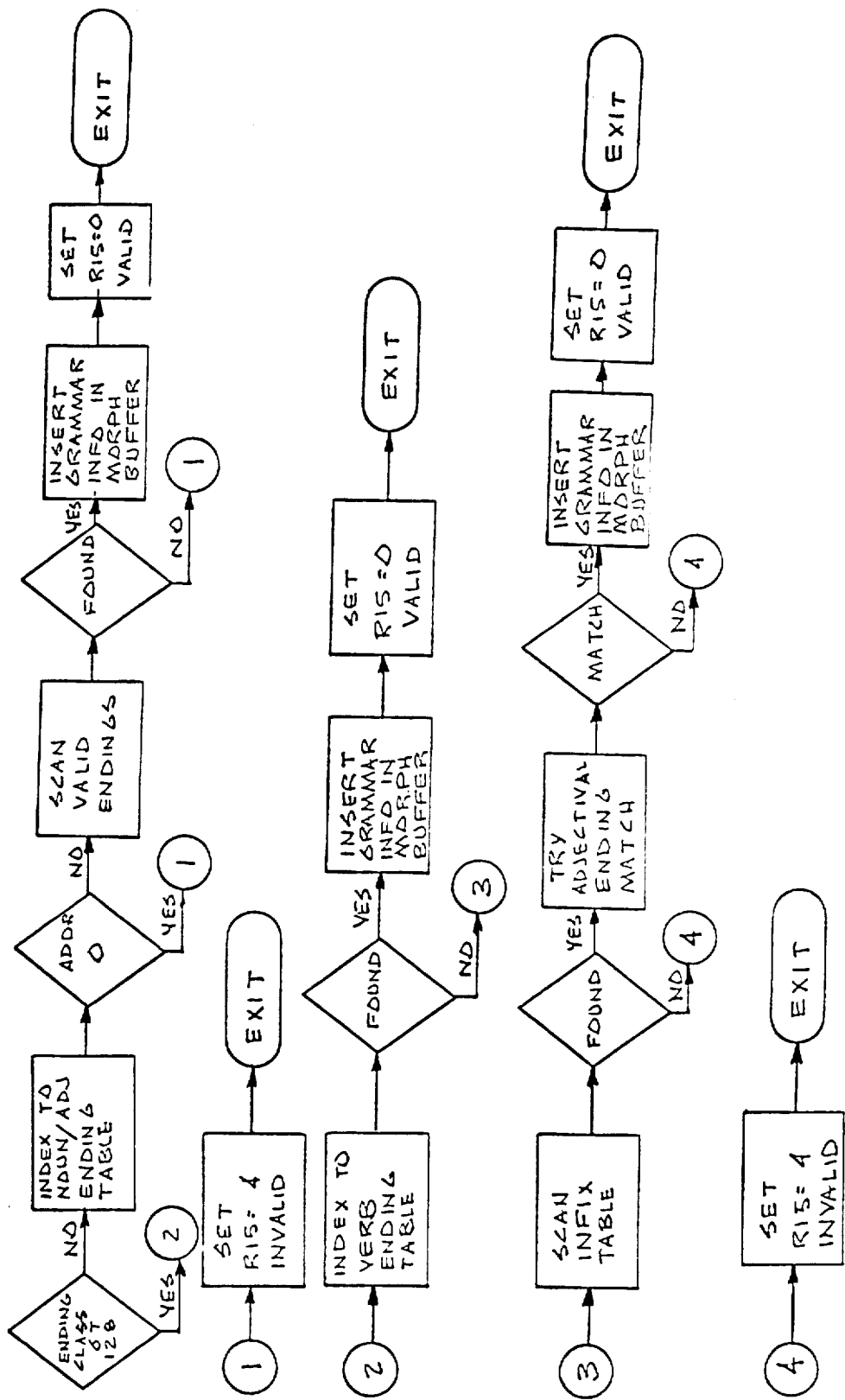

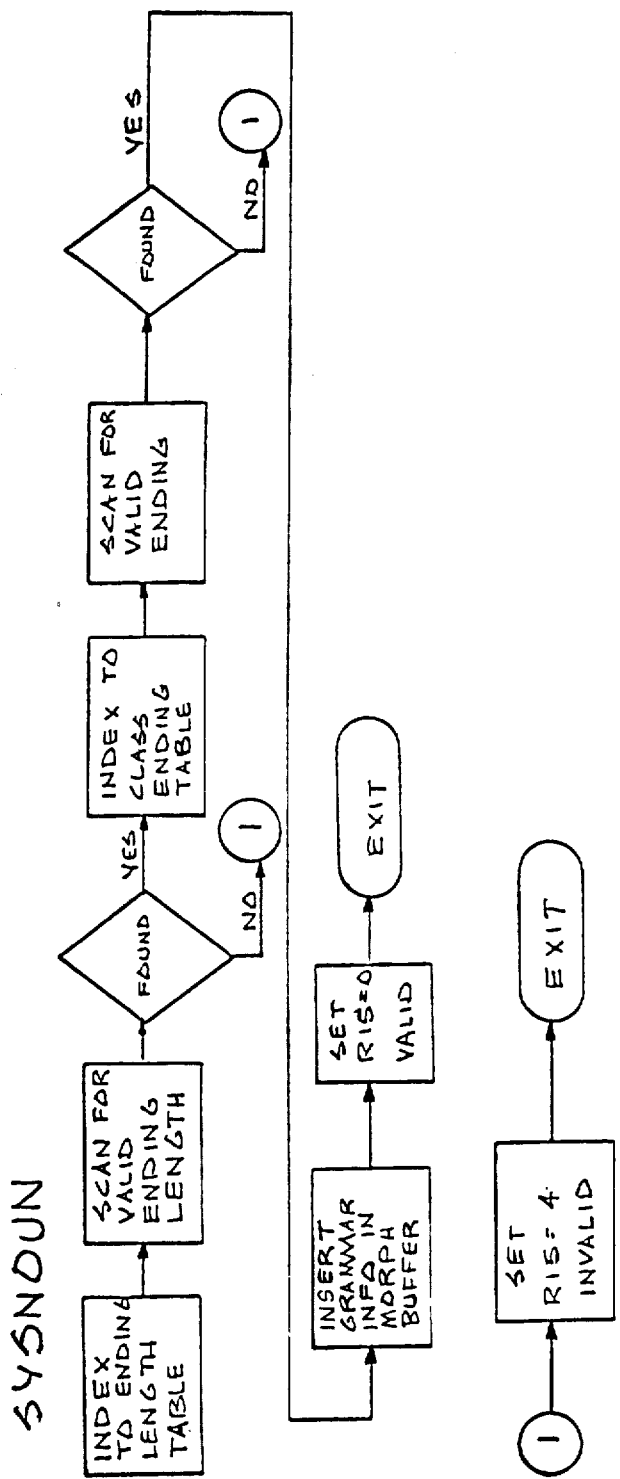

METHOD USING A PROGRAMMED DIGITAL COMPUTER SYSTEM FOR TRANSLATION BETWEEN NATURAL LANGUAGES

CROSS REFERENCE TO MICROFICHE APPENDIX

A microfiche appendix contains 21 microfiche with 1235 frames of listing, and with a total of 1276 frames of printed text. The microfiche appendix is retained in the file and is not printed, under the provisions of 37 C.F.R. §1.96. (b).

BACKGROUND OF THE INVENTION

This invention relates to a method utilizing a digital computer for translating between natural languages.

Attempts have been made to utilize digital computers for translating from one language to another, i.e., from a source language to a target language. The translation systems involve a programmable digital computer system along with a program for effecting the translation. The approaches used were theoretical. The theoretical language approach for syntactical analysis has not been acceptable because it starts out from linguistic assumptions instead of considering the capabilities of the program digital computer and approaching the translation from the computer's point of view.

One reason for the failures in the past was that linguistics and computer programmers worked in separate groups. The information exchanges between these groups was negligible. Either linguistic approaches were forced into the computer, in which case the computer was not used correctly, or they were modified to such an extent that they could not carry out the tasks.

The idea of machine translation was conceived in 1946 by Warren Weaver and A. D. Booth. Many attempts to achieve a machine translation system and put it into operation have been made inside and outside the United States since that time. Due in part to inadequacy of hardware, the projects outside of the United States did not make significant progress. The projects in the United States were directed toward developing linguistic theories encompassing the whole natural language and then going to the computer. This approach inevitably failed because the human mind cannot encompass the totality of the language. The approaches were also unsuccessful because the work was restricted to experimental work on certain aspects of the problem.

The following is a brief resume in the approaches and the theory behind them:

The General Analysis Technique (GAT) developed at Georgetown University from 1958 to 1963 used a linguistics oriented computer coding scheme. Ad hoc solutions were introduced and the whole system was confined within a hollow restricted so-called Simulated Linguistic Computer (SLC) system written in octal language and not open for any further improvements.

The Fulcrum theory approach developed from 1959 to 1967 by the Bunker-Ramo Corporation, was directed toward solving, with a relatively small dictionary, the problems occurring in a limited .Russian text. No attempt was made to introduce resolution of multiple meanings; instead, several meanings were printed in the output, separated by slashes.

An approach taken by International Business Machines in 1957 to 1968, initiated by International Telemeter Corporation, was hardware oriented. An attempt was made to insert all the words, and every compound in declinable form, in a photo disk for a large scale dictionary lookup. Syntactic consideration were very limited. Both the approach and hardware failed because compounds cannot be just translated as they occur, but have to undergo a syntactic analysis. In addition, tiny unavoidable accumulations of dirt or dust on the disk caused serious problems resulting in unusable translations.

A predictive syntax system was developed by the National Bureau of Standards and Massachusetts Institute of Technology in 1960 to 1964. This approach failed because it considered only one limited path to the sentence This system was never implemented on a larger scale, but was used just within a limited experimental environment.

Transformational grammar was another approach. However, this approach turned out to be absolutely incompatible with computer translation requirements. Only small experimental systems have been developed on the basis of this theory, and they had to be discontinued before any significant translation was produced.

SUMMARY OF THE INVENTION

The appearance of fourth generation computers made it possible to introduce approaches which would be capable of producing acceptable machine translations. The best utilization of the logical structures of these computers, and maximal coordination of rapid transfer of data between auxiliary and high speed storages, plus the development of a complete system, made it possible to realize the goal of an automatic means to overcome the communication problem between natural languages.

The present invention, hereinafter called SYSTRAN, was possible because of the combination of experiences as systems analyst, linguist and computer programmer. The experience in the three areas enabled the inventor to develop the approaches which resulted in the invention. The unique solution which is elaborated upon herein can be summarized as follows: computerized syntax, a dictioary lookup which is based on the most efficient exploitation of main and auxiliary storages and which uses four different types of dictionaries, the combination of fixed and variable length areas for full utilization of the computer, the introduction of remembering switches, new ways of handling multiple meaning problems, and system translation (SYSTRAN), universality which makes it possible to change only tables and parameters in most instances when source and/or target languages are changed.

The invention described here proceeded from its very inception toward the goal of setting up a "universal" translation system, defined as one in which most of the programs could be universally applied to different source or target languages. SYSTRAN realizes this goal—the only changes for different languages are those necessitated by the inherent structures of the languages. Dictionary arrangement, the lookup concept, the utilization of memory switches during syntactic analysis and the resolution of multiple meaning problems use the same basic approaches regardless of source or target languages.

SYSTRAN takes full advantage of coordinated usage of the various auxiliary devices, which allows easy access to the various dictionaries.

The computer is still handicapped in comparison to the human mind, due first of all to the size of the computer's limited high speed, rapid access, core memory.

The SYSTRAN system overcomes such a handicap to a considerable degree by setting up a coordinated system of dictionaries. The dictionaries are updated on magnetic tapes, for actual usage they are available on rapid access disks and in the high speed core memory.

In addition, with SYSTRAN an entirely new approach to syntactic analysis has been introduced. This approach involves automatic parsing. None of the machine translation systems developed prior to SYSTRAN achieved the effectiveness of this automatic syntactic analysis technique. The computer is instructed in every instance what to remember, either by codes attached to the words from the source sentence, or by a temporary plug-in of a sequence of these memory switches during particular passes. During this analysis, the computer simulates the human translation process in that it sets "remembering" switches as it passes through the sentence. On the basis of which switches are set, the decision to start a new routine is made when a new part of speech is encountered.

Program sections, called routines, can call upon individual subroutines to carry out those tasks which must be carried out repeatedly. A subroutine may use nested subroutines to check for certain parameters before making a decision.

The System uses many unique approaches and methods at every level in carrying out translation automatically from a source language into a target language.

A program for translating between source and target natural languages in accordance with the present invention involves a system wherein all the logical capabilities of the digital computer are first considered and a programming system is organized in a form which can be processed by the computer. To this end, new features were introduced in the language theory. A new part of speech concept breaks with the traditional parts of speech and organizes the functional classes in the language according to their most suitable form for processing by the computer. Codes are assigned to language units, to words, to expressions, and even to complete phrases in order to enable a program to correctly recognize the function of the words within the sentence. This is in sharp contrast to previous systems where codes were only assigned to individual words. The method involves a complete system which starts with the reading in of source language text, breaks the text down into individual words and looks up these words in various dictionaries. Codes are attached to the words which are indispensable for further processing and computer understanding of the source text. With the help of codes attached to individual words or expressions, the computer carries out a hierarchical analysis during which more and more codes are attached to each word. These codes express for the computer the syntax of the individual sentences and enable subsequent program to find the meaning in the sentence as well as all those factors which influence the meaning within or without the particular sentence under analysis. On the basis of this procedure, an unambiguous translation is carried out.

The program in accordance with the present invention is capable of utilizing an unlimited number of routines attached to each source word. The routines are attached irrelevant of the source and target languages under consideration. These routines take into consideration the computer established syntactic interconnections of the words, phrases, etc. and using semantic categories, find the meaning influencing words for every individual word with multiple meaning in the sentence. Unique to an embodiment of the present invention, a program is capable of attaching to the individual source language entries a virtually unlimited number of target language meanings and of organizing them according to subject fields. During the translation, the first selected meaning reflects the subject field in which the translation takes place cutting down considerable on the multiple meaning problems. To the general types of words which occur in every subject field, routines are attached to solve their meaning within every possible environment. Word groups are translated as a unit, either as idiom or so-called limited semantic compound expressions (L.S. expression). The advantage of the L.S. compound is that whenever the source language is inflected, one such entry can translate correctly the compound irrespective of which case or conjunctional form it occurred in the text.

Another feature of the embodiment of the present invention is its open-endedness. In other words, the system is quite modular and this is felt to be a primary feature of an embodiment of the present invention. One feature of the modularity is that there is no limit in adding compounds to the system. The number of idiomatic expressions is limited only by the high speed core memory used.

Also unique to one embodiment of the present invention, is that although an idiom is translated as a unit, the participating words may be undergoing a complete syntactic analysis. As a result, the automatic translation does not suffer by the fact that an idiom has been translated.

Another feature of an embodiment of the present invention is that limited semantic compounds are stored on disks and are rapidly accessed in a way that the most frequent ones are available during the dictionary lookup procedure, and less frequent ones are made available during the actual translation process.

According to a preferred embodiment of the invention a special up-date system is provided with independent routines that carry out changes within the various dictionaries, including the general dictionaries, high frequency dictionaries, idiom dictionaries and limited semantics (L.S.) compound dictionaries. The update system has built in features for automatic controls so that possible errors due to erroneous coding are automatically eliminated. Whenever an entry is rejected as unacceptable, a message indicates the type of error committed so that the dictionary coder can easily find the problem. The computer is used to full advantage by the use of a higher language which is adapted to the special requirements of machine translation. Each instruction of the higher language stands for a large number of machine language statements and facilitates the programming without undue core storage requirements. This computer language is known as the systran macro language for language translation and itself is felt to be a unique feature of one embodiment of the present invention.

According to a preferred embodiment of the invention, repeated scans are carried out through the sentence for certain grammar codes which help the computer first to eliminate basic ambiguities and establish through codes attached to the words, basic interconnections between the words. More detailed semantic tests are made in subsequent passes and phrases and clauses are gradually delimited and higher sentence markers such as subjects and/or predicates in the target language are established.

The last of the scans determines the function of every word and resolves indeterminate or ambiguous syntactic relationships between words in a sentence. These passes set up a syntactical profile of the sentence expressed by coded information in a way which a computer can utilize. Resultant source sentences with the generated codes are inserted into a predetermined cleaned up location in the memory reserved for this purpose and codes are generated after each word. Codes reflect all of the existing interconnections between the words of the source sentence. Although only one sentence is generally analyzed at a time, the system has provisions to store information in order to remember from previous sentences information which should be taken into consideration in resolving certain ambiguities in following sentences. This is completely unique to the preferred embodiment of the present invention. The connections between words are expressed in codes which uniquely define the syntactic and semantic connections in each sentence and between sentences.

According to a preferred embodiment of the present invention, the program has the ability to resolve multiple meanings. In order to accomplish such resolution, there is provided a subject field glossary or topical glossary. For the first time in machine translation, the ability is provided to attach to source language entries in the dictionary target meanings which meanings are located in the topical glossaries. Each time a text is translated an indication can be given to the computer which of the topical glossaries should be consulted. If no indication is available during translation as to which topical glossary or topical glossary sequences are to be used, a general meaning is selected from the main dictionary for every word to be translated.

According to a preferred embodiment of the present invention, idiomatic expressions or idioms contain two or more words in the source language which in a definite sequence represent a unique meaning unit and should be translated as such. An algorithm determines during the translation phase the function of the idiom and accordingly selects the correct idiom meaning, from among a number of possible meanings. The meanings are in the target language. The idiom meaning or meanings are attached to the first source text word of an idiom. The rest of the words in the idiom, i.e. the second and subsequent words, receive a tag which marks them as being translated.

All of the words in an idiomatic expression also undergo a dictionary lookup procedure whereby they receive grammar and meaning codes from the main dictionary and are subjected to the syntactical analysis discussed hereinabove. Thus, the idiom words may become one or more syntactic units independent of the fact that they together form an idiomatic semantic unit.

According to a preferred embodiment of the invention, limited semantic compounds are used for resolving multiple meanings and eliminating semantic problems. According to this procedure, thousands of words with which a particular word may be combined to form a limited semantic compound are stored in the storage facilities of the computer and are selected for further use in accordance with the particular results of the syntactic analysis. The programming system has a unique capability to incorporate such limited semantic compounds according to the various subject fields and during translation, if a compound expression has more than one meaning, it retrieves only that meaning which corresponds to the subject field under translation. The compounds carry syntactic and semantic codes which are used during the determination of their function and their correct translation. Limited semantic expressions usually contain a principal word which can undergo declension or conjugation. Codes for such declension or conjugation in the target language are attached to the compound in question. The principal words in essence, which determines the meaning of a particular compound, carries, in a highly condensed form, information concerning the possible other words with which the word may form a unique compound expression. The information is coded as a sequence of numbers. This procedure for generating the L.S. compound numbers assigns to every word in the source language dictionary a unique L.S. number. Not only are individually all the L.S. numbers of the participating word attached to the principal word but there is also an indication of which position in each compound the principal word occupies in relation to its participating words, i.e. is the principal word the first word, the second word, the third word, etc. in the compound. An L.S. dictionary is provided and whenever a principal word is encountered during dictionary lookup, 300 bytes (2400 bits) of information of participating word numbers are attached immediately to the principal word. If the L.S. information (in the form of a sequence of numbers) for one principal word exceeds 2400 bits, the information is not attached during dictionary lookup to the word, but is left in the particular storage area from where it is retrieved during translation procedure. The storage area is on a disk. There is virtually no limit in the number of compounds which can be attached to a principal word. Presently the longest information attached in sequences of numbers to principal words exceeds 14000 bytes ($14000 \times 8$ bits).

Also in accordance with the preferred embodiment of the present invention, the following step in the solution of the multiple meaning problem are the lexical subroutines. The names of the subroutines are arranged in a binary table and whenever a word occurs which carries a bit indicating that the lexical routine should be called, the particular routine is identified and a binary search is carried out in the list to call in the particular routine. The frequently used routines are kept in the high speed core memory whereas others are available for easy access on auxiliary storage devices such as disks. These routines can be called in a parallel operation to the translation process preventing waste of time. Although the routines are prepared primarily to handle multiple meanings, i.e. semantic problems, several of them resolve syntactic ambiguities. Whenever a lexical routine determines the correct meaning, it attaches the meaning to a word with proper synthesis codes. During translation, this newly attached meaning is considered. Due to the new meaning, some of the words in the sentence lose their previous meanings. As the words are translated, they are marked with a tag as having been translated.

According to a further preferred embodiment of the invention, a subsequent step in the translation process involves resolution of the generalized multiple meaning problem. According to the unique concepts of a preferred embodiment of the invention, a generalized approach has been implemented to solve the multiple meaning ambiguities. The words in the source language receive semantic categorization codes. Each word may belong to a series of semantic categories. These categories are arranged in groups and attached in condensed bit format to the words in the dictionary. Each bit represents a category. If a particular bit is on, the word belongs to such a category. If the bit is not on, the category is not applicable to the particular word.

Rules are expressed in decimal numbers which tell the program which routine must be called in order to resolve the ambiguity of a particular word, and the rules are considered in sequence. Routines are carried out in exactly the same sequence as the rules. The number of the rule indicates for the routine the type of syntactic connection within which search should be carried out the availability of semantic categories i.e., words which have certain semantic category codes. Each time when within a defined syntactic relationship a word with a certain semantic category bit is encountered, a meaning will be selected which is indicated by the respective meaning number in the rule. The rule may specify that in order to select a particular meaning, more than one category must be available and indicates what type of relationship the word with its particular semantic categories must be in relation to an ambiguous word. Rules are of variable length that are attached to each word in the dictionary. These rules are introduced during dictionary lookup in a fashion resembling the introduction of grammar codes and are used in the generalized semantic program to resolve the ambiguity of the particular word.

BRIEF DESCRIPTION OF THE DRAWINGS

FIG. 2 is a generalized sketch illustrating the high frequency/idiom lookup operation of FIG. 1A;

FIG. 3 is a generalized flow diagram illustrating the main dictionary lookup operation of FIG. 1A;

FIG. 4 is a more detailed flow diagram illustrating the high frequency/idiom lookup for a specific Russian sentence;

FIG. 5 is a flow diagram illustrating the sequence of operation during stem lookup operation for the Russian sentence shown in FIG. 4;

FIG. 6 is a more detailed flow diagram illustrating an example of limited semantics lookup operation for the Russian sentence shown in FIG. 4;

FIG. 7 is a detailed flow diagram illustrating the sequence of operation of the LOADTXT program;

FIG. 8 is a detailed flow diagram illustrating the sequence of operation for the MDL program;

FIG. 16 is a detailed flow diagram illustrating the sequence of operation for the STRPASS 2 program;

FIG. 17 is a flow diagram illustrating the sequence of operation for a STRPASS 3 program;

FIG. 18;is a detailed flow diagram illustrating the sequence of operation for the STRPASS 4 program;

FIG. 19 is a detailed flow diagram illustrating the sequence of operation for the PREPTR program;

FIG. 20 is a detailed flow diagram illustrating the sequence of operation for the LEXICAL program;

FIG. 21 is a detailed flow diagram illustrating the sequence of operation for the SEMANTIC program;

FIG. 22 is a detailed flow diagram illustrating the sequence of operation for the REARR program;

FIG. 23 is a detailed flow diagram illustrating the sequence of operation for the PRINT program;

FIGS. 24 through 33 are detailed flow diagrams illustrating the sequence of operation for the TLSYN (ESYN) program;

FIG. 34 is a detailed flow diagram illustrating the sequence of operation for the program RUMO;

FIG. 35 is a detailed flow diagram illustrating the sequence of operation for the SYSNOUN program.

DESCRIPTION OF THE PREFERRED EMBODIMENT

1. General Description of Systran Translation System

The appendices hereto give a symbolic listing of the SYSTRAN programs. The meaning of the symbolic language is explained in the book *IBM System/360 Operating System Assembler Language, File Number S360-21, Form Number C28-6514-4*, published by IBM. The symbolic listing is converted to actual machine code for the IBM 360/65 through the assembler program which is a normal part of every IBM 360/65 computer.

Figure 1:
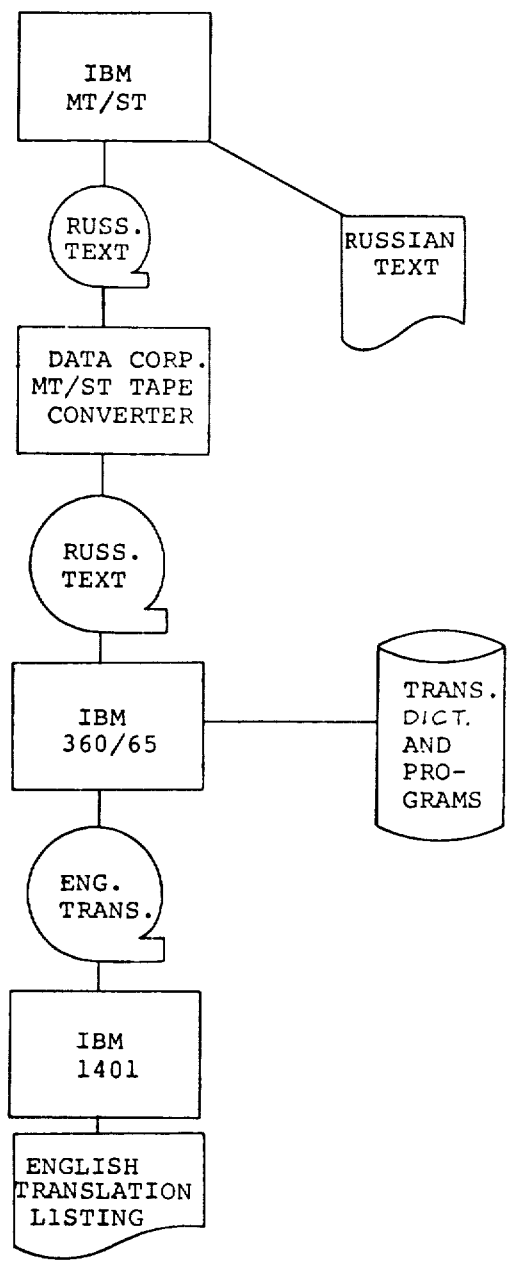
FIG. 1 is a generalized flow diagram illustrating the SYSTRAN translation system embodying the present invention.

FIG. 1 is a flow diagram which illustrates an overall programming system used on programmable digital data processing systems for translation from one natural language to another. The specific programming system disclosed herein by way of example is for translation from Russian to English and is known as the "Systran System". However, the inventive concepts are applicable to translation between any two natural languages such as English and Chinese, Spanish, etc.

Referring to FIG. 1, the first step consists of the preparation of the Russian text for computer translation. This is accomplished by having the text typed on a magnetic tape Selectric typewriter (MTST) made by the International Business Machines Corporation (IBM). The typewriter is used to replace each Cyrillic letter in the Russian text with a Latin letter or combination of letters. The MTST codes the Latin characters and records the coded characters on magnetic tapes in cartridges. To provide print format control of the English translation, special coded control characters are typed interspersed with the text. The text on the MTST tape cartridge is converted to characters suitable for processing by the IBM 360/65 digital computer. The conversion is made to IBM 360/65 characters and recorded on magnetic tape utilizing the Data Corporation MTST converter or the Litton Systems, Inc. converter, Model 9209.

Having passed through this preparatory stage, the Russian text is next translated by processing on the IBM 360/65 digital computer. The present minimum requirements of SYSTRAN on the IBM 360/65 are 512 bytes of core memory, one input and one output tape and four disk storage drives for dictionary program, and data manipulation usage. The disk storage drives are sold by IBM under the number 2314. The steps of processing are described in subsequent paragraphs.

The output from the IBM 360/65 system is a magnetic tape with the English translation. This tape is processed on a digital computer sold by IBM known as the IBM 1401 computer for the purpose of preparing the English translation listing. The actual listing is on a printer attached to the IBM 1401 computer system. The IBM 1401 computer has a special upper and lower case print chain for capitalization indication, as well as additional special characters to compose a 120 character print chain.

A set of tables is located at the end of the specification and is referred to hereinafter. Table I gives a list of the computer programs used in the SYSTRAN SYSTEM together with a brief description of the meaning of each program.

The translation process on the IBM 360/65 system comprises the following 12 programs listed in Table 1 STRPASS 0; STRPASS 1; STRPASS 2; STRPASS 3; STRPASS 4; LSLOOKUP; LEXICAL; SEMANTIC; PREPTR; REARR; TLSYN (ESYN) and TRPRINT. The program MT/ST edits and converts the MT/ST text. The programs LOADTXT through SYSVERB perform dictionary look-up functions, gather information and attached the information to the source text words. The programs STRPASS-0 through STRPASS-4 prepare the input text together with information from certain translation dictionaries (which will be described in detail) for the programs LEXICAL through TLSYN (ESYN) which performs the actual translation. The functions of the individual programs are presented below.

The rest of the general description is directed to the operations of the SYSTRAN SYSTEM using the IBM 360/65 and the IBM 1401.

There are inherent difficulties associated with substituting a computer for a human translator to perform language translation. The human mind has the capability of "understanding" the text by making almost simultaneous, structural interconnections between words. The computer's limitations in this area are overcome by utilizing its great speed, storage of unlimited source material, and ability to perform repetitious and tedious tasks without succumbing to error. The system presented herein has minimized the machine limitations, while capitalizing on the computer's capabilities.

The logic employed in the translation process can be divided into three primary phases. The first is DICTIONARY LOOKUP in which the computer storage is drawn upon to symbolically classify the source words. The second phase is the SYNTACTICAL analysis of the text, e.g., the establishment of interrelationships between words within a sentence. The third phase is the actual SYNTHESIS into the target language or languages. Each of these steps will be dealt with independently, both in terms of the computer system design and the translation scheme.

A DICTIONARY LOOKUP

This phase of the translation process involves programs LOADTXT and MDL and is distinguished by the implementation of various computer tables that carry information necessary for the accurate translation of the source text. Many of these tables are penetrated through the use of address linkages which point to or locate the expanded information on disk. Codes and addresses are affixed to the source text during this phase and are carried from this phase into SYNTACTICAL ANALYSIS and SYNTHESIS.

FIGS. 2 and 3 illustrate the dictionaries used during DICTIONARY LOOKUP and the way in which they are interconnected by address linkages or offset addresses. LOADTXT (TABLE 1) is the program which executes the instructions for input and work during this phase and separates the words into individual records.

The programs for the actual dictionary lookup are high frequency and idiom lookup and main dictionary lookup. These processes are briefly described below.

(1) High Frequency and Idiom Lookup

FIG. 2 is a generalized sketch illustrating the sequence of operations during High Frequency and Idiom Lookup.

FIG. 7 shows a flow diagram of the LOADTXT program. The source text words are read in and stored in main core memory by the LOADTXT program. As each individual word enters the core memory, the program matches the word against a dictionary of high frequency words which also contain the first words of all idioms. This dictionary is called the HF/IDIOM DICTIONARY. The high frequency words are a relatively small number of frequently encountered words in the source language, such as conjunctions, prepositions, and punctuation marks. Looking these up separately from low frequency words saves considerable search time, since the HF/IDIOM DICTIONARY is kept in core memory and does not have to be brought in from auxiliary disk storage. The important advantage of separating the high frequency words is that the high frequency words do not carry the string of grammar and meaning information on disk that the low frequency words carry. Rather, the high frequency words have their grammar and meaning information separately stored in a dictionary which is later referenced by offset or address linkages. The offset or address linkages indicate the location of the corresponding grammar and meaning information in the core memory. These address linkages are stored with each word in the HF/IDIOM DICTIONARY.

A word that is a high frequency word is detected by a match with a word in the HF/IDIOM DICTIONARY. Then the appropriate address linkages from the dictionary are attached to the source word and are held in a working file known as the HIGH FREQUENCY FILE to be later merged with low frequency source text words a words. If a word, (irrelevant whether it is part of an idiom or not), is not a high frequency word, it is sent directly to a LOW FREQUENCY FILE from which a Dictionary Lookup (MDL) operation is performed.

If a word is the first word of an idiom, it is indicated by a field associated with the word in the HF/IDIOM DICTIONARY. Opon countering, it must be determined whether any of the words following such first word of an idiom could participate in an idiomatic expression. Each idiomatic phrase may have one through seven words to handle the 2nd through 7th possible idiom words. A set of 2nd word through 7th word IDIOM TABLES are provided. The first word idiom words in the HF/IDIOM TABLE have an offset to a word in the 2nd word IDIOM TABLE which has an offset to a word in the 3rd word IDIOM table, etc. Thus, once a first word of an idiom is found, the 2nd word IDIOM TABLE is searched which contains all possible second words that could follow that particular first word in an idiom. The search continues for third, fourth, to a maximum of seven words, until a match is found for a complete idiom phrase. The last idiom word has associated therewith an offset address linkage to a meaning for the particular idiom. The meaning of the entire idiom is then obtained and attached to the first word of the idiom and all words in the idiom are marked as already translated. If the first word is a high frequency word, as well as being the first word of an idiom, it is written in the high frequency file and it receives the same types of codes as the other high frequency words. If the first word of an idiom is a low frequency word, it is written into the HIGH FREQUENCY FILE for the unique purpose of carrying the meaning, otherwise it goes to a low frequency LF) file for processing by MDL.

The words in the LF FILE are then sorted in ascending alphabetical sequence for lookup in the MASTER STEM DICTIONARY by a standard sort program, (not disclosed herein).

(2) Main Dictionary Lookup

FIG. 3 is a generalized sketch illustrating the sequence of operation during execution of the program main dictionary lookup (MDL). FIG. 8 is a flow diagram illustrating the sequence of operation by the program MDL. Main dictionary lookup is handled by the MDL program. The stem words for the source language are kept on disk and are called or brought into core memory by the INITCALL PROGRAM as they are needed. Although not essential to the broader concepts of the invention, a preferred embodiment of the invention has the stems stored on three different disks A, B and C, according to length (1–3 characters, 4–7 characters, 8–24 characters), however, this may be modified to a single disk storage. Each entry contains a source language stem word and attached to each stem in this dictionary are paradigmatic set codes (PST) which signify the endings permitted for that stem. Also, there is an address at the stem in the dictionary which points to a disk location carrying additional grammar and meaning information and to LS information. Information in the dictionary also indicates if each word may function as a principal or supplementary word in an LS expression. Full form entries which need no stem ending comparison for match are also kept in the stem dictionary.

The program main dictionary lookup (MDL) obtains or calls in the words from the LOW FREQUENCY FILE and accumulates them on disk. Then a portion of the text words, along with portions of each of the STEM DICTIONARIES on disks are read into core memory. The stem dictionaries also contain full forms. They are in alphabetic sequence as are the source text words. For each disk of STEM DICTIONARIES, there are two areas in the core. The first area ($A_1$, $B_1$, $C_1$, $X_1$) is filled with a portion of text words and STEM DICTIONARIES for the disks. When this is filled, work begins on it by the IBM 360/65 computer and the second area ($A_2$, $B_2$, $C_2$, $X_2$) is filled with more words or stems. The second area acts as a buffer so that actual work by the computer need not stop to read in more data. Simultaneous work and read-in is accomplished. The words in the LOW FREQUENCY FILE are compared one by one with the stem words in the STEM DICTIONARIES obtaining grammatical and meaning information from the dictionary for each word for which an equality is detected and attaching such grammatical and meaning information with the source word. The above described procedure continues until all low frequency words have been matched in the dictionary.

Figure 36:
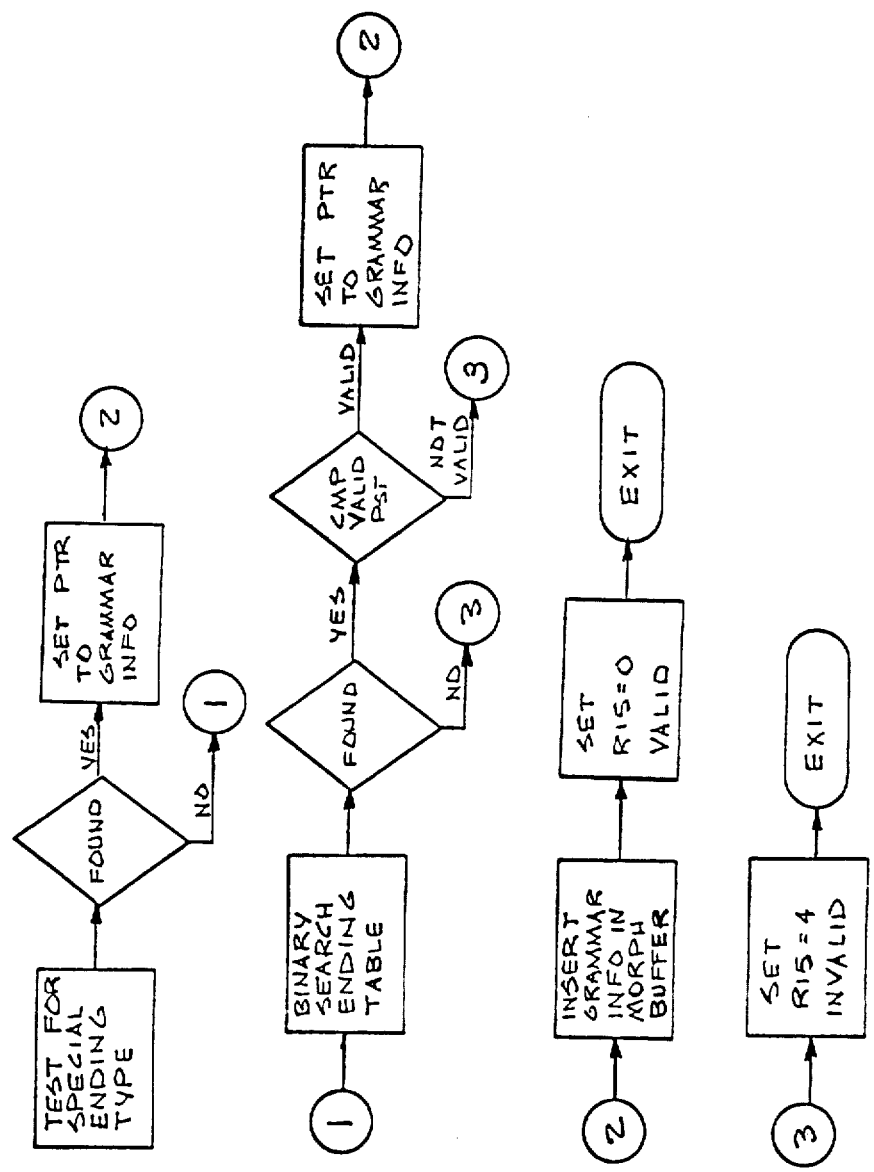
FIG. 36 is a detailed flow diagram illustrating the sequence of operation for the SYSVERB program.

During the dictionary look-up whenever only a portion of the source word matches with the stem, the ending is analyzed to determine whether it is an allowable ending and if so, what additional grammatical information can be derived from the particular stem and ending combination. Each stem belongs to a defined declensional or conjugational pattern. Such patterns are expressed by PST codes. In addition, every word has a code which indicates whether particular declensional or conjugational patterns should be taken into consideration. On the basis of these codes, one of the following three programs may be activated by MDL: RUMO, SYSNOUN or SYSVERB (FIGS. 34, 35 and 36). These programs contain VALID ENDINGS TABLES for every declensional or conjugational pattern of the source language and attach on the basis of such tables grammatical information to the words.

If a word is not in the STEM DICTIONARIES, it is analyzed for its component letters, numbers, and/or endings to establish its possible function and subsequently stored until a sufficient number have been accumulated and printed out in an error list. After all the low frequency words of a text have been looked up, they are sorted back into their original text, and are merged with the HIGH FREQUENCY FILE words which are kept in their original source text sequence, and put into a file known as MERGED FILE. The original sequence of the source text is determined from serial numbers attached to each source word before dictionary lookup commenced.

B. Syntactical Analysis

Figure 9:
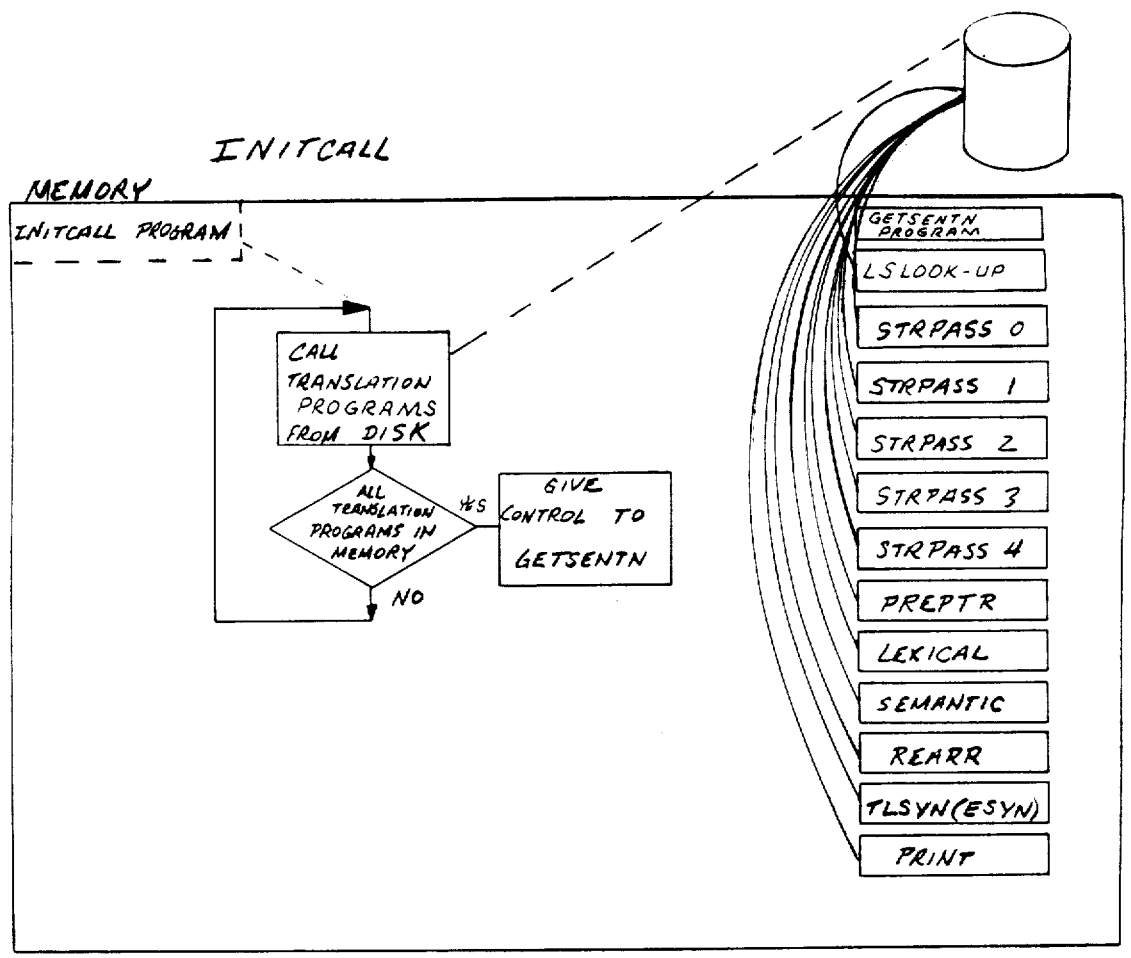
FIG. 9 is a flow diagram illustrating the sequence of operation during the INITCALL program.

The programs GETSENTN through PRINT are initiated and sequentially ordered by the program called INITCALL as generally depicted in FIG. 9.

Figure 10:
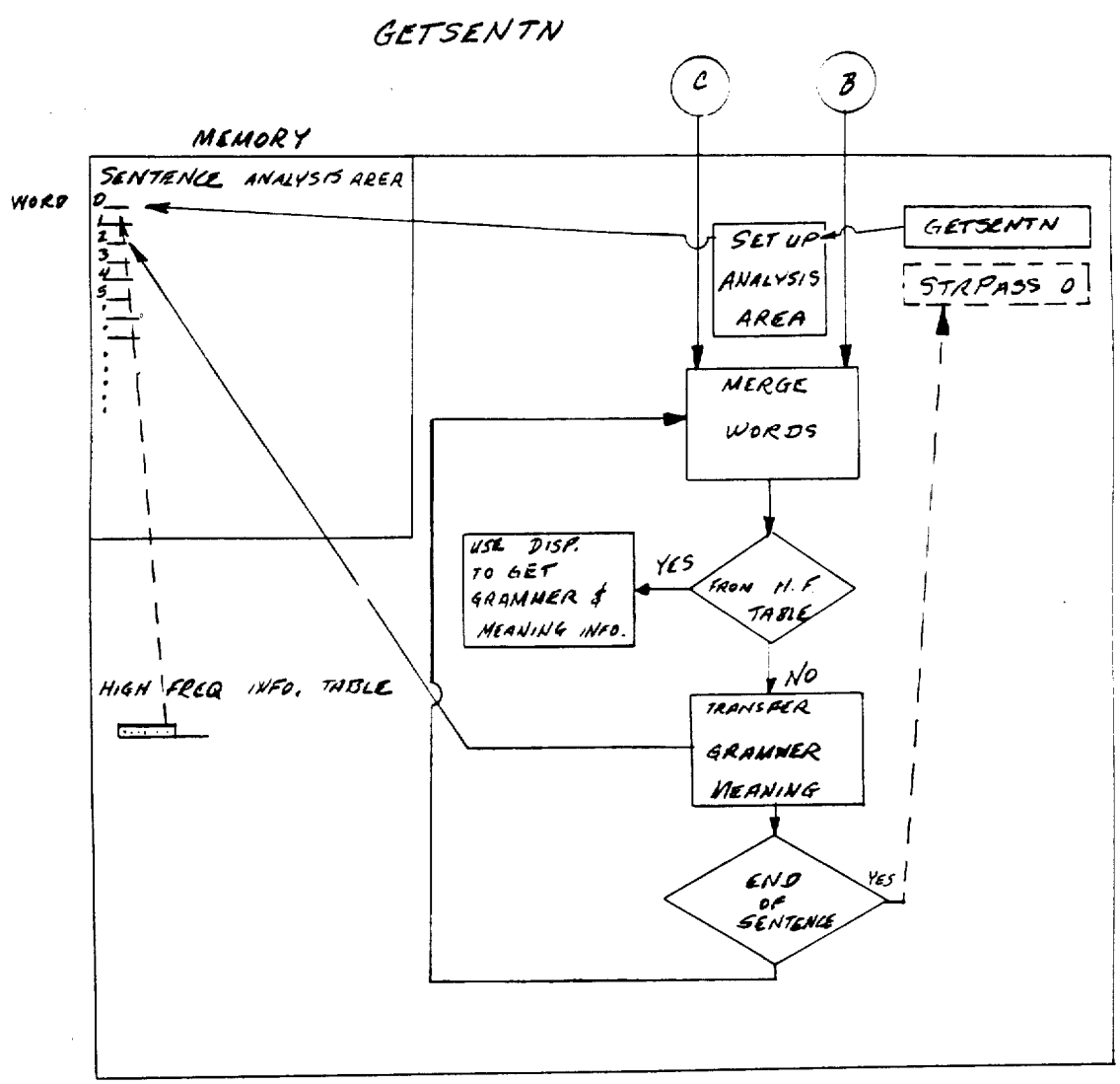
FIG. 10 is a detailed flow diagram illustrating the sequence for the GETSENTN program.

The program GETSENTN, called by INITCALL, initiates the analysis of the words as they function in the sentence. FIG. 10 is a flow diagram illustrating the sequence of operation of GETSENTN. At this time, each separate sentence is handled as the basic unit for structural and syntactical analysis. It is this phase of translation which attempts to compensate for the computer's lack of understanding of the words it reads. GETSENTN first clears the analysis area in the core memory. The sentences are then individually called from the MERGED FILE into the analysis area in the core memory. FIG. 10 is a flow diagram illustrating the sequence of operation by the program GETSENTN. A typical example of a listing or print out of one sentence in the source text and associated information is contained in Table 24.

(1) Lookup of Limited Semantic Expressions (LSLOOKUP)

Lookup of limited semantic expressions is done by the program LSLOOKUP. Before the consideration of words or word groups as entities determined by relative position, a match is done to see if they participate in a limited semantic expression (i.e. multiple meaning is resolved within limited environment). A sketch generally illustrating the sequence of operation during LSLOOKUP is shown in FIG. 6. The lookup is done by scanning the sentence looking for attached tags indicating the word is a possible principal word (this information is attached during DICTIONARY LOOKUP). If a principal word is encountered, then words on both sides of it are examined for tags indicating supplementary words. Such an arrangement is based on the fact that every word in the dictionary carries a unique L. S. number which identifies the word for the purpose of limited semantics. The principal word carries the L.S. numbers of all supplementary words with which they may function in a compound. If a principal word has adjacent supplementary words, then a small work area is built in core memory at these words and a LS COMPOUND DICTIONARY is searched for all compound expressions having that principal word occupying that particular position. A match is then done with the supplementary words. If the words are determined to be participants in a limited semantic expression, the information for the expression is attached to the principal word.

(2) Structural Passes

The structural pass programs are known as STRPASS and operate on each sentence in an area of memory which has been cleaned for this analysis. There are five passes known as. STRPASS-0 through STRPASS-4 and each pass elucidates in some way on the previous one. The information gained during a pass is not static and may be elaborated upon as new information is gained. According to the type of sentence under analysis, certain blanks in the analysis area are gradually filled with information by the five passes. The following gives a description of each:

(a) STRPASS-0

Figure 11:
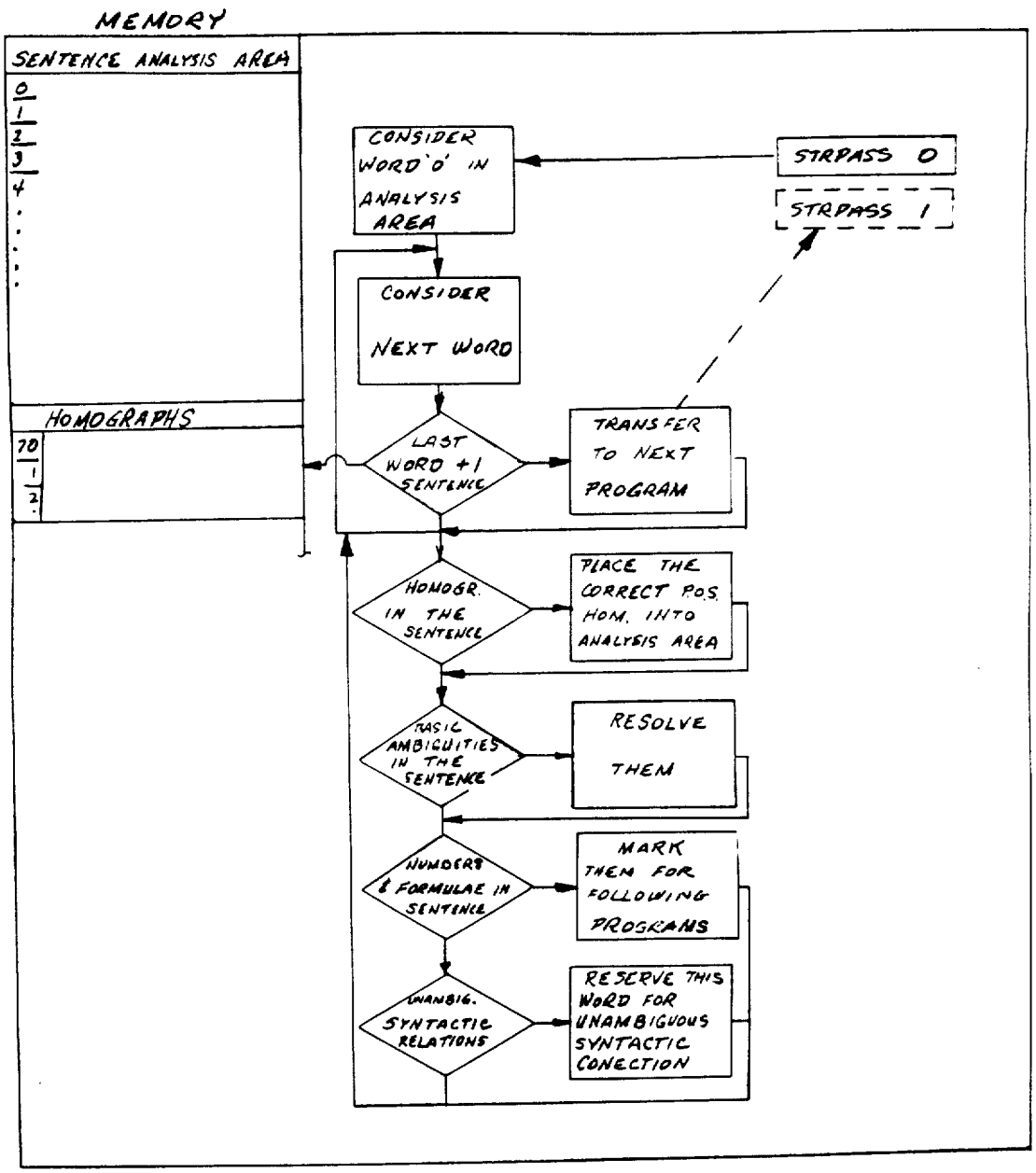
FIG. 11 is a detailed flow diagram illustrating the sequence of operation for the STRPASS0 program.

FIG. 11 is a flow diagram illustrating the sequence of operation during the STRPASS-0 program. STRPASS-0 is a program which, before the actual structural passes are performed, resolves parts of speech ambiguities when they occur. Homograph ambiguities are indicated by the same numeral codes in each language. Special subroutines are accessed through these codes which analyze the relationship of the ambiguous word to other words in the sentence (i.e. their part of speech, POS, and other codes), and determine its part of speech on this basis. The subroutines are adjusted according to the particular source language being used.

Words that are definite objects are recognized and appropriate bits or tags are set on in association with each source word in the analysis area.

(b) STRPASS 1

Figure 12:
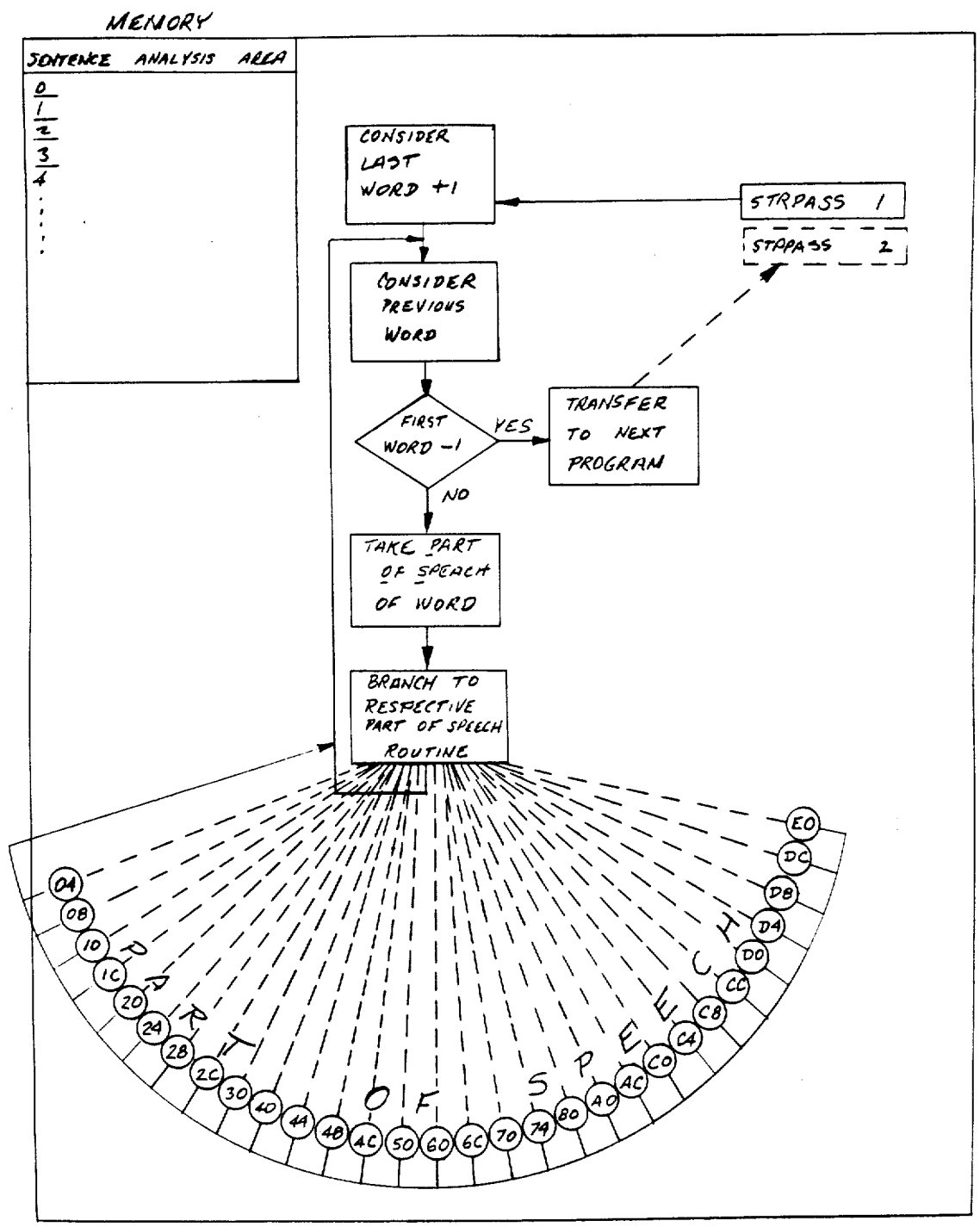
FIG. 12 is a detailed flow diagram illustrating the sequence of operation for the STRPASS1 program.
Figure 13:
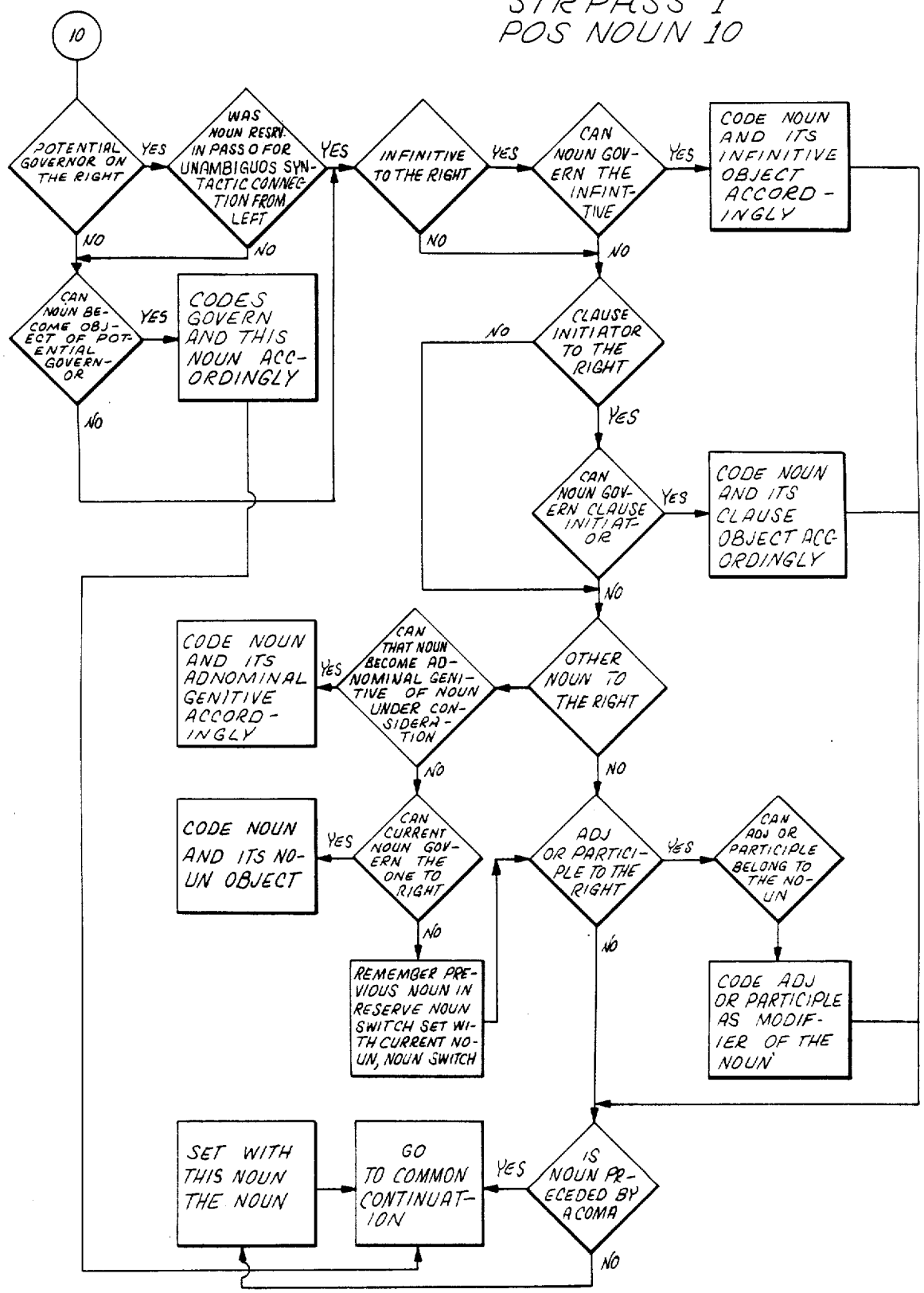
FIG. 13 is a detailed flow diagram illustrating the sequence of operation during the STRPASS1 program for a noun-10 part of speech.
Figure 14:
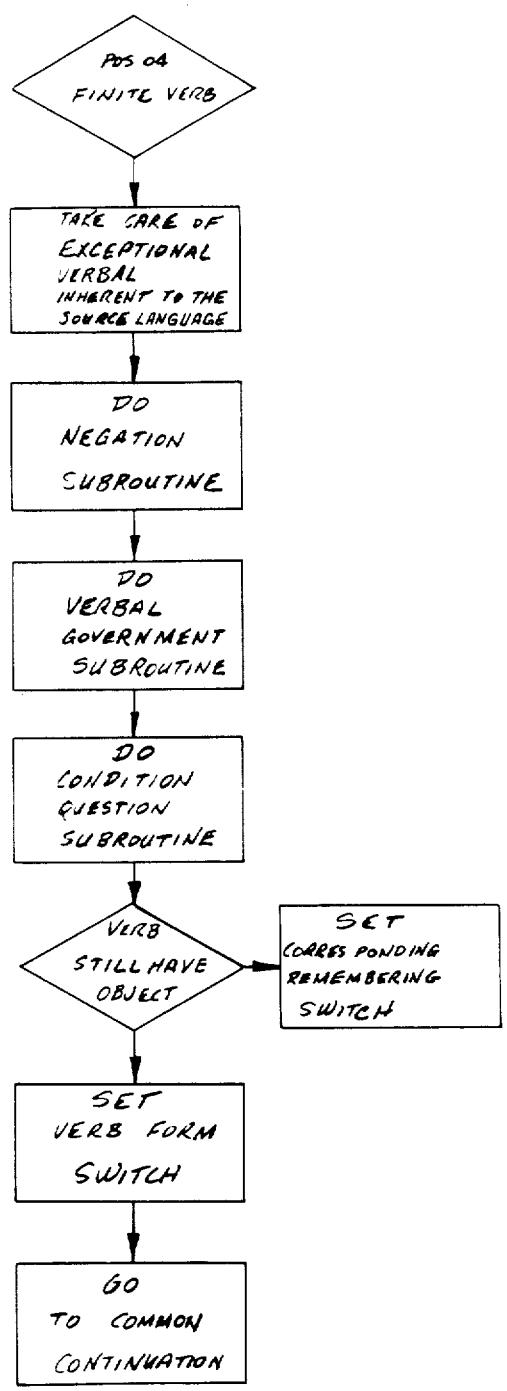
FIG. 14 is a detailed flow diagram illustrating the sequence of operation during the STRPASS 1 program for a verb-04 part of speech.
Figure 15:
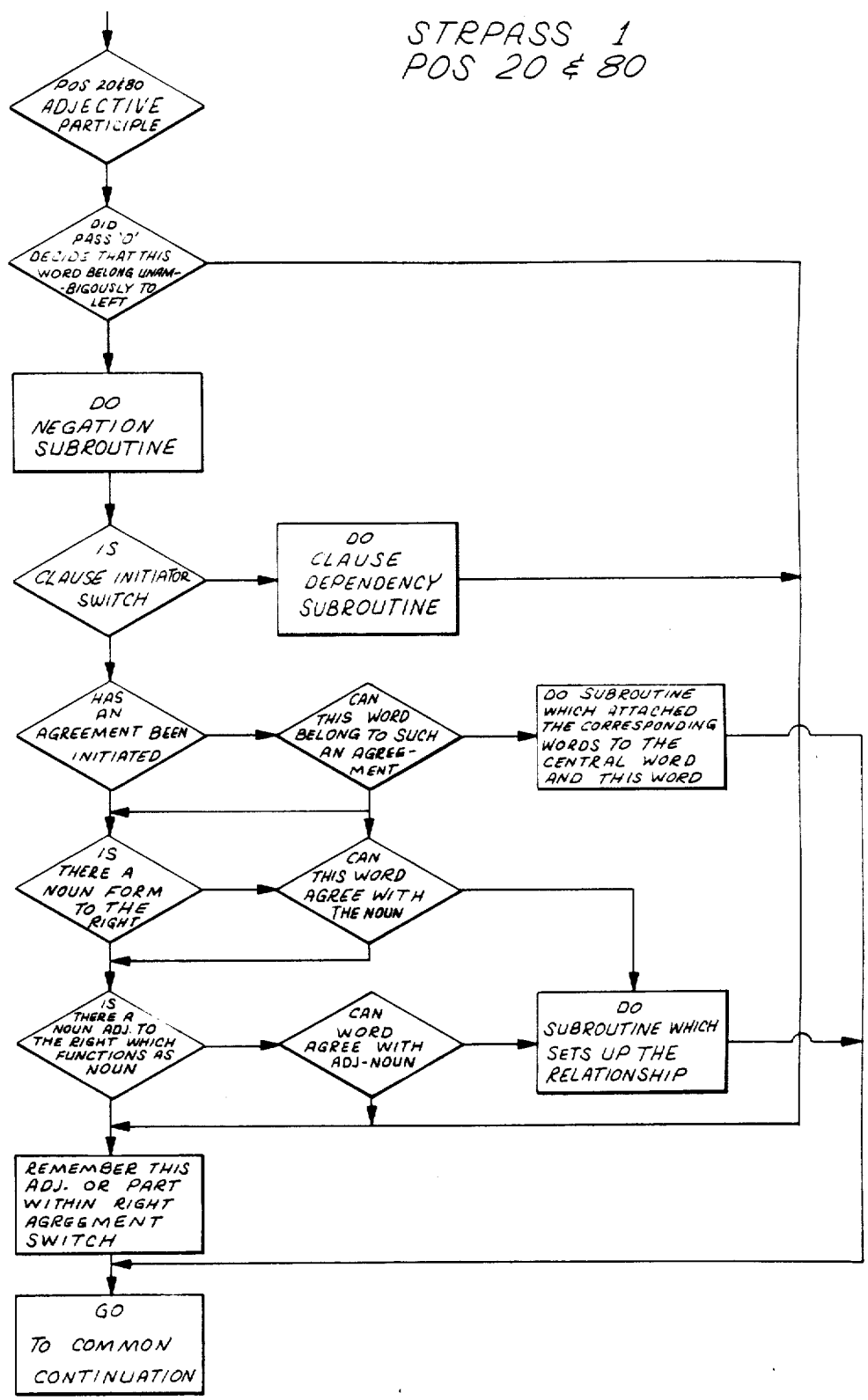
FIG. 15 is a flow diagram illustrating the sequence of operation during the STRPASS 1 program for an adjective participle-20 and 80 part of speech.
Figure 1B:
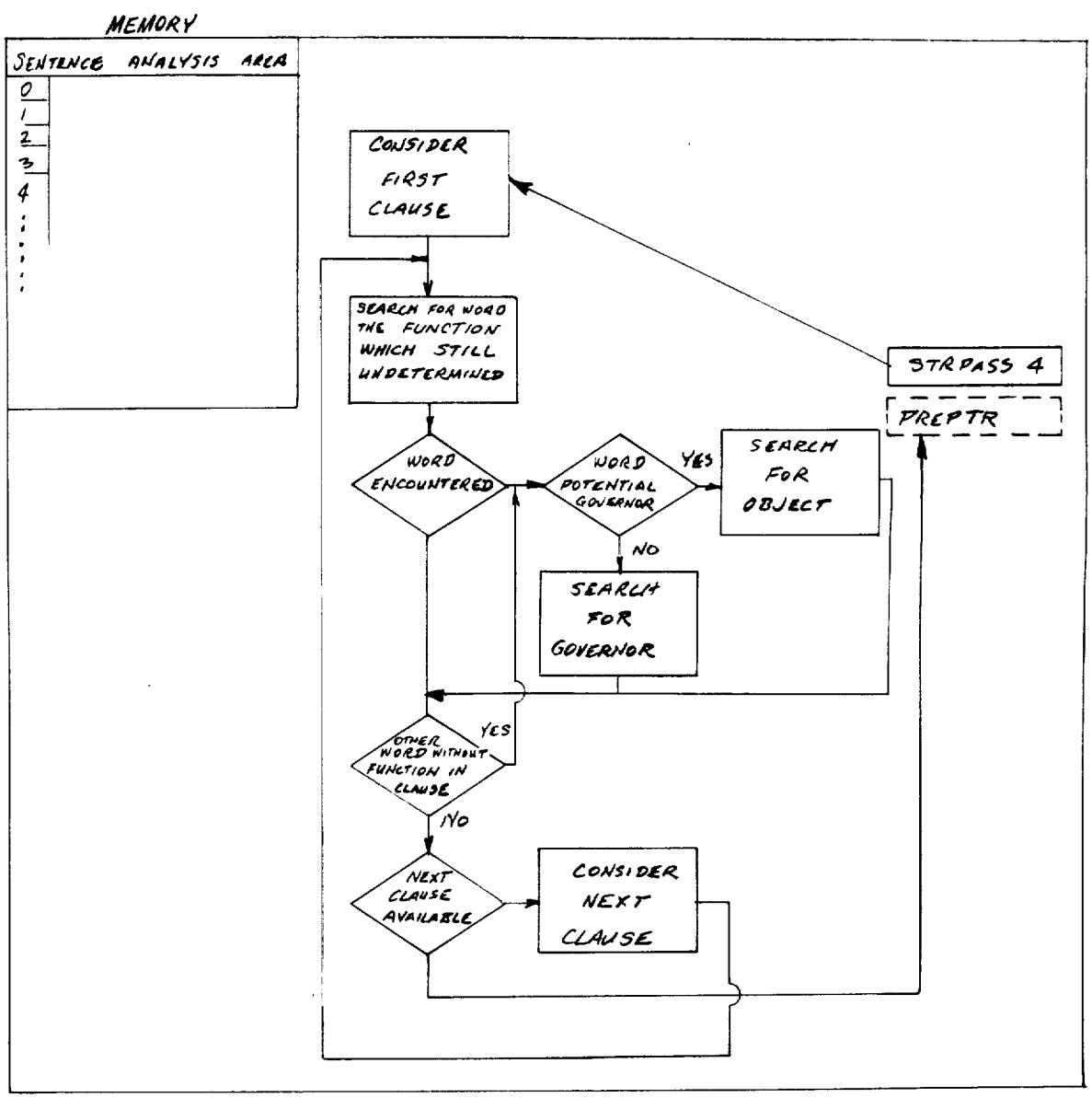
FIG. 1A is a more detailed flow diagram of the SYSTRAN IBM 360/65 operation embodying the present invention.

FIG. 12 is a flow diagram illustrating the sequence of operation during execution of the STRPASS 1 program. STRPASS 1 is a program which moves from the end of the sentence to the beginning as more relationships are established in this manner. Each part of speech code encountered initiates a routine that sets switches or tags associated with each word which indicates its position and possible function. This is made possible by having a dictionary system in which the part of speech (POS) indication is used to initiate selected routines. FIGS. 13, 14 and 15 are flow diagrams illustrating the sequence of operation for the POS noun, POS verb and POS adjective/participle respectively. Although the routines vary according to the source language, the software support for all natural languages is the same. The switches "remember" previously encountered situations and generalized subroutines are called which make decisions on the basis of these switches. For instance, the determination of the definite object of a verbal form is identical for English, Russian, German, French, etc. The consideration of transitivity or case requirement in some languages is an example of the reason for minor variances in subroutines.

(c) STRPASS 2

FIG. 16 is a flow diagram illustrating the sequence of operation during execution of the program STRPASS-2. STRPASS-2 is a program which determines the extent to which commas and conjunctions serve as separators between multiple objects, phrases and clauses. It also carries out specialized routines at quotation marks, dashes, and other punctuation marks that have a function in the language of interest. Each punctuation mark has a POS code by which it it recognized. The POS was previously attached during dictionary lookup. Parentheses are classified according to the type of construction they enclose. Also in this pass, the additional information gained from the recognition of punctuation marks is used to mark structures that were not discovered in STRPASS 1.

(d) STRPASS 3

FIG. 17 is a flow diagram lustrating the sequence of operation during execution of STRPASS-3. STRPASS 3 is a program which locates subject(s) and predicate(s). First a search is carried out for primary predicates based on assigned POS tags attached to the source words. If none of these are available in the sentence, other words which may function as predicates are searched for with the priorities for search being based on the probability of certain parts of speech becoming predicates before others. After the predicate is determined, the subject is searched for. This also proceeds on the basis of probabilities. For example, in the case of Russian and German, nominative nouns are searched for first as they are the primary candidates for subjects. The subjects and predicates must agree in number and gender (if applicable).

Any commas with indeterminate function are analyzed in this pass to see if they serve as subsentence unit separators. The location of the subject and predicate enable the discernment of embedded clauses, and multiple predicates and subjects are recognized and noted by assigning codes.

The discovery of a subject by this pass may modify information previously inserted in the analysis area relative to function that word. For example, if a noun is called an object in STRPASS 1 and STRPASS 3 does not locate a subject and the predicate is a personal verb, the object must become the subject. In this way the input of new information caused a reevaluation of the sentence structure.

(e) STRPASS 4

FIG. 18 is a flow diagram illustrating the sequence of operation during execution of the program STRPASS 4. STRPASS 4 is a program which looks over the entire sentence for words which have not been previously recognized. For instance, if a word has attached tags indicating it requires an object, and no object was found in previous passes, then its object is discovered at this time. Also, a specific feature of this pass is to check whether each word has either a governing or subordinate function. Some words will, of course, be marked twice as being both governors and subordinates. STRPASS 4 continues until all the words of the sentence have been marked with the appropriate codes.

After the structural passes, a number of programs may be used to perform a variety of functions, depending on the target language. For instance, the text sentence may be scanned for article insertion or for the insertion of proper prepositions. Numbers may be assigned to the source language words which may be used in rearranging the target synthesis to correspond to common usage. Special rules may be called to resolve multiple meaning problems. These aspects must be specifically oriented to particular languages and will not be discussed here in depth. These passes are handled by the programs LEXICAL, SEMANTICS, and PREPTR (preposition translation) flow diagrams of which are shown in FIGS. 20, 21 and 19, respectively.

Both the LEXICAL and SEMANTIC programs have their own supervisory programs which decide at which words is the text these programs should go into effect. The LEXICAL program is composed of many individual subroutines. One of these routines will be activates on the basis of the encountered word during translation.

SEMANTIC is a generalized program which is activated each time a mutiple meaning word is encountered which has been supplied with parameters for this program. According to the parameters, the program analyzes in a hierarchical sequence the semantic categories of certain words in the sentence with which the multiple meaning word is in defined syntactic relationship. The semantic categories reflect the semantic properties of the words. Each source language word may belong to one or more semantic categories.

The lexical routines illustrated by FIG. 20 are individual subroutines. Each routine consists of sequences of machine steps which are ccalled into action at the occurrence of specific words in the text to be translated. FIG. 21 illustrates the semantic program which consists of many program units each consisting of sequences of machine steps. The whole program is called each time a word is encountered for which the semantic program is updated with parameters. On the basis of such parameters, certain machine steps of the different program units are carried out.

The lexical routines represent individual approaches to meaning problems within which syntactic transformations are sometimes carried out (i.e., an object of a proposition is made to become a subject). The semantic program is a generalized large program. Sections of this program are activated by parameters expressed in the form of rules and attached to the individual words which may be translated with different meanings.

The lexical routines carry out their task on the basis of checking the environment of the word for which they are called upon. The semantic program analyzes the semantic categories of those words which are in defined syntactic relationships with the word with a meaning ambiguity. The analysis takes place on a hierarchical order indicated by the parameters and rules attached to words with multiple meanings. The types of categories as well as the syntactic connections within which these categories are looked for by the program are also expressed in the form of categories at the individual words which participate in the generalized program.

There is no direct connection between LEXICAL and SEMANTIC. Both are independent program units within the translation system. Both have their own supervisory programs for controlling their operation.

The supervisory program for SEMANTIC is in the Appendix program listing under "Project 3". In the program listings, the label is PROJ3AC and the card number of the instruction B870. If this instruction finds that the word participates in the semantic program, the following instruction loads the address of the Semantic Word Table (SEMWDTBL) to find out for which word the parameters should be used in the generalized program to resolve the multiple meaning of the word.

The supervisory program for the LEXICAL program is at lebel LEX01, card A680 and it continues at labels ACTION (A800) and ACTIONA (A930), where a branch is carried out to search in the LEXTBL (Lexical Table) for the routine which should be activated according to the source word.

C Synthesis into Target Language

The synthesis phase of the translation process is carried out by the programs REARR, TLSYN (ESYN) (Target language synthesis) and PRINT, flow diagrams of which are shown in FIGS. 22 and 24 through 33, respectively. These programs vary somewhat when changing languages depending on the inherent characteristics of the source and target languages. Basically, the synthesis is done by branching on each part of speech. In the case of some parts of speech, tables are interrogated to discover the proper translation. For instance, the verb routines which translate into English, use tables in the computer memory. The tables are selected depending on whether a verb is active, reflexive, or whether the auxiliary 'be' is conjugated. Tables for the translation of the reflexive verbs are further subdivided depending on the types of codes verb reflexive codes (IVB) which exist for the translation of the reflexivity. Each table checks for tense, aspect, person, number, condition, question and negation, and decides accordingly which auxiliary or pronoun should be inserted and what verbal form to be used. TABLES 2-A, 2-B, 2-C and 2-D show a chart of typical verb tables used during synthesis. This approach to synthesizing the target language is completely unique to this system.

During the coding of the source language into the tables, codes are given to the translation which ensure the proper translation. Among these are Topical Glossary Codes (TG) which differentiate between meanings on the basis of the scientific area of interest. In other words, the translation of the word HEAD may be different in the target language, depending upon whether the text being translated is in the area of biology or mechanical engineering.

Since prepositions play a primary role in most languages, a special program handles their translation. This program is known as PREPTR (FIG. 19). This program considers the codes which are available at words which govern the preposition or at the objects which are governed by the preposition. In addition, if necessary, a more extended environment analysis also takes place.

Each language has a unique word order that must be considered when going from one language to another. The program called REARR (FIG. 22) deals with this aspect and contains the rules governing the word order in the target language. These rules, together with the grammatical codes produced, attached to each word of the source language by the System, enable the program to first establish the correct sequence of words symbolically and later to print all the words according to this established sequence.

An article routine known as ARTICLE may be called on if necessary. Such a routine considers the parameters of the source and target languages, to decide where an article should be inserted, if at all, and what kind. The routine functions within the target language synthesis program (TLSYN).

2. Detailed Description of Components of SYSTRAN Translation System

A. Dictionaries

(1) General

Dictionaries are prepared in two formats: (1) for maintenance processing, and (2) for translation processing. Each format is designed with respect to its own operational tasks to provide ease and efficiency during computer processing. All operations involving the dictionaries have been established to operate in a production environment, i.e., large volumes of additions and modifications may be rapidly coded and processed in one continuous computer updating run. This is one of the important features of an embodiment of the present invention.

The master or base dictionaries are those used in maintenance processing and are maintained on magnetic tape. Standard data processing practices are followed in retaining backup cycles of both the master dictionary and updating change transactions to enable recovery from accidental dictionary destruction or updating processing errors. From these dictionaries are created the compact indexed disk dictionaries for fast random access during translation processing.

Table 3 gives a list of the dictionaries of interest.

The master dictionaries consist of two lexical data files. One is the STEM DICTIONARY and the other is an IDIOM/LS EXPRESSION DICTIONARY composed of idioms and Limited Semantics expressions. The translation dictionaries created from these files are STEM LOOKUP AND GRAMMAR DICTIONARY, HIGH FREQUENCY WORD AND GRAMMAR DICTIONARY, IDIOM CORRESPONDENCE DICTIONARY and LIMITED SEMANTICS COMPOUNDS DICTIONARY.

(2) MASTER STEM DICTIONARY

The MASTER STEM DICTIONARY is maintained on magnetic tape in a compound variable length record format. Table 4 illustrates the word format for each entry in the STEM DICTIONARY. The control portion of each entry has a fixed format with record subpart offset pointers (record offset) to variable grammar sections of the record. The grammar sections will be discussed hereinafter. Updating control is on the stem (STEM) and stem number (SN) fields which make up a unique identity of the dictionary record. The stem number (SN) identifies the entry as a stem of a word characterized by inflections which as a set belong to a specific part of speech which is either a noun, an adjective or a verb. Entries that cannot be inflected (prepositions, abbreviations, acronyms, adverbs, etc.), are treated as full foras and are so here recognized. Other pertinent information contained in the field indicates whether the stem can function as a principal and/or supplementary word in a Limited Semantics expression.

The first grammar subpart of the MASTER STEM DICTIONARY entries contains information identified as PART-OF-SPEECH CODES. Here is contained the DPQ and flag byte, the PART-OF-SPEECH CODE, a more detailed PART-OF-SPEECH CODE, and codes specifying the appropriate gender, number, case, person, tense and the paradigms of nouns and adjectives. This subpart is shown in more detail in Table 5 and will be described below.

(a) DPQ and flag byte identify whether
  (1) the stem is a noun, adjective, verb/participle or full form;
  (2) High frequency word;
  (3) Reflexive full-form usage;
  (4) Full-form adjective usage;
  (5) Homograph functional capability;

(b) PART-OF-SPEECH CODE (POS). This is the general PART-OF-SPEECH CODE identifying computer routines to be executed during translation processing.

(c) Basic PART-OF-SPEECH CODE (BPQ). This is a more definitive code to qualify PART-OF-SPEECH functions.

(d) Gender
  (1) Masculine
  (2) Feminine
  (3) Neuter (e) Number
  (1) Plural
  (2) Singular (f) Cases for full-form noun, adjective or participle stems
  (1) Nominative
  (2) Genitive
  (3) Dative
  (4) Accusative
  (5) Instrumental
  (6) Locative (g) Person for full-form verb stems
  (1) First person singular
  (2) Second person singular
  (3) Third person singular
  (4) First person plural
  (5) Second person plural
  (6) Third person plural (h) Tense for full-form finite verb stems; mood
  (1) Present
  (2) Past
  (3) Future
  (4) Imperative (i) PST (paradigmatic set codes) for other than full-form stem entries. These are codes used by morphological analysis programs executed during dictionary lookup to determine the validity of the text word endings with a particular stem The second grammar subpart, of the MASTER STEM DICTIONARY entries is identified as SYNTAX CODES, is illustrated in more detail in Table 6 and contains information of case requirements, prepositional requirements and syntactic function codes. The contents are:

(a) Case determiners
  (1) Genitive
  (2) Dative
  (3) Accusative
  (4) Instrumental
  (5) Locative (b) Prepositional requirements for the Russian words CEREZ, DL4, DO, IZ, IZO, K, KO, NA, OT, PO, POD, PRI, PROTIV, S, U, V, ZA, or any combination thereof.

(c) Miscellaneous requirements including the following Syntactic function codes
  (1) Satisfiable independently by infinitive
  (2) Satisfiable by direct object
  (3) Satisfiable by adverbial form
  (4) Personal/impersonal
  (5) Participle, never adverb
  (6) Noun-adjective
  (7) Relative adjective
  (8) Noun defining adjective (9) Never an adverb, only predicate-adjective short-form-neuter-singular
(10) Verbal aspect
(11) Satisfiable by prepositional phrase
(12) Predicate (short forms or adverbs)
(13) Never predicate
(14) Animateness
(15) Subordinate clause opener The third portion of the grammar part in each MASTER STEM DICTIONARY entry contains case/prepositional translation codes (CASE/PREP CODES) which relate to a table of English prepositions to be used in the translation. The word format is shown in more detail in Table 7. Specifically one embodiment of this invention was the following in the Case/Prepositional Translation Codes:

(a) Translation of the instrumental if the governing word is in the active voice or if there is no governor.

(b) Trars lation of the instrumental if the governing word is in the reflexive form (passive voice). (c) Translation of the dative if the governing word is in the active voice.

(d) Translation of the dative if the governing word is in the reflexive form (passive voice).

(e) Prepositional translation control bytes for ZA, V, VO, S, SO, RADI, PROTIV, PRI, PO,CEREZ, PERED, OT, OKOLO, O, OB, POD, NAD, NA, K, KO, IZ-ZA, IZ, IZO, DO, U.

The fourth and largest subpart of each MASTER STEM DICTIONARY entry contains the target language information such as the Topical Glossary codes, English synthesis codes and the English meaning. Table 8 shows the word format in more detail and indicates:

(a) TG (Topical Glossary code). This code identifies which group of the English meanings is to be used for the technological discipline being translated as the meaning can be considerably different for various types of technical texts. During the translation, multiple Topical Glossary codes may be specified with a preference order for their use and this specification may vary at any point or points in the text.

(b) Target synthesis codes are variable depending on the words involved. By way of example theses codes may include:
(1) Identity of the use of the meaning as a verb, noun, adjective or other
(2) Article usage code
(3) Synthesis code for various forms of the verbs and adjectives and for pluralizing the noun
(4) Specification as to which word in an expression is to be synthesized.

The last part of the grammar portion of each MASTER STEM DICTIONARY entry is called ADDITIONAL VERB STEMS and is present for each verb infinitive and contains a table of all additional forms derived from this infinitive so that these additional stem records may be updated automatically whenever the infinitive is updated. In this manner, it can be assured that all forms of the verb will have the sane grammar codes as the infinitive. The format of the ADDITIONAL VERB STEM is shown in more detail in Table 9.

(3) STEM DICTIONARY UPDATING

A Stem Dictionary Coding Sheet has been designed to make possible that any subpart of the grammar section of the dictionary record may be completely revised or to permit that merely an individual bit of information be changed. This is carried out by Transaction Codes specifying the normal data processing updating functions of "add", "delete", "modify" and "replace".

The dictionary coding sheet entries are keypunched and then processed by the computer programs known as DEDIT and DUPDT (see Table 1) in the updating series which performs editing and formating functions. Since the coding sheet is a general form used for updating all types of dictionary stems, each entry is audited for content and permissible usage with the particular stem being updated. An error list is printed of each deviation and the transaction record is rejected from further processing. Valid transactions are then formated for updating the Master Dictionary.

The valid transactions from the edit program are sorted to a Master Dictionary control sequence (stem and stem number) and matched against the Master File. Upon a match, the Master Dictionary record is disassembled into table area with fixed base locations within the memory of the computer. The Transaction Code of the change entry is examined and the corresponding portion of the dictionary entry is updated. Prior to actual modification of the master record, updating codes, in addition to the transaction code, are examined to insure the validity and accuracy in updating. Any transactions which would result in updating errors are rejected and an Error Listing is prepared.

Since linguistic codes can be developed faster than the Master File format and the programs utilizing the file can be modified, these codes are entered on the General Coding Sheet, but are listed on Future Code Lists. These lists are saved and when the computer system has been modified, the future code lists are reintroduced into the updating process.

Upon completion of updating a master record, it is condensed back into a compact compound variable length record and written out to a new master file. At this time, if the master is a verb infinitive, an updating transaction record is prepared for updating all the additional stem forms of the infinitive. These transactions are sorted to dictionary control sequence and the intermediate new master is read and the updating process is repeated for the additional verb stem modifications. This run produces the final NEW MASTER STEM DICTIONARY.

During the updating run, a printout is provided in which all change transactions are listed by rejection errors, duplicate transactions, and future codes. The MASTER STEM DICTIONARY changes are listed by updated records and deleted records. In addition, a statistical report is prepared giving the counts of updating action, the counts of the different types of stems (full forms, nouns, adjectives, and verbs), and an indication of the length of the longest MASTER STEM DICTIONARY record.

In addition to the listing of dictionary records during the updating process, a separate program is available for listing the entire MASTER STEM DICTIONARY, or selected portions thereof, or particular stem records having certain characteristics. In the latter case, specialized routines with selection criteria can be individually assembled and called by a master dictionary print program through use of processing control cards. The dictionary is printed in characters where words are present and in hexadecimal where bit codes are present.

(4) MASTER IDIOM/L.S. EXPRESSION DICTIONARY

The Master Idiom/L.S. Expression Dictionary is also maintained on magnetic tape in a compound variable length record format. An example of the format of each entry is shown in Table 10. In one embodiment of the invention, there are 3,279 idioms and 156,134 L.S. expressions in the dictionary. The control portion of the record has a fixed format containing the Russian expression and source language codes. This part is followed by a variable length target language section. Included here are the Topical Glossary Code (TG), English synthesis codes (SYN. CODES) and the TARGET MEANING (or English meaning). Multiple Topical Glossary (TG) entries may be present and each may have multiple English meanings attached.

(a) Russian level source codes include:
(1) Prepositional object
(2) Number object
(3) Prepositional object definite article
(4) Verbal type compound
(5) Direct object
(6) Eliminate preposition
(7) Pronoun
(8) Object case (b) The TG code and SYN codes are the same as the entries in the MASTER STEM DICTIONARY.

(5) MASTER IDIOM/L.S. DICTIONARY UPDATING

A separate coding sheet from the stem dictionary coding sheet is utilized to update the Idiom/L.S. Dictionary. Each Topical Glossary target translation record may be updated independently from each other. These coding sheet entries are keypunched and introduced into the updating process beginning with an Editing and Formating Program. Each coding sheet entry is examined for validity of content and the transaction record is rejected if any invalid codes are present with a listing prepared thereof.

The valid coding sheet transactions are formated into a variable length updating record and written to a separate file. This file is sorted to Master Idiom/L.S. Dictionary sequence and then matched on the Russian expression against the dictionary. Matching entries result in either a deletion or replacement. Unmatching entries result in an addition or error of unmatching deletion. During the updating run, a listing is prepared of all transaction activity by addition, replacement and deletion.

A separate program is also available for printing the entire dictionary, portions thereof and records based on a selection criteria. The latter is effected in the same manner as with the stem dictionary print program.

(6) TRANSLATION DICTIONARIES

The dictionaries actually used during SYNTACTICAL ANALYSIS and SYNTHESIS are created from the tape MASTER STEM DICTIONARY and MASTER IDIOM/L.S. DICTIONARY and are located on disks in various forms of lookup dictionaries. All of the dictionaries are interrelated by disk address pointers and memory offset pointers. Three Operating System Programs available from IBM, known as QSAM, BSAM and BDAM, are utilized to access the various dictionaries. The various dictionaries and the table illustrating the word format of each entry in each dictionary are as follows:

(a) STEM LOOKUP AND GRAMMAR TRANSLATION DICTIONARIES (Table 11)
(b) HIGH FREQUENCY WORD AND GRAMMAR DICTIONARIES (Table 12)
(c) IDIOM CORRESPONDENCE DICTIONARY (Table 13)
(d) L.S. COMPOUND MASTER DICTIONARY (Table 14)

The STEM LOOKUP AND GRAMMAR TRANSLATION DICTIONARIES (Table 11) are created in two disk files by the DICTLOAD program. Referring to Table 11, the STEM LOOKUP DICTIONARY is composed of the stem part of the Master Stem Dictionary less the stem number (SN) but including the PST (paradigmatic set) codes. Each stem entry also includes the disk address of the grammar part of the dictionary record (GRAM DISK ADDRESS) and the disk address of the L.S. Compound Dictionary record (LS DISK ADDRESS) if this stem can participate as a principal word in an L.S. expression. The entries in the STEM LOOKUP DICTIONARY are arranged alphabetically and into groups by those stems that begin with the same characters. The first stem determines the first unique beginning characters and a new group is started when a shorter stem is encountered or is not equal on the same beginning characters. Access to the STEM LOOKUP DICTIONARY is accomplished with the program called BSAM to efficiently control access to two of three buffer loads simultaneously. The linkage to the GRAMMAR DICTIONARY and L.S. COMPOUND DICTIONARY is realized by relative track address and byte offset utilizing the program called BDAM, thus enabling all grammar and L.S. information to be randomly accessed. Entries in the STEM LOOKUP AND GRAMMAR DICTIONARIES include all MASTER STEM DICTIONARY records except high frequency words. Thus, words forming part of an idiom are included.

The HIGH FREQUENCY WORD AND GRAMMAR DICTIONARIES are created in two disk files by the program HFC (H. F. creation). The high frequency words are selected from the MASTER STEM DICTIONARY and built into sequential fixed length records containing the high frequency source word and a memory offset (GRAM OFFSET) to the corresponding grammar information which is built into variable length records. The entries are arranged alphabetically by high frequency source word. These dictionaries are later accessed sequentially utilizing the program known as QSAM and loaded in their entirety into core memory during the translation run. The GRAMMAR DICTIONARY is a variable length table with the GRAMMAR OFFSET key located with each high frequency word item. The HIGH FREQUENCY WORD DICTIONARY is a fixed length table which is scanned in a binary search method during translation processing.

The IDIOM CORRESPONDENCE DICTIONARY is separated in two disk dictionaries composed of the source or Russian idiom expression and the corresponding target or English meaning. The target meaning dictionary includes the field: ENG. OFFSET shown in Table 13. The field ENG. OFFSET is an address offset linkage which links the source dictionary part to the target meaning dictionary part. These dictionaries are built in the same computer run that builds the HIGH FREQUENCY WORD DICTIONARY by merging the MASTER STEM and MASTER IDIOM/LS DICTIONARIES selecting high frequency words from the MASTER STEM DICTIONARY and Russian idioms from the MASTER IDIOM/L.S. DICTIONARY. Both files are built as variable length records using the program QSAM and are loaded fully in memory during the translation run. The Russian expressions are located randomly during the translation phase by utilizing binary and sequential searches. The first word of the Russian idiom is located in the HIGH FREQUENCY WORD DICTIONARY. Separate tables for 2nd through 7th possible words in the same idiom are provided. The HIGH FREQUENCY WORD DICTIONARY for the 1st word idiom has a memory offset address (IDIOM OFFSET, table 12) to the second idiom word in the second IDIOM DICTIONARY and the second word has a memory offset address to the third idiom word in the third IDIOM DICTIONARY. Each idiom word in an IDIOM WORD DICTIONARY has a memory offset address to the next idiom word. The words are arranged in the order whereby the longest expression appears first. The corresponding English meaning is located directly with a table byte offset address associated with each Russian idiom.

The L.S. COMPOUND DICTIONARY is created as a randomly accessed file utilizing the program BDAM with a relative track address and byte offset. Six programs are executed to create this dictionary and update the MASTER STEM DICTIONARY with this information. The first four steps (L.S. expression selection and high frequency word lookup, sort, main dictionary lookup and sort), are executed similarly to an actual translation run with the purpose of gathering all L.S. control numbers and grammar information together for each L.S. expression. The following step builds a single L.S. compound record for the principal word of the expression. The principal word is determined by examining the part of speech for each word in the Russian expression. The order for selection is:

(a) Finite verb
(b) Finite auxiliary
(c) Pure noun
(d) Proper noun
(e) Profession or title
(f) Abbreviation
(g) Noun/adjective
(h) Pronoun adjective
(i) Pure adjective
(j) Adverb High frequency words are eliminated from selection as the principal word. If no principal word is determined by the program, the expression is printed for analysis. These records are then sorted by principal word and a Master Dictionary is created. Each L.S. COMPOUND DICTIONARY record is accessed randomly during translation by relative track address and byte offset information associated with each principal word of the Russian expression. The English meaning of each expression compound is located by a byte displacement address to a table of English meanings included in the variable length compound record. Supplementary and principal word indication records are built and information from them is updated in the MASTER STEM DICTIONARY. Additional forms of the verb are updated in a second pass to produce the final updated version of the MASTER STEAM DICTIONARY. The HIGH FREQUENCY and STEM DICTIONARIES are now recreated, reflecting the updated L S. information and are now ready for translation processing.

B Hexadecimal Printout Format

During translation, as the computer analyzes each sentence, it attaches codes to the words to express their interrelationship. On an IBM 360/65 computer system, these codes are expressed using the hexadecimal system. Whenever required, the computer prepared analysis can be printed and a hexadecimal printout is obtained. Table 24 illustrates such a printout. To give a general insight into the content of such a printout, some information is given in the following 1. The subject of the sentence (i.e., its sentence sequence number) is listed at the beginning of each subsentence unit (SSU).

2. The sentence sequence number of the predicate is indicated at the beginning of each subsentence unit (PRED).

3. Each word of the source language is numbered along he left side of Table 24 in the sequence it appears in the sentence.

4. The two pairs of numbers immediately to the right of the sentence sequence number refer to the part of speech (POS) and basic part of speech (BPQ) of the word. 10/10 means that the word is a pure noun; 20/20 is a pure adjective; 40/45 is a finite auxiliary. The assigned part of speech codes are suitable for machine translation purposes and have no necessary correlation to usual grammars.

5. The next word to the right is the word in the source language (i.e. OBYCNY1). In the example given, the word is Russian but transliterated from Cyrillic into the Latin alphabet.

6. Toward the middle of each entry is the translation of the source language word in the target language (i.e. MN—CAN). Articles, prepositions, and auxiliaries are inserted, if necessary, before these words depending on the internal analysis.

The 160 bytes of information after each word are expressed in hexadecimal. Each two digits represent a full byte of information, while one of the pair represents half a byte of information. In order to aid in the location of a particular byte, there are numbers placed among the bytes to act as reference points. These are three digit numbers followed by a dash. In the example, 008- locates byte 8 for the word OBYCNY1, which means that the next pair of digits, i.e. 20, are byte 8. So if, for instance, one were searching for byte 59 for the word OBYCNY1 in the example, one would scan the hexadecimal printout for a number close to 59, in this case 056-, and count over to the third pair of digits, i.e. to digits 01.

In some bytes, the number may be symbolic of a certain condition, for instance, an 08 in byte 50 means that the word must be the object of a preposition. The numbers are written in hexadecimal, that is, an alphanumeric system with a base of 16. The maximum amount that can be written into one byte is FF hexadecimal, i.e. 255 decimal.

7. Byte 008 is a reference number which aids in the quick location of bytes.

8. TG-0 is the Topical Glossary subject field of the translated word.

9. The eight digit (four bytes) following TG- (i.e. 92000104 for OBYCNY1) contain information about the synthesis of the target word (e.g. articles to be inserted, pluralization, etc.).

10. The end of the line following TG- (i.e. ORDINARY for OBYCNY1) is the word or words in the target language from which the translation is obtained. An adjustment is made in the actual translation for tense, etc., and, if the word is a verbal form, the reflexive translation may also be listed here.

C. Example of Operation of SYSTRAN While Translating Between Russian Source and English Target Languages SYSTRAN translation capabilities can be demonstrated through the use of different pairs of languages. The following illustration uses Russian as the source language and English as the target language. A description is given of how the original Russian text is received, how it is read in the computer, and the operations necessary to achieve the final translation.

The selection of the computer for machine translation system is based on its universality. Due to hardware limitations, any large-scale translation system must be written in a language closest to that of the computer. The Russian text to be translated is first typewritten on the IBM magnetic tape Selectric typewriter and recorded in the MTST code on magnetic tape. The information from the MTST tapes is converted and placed onto magnetic tapes which can be read directly by an IBM 360/65 (see FIG. 1). The principles of the applied logic within the translation system could be put into operation on any 3rd generation computer, but it should be reprogrammed in the closest computer language for the particular hardware utilized.

The Russian text recorded in MTST code on tape is translated to IBM 360/65 coded format and recorded on magnetic tape by the Model 9209 converter, manufactured and sold by Litton Systems, Inc. The converter is described in Technical Bulletin TB(S) 69/0001/00C dated Jan. 30, 1970 which is incorporated herein by reference.

The Russian text to be used as an example is taken from a Russian text appearing in Cyrillic characters in the journal *NAUCNOTEXNICESKAIA INFORMATSIIA* (Nov. 6, 1970) entitled "The Evaluation of the Quality of Automatic Translation". By way of example, the steps of translation are given for the fifth sentence of the last paragraph on page 32 of the text.

FIG. 4 illustrates schematically what takes place in the high speed core of the computer at the time the fifth sentence is being read in. For purposes of explanation, the Russian text in MTST coded characters are schematically illustrated in the upper left hand corner of FIG. 1 on magnetic tape 10a. The complete Russian text is actually magnetically recorded on magnetic tape 10a and a conventional magnetic tape transport 10 used in the IBM 360/65 computer system serially reads the text presenting the text for storage in a core memory 12 which also forms a part of the IBM 360/65 computer system. The MTST program accomplishes this operation. The words of the sentence in core memory 12 are illustrated schematically to the left one by one. A continuation is expressed by three dots and the period is the last word. At that time, the core memory already contains three dictionaries read beforehand by the LOADTXT program from disk file 14. The three dictionaries are the HIGH FREQUENCY WORD DICTIONARY, the RUSSIAN IDIOM CORRESPONDENCE DICTIONARY and the ENGLISH MEANING DICTIONARY. The ENGLISH MEANING DICTIONARY contains the English language equivalent(s) for the Russian idioms. All three dictionaries change if the source and target languages change, but the same program, namely, LOADTXT, reads them in and arranges them for the purposes of text processing at the beginning of the translation. Usually during translation, a whole text is read into the computer in one pass. A single sentence was used for illustrative purposes only.

The HIGH FREQUENCY WORD DICTIONARY contains high frequency words as well as first words of idioms. These words are arranged in alphabetic sequence to make core binary search possible.

The Russian IDIOM CORRESPONDENCE DICTIONARY contains idiom tables arranged according to the second and following words of an idiom. Each time a match has been achieved with a word which may function as the first word of an idiom, possible second words to that idiom are matched with following text words.

The ENGLISH MEANING DICTIONARY contains the English equivalents to the idiomatic expressions. The program LOADTXT scans the Russian source text comparing each word for equality with the HF WORD entries in the HIGH FREQUENCY WORD DICTIONARY (see Table 12). When the first word of an idiom is found, the second and subsequent words of idiomatic phrases in the second and subsequent IDIOM DICTIONARIES are compared with subsequent words in the Russian source text. Whenever a complete match has been achieved between sequences of Russian source words and all words for one complete idiomatic phrase in IDIOM DICTIONARIES of the IDIOM CORRESPONDENCE DICTIONARY, the address offset with the last word of the idiom is used to obtain the English equivalent of the idiom is taken from the ENGLISH MEANING DICTIONARY and is attached to the first word of the idiom. A typical selection of the HIGH FREQUENCY WORD DICTIONARY is shown in Table 16. From the selected sentence, the Russian word KOTORYE appears in the H.F. table. As can be seen, most of the forms which can be derived from the Russian stem KOTOR appear as high frequency words. This is due to the fact that these words occur quite frequently in Russian texts introducing qualifying subordinate clauses. All of the words of a text, in this case, of the selected sentence, which were found in the HIGH FREQUENCY WORD DICTIONARY are supplied with a so-called "grammar offset38 . During the translation phase, the GRAMMAR DICTIONARY (see FIG. 4) is kept in the high speed core memory 12 and contains total grammar and target meaning information for the high frequency words. The grammar offset determines how far such grammatical and target meaning information is from a common reference point (i e from the beginning of the table) and in this sense can be referred to as an address linkage.

First words of idioms are indicated in the HIGH FREQUENCY WORD DICTIONARY by special codes in the field named IDIOM OFFSET which is monitored by the LOADTXT program. Whenever the LOADTXT program detects an idiom, the meaning of the idiom is located and is attached to the first word. The LOADTXT program puts text words for which a match has been achieved either as an idiom or as a high frequency word, in a high frequency file on a magnetic tape. All the words for which no match has been achieved are put in a low frequency file.

An idiom in the SYSTRAN System can serve syntactic purposes. The two words "NAPRIMER," (NAPRIMER and the following comma) have been entered as an idiom with the purpose to eliminate the comma from considerations during the syntactic analysis phase, thus assuring the correct location of subject and predicate. It should be noted here that in spite of the fact that a word participates in an idiom, if it is not a member of a high frequency word table, it still undergoes a regular dictionary lookup. As a result, it is written into the so-called "low frequency" file. Although T. and P.

together with the conjunction "I" form an idiom, they still undergo their individual dictionary lookup later, due to the fact that they are not members of the high frequency table.

A typical page of the IDIOM CORRESPONDENCE DICTIONARY is illustrated in Table 17. The idiom I.T.P. occurs as the ninth idiom. The listing of this page illustrates how the idioms are being kept for reference and update purposes. At the beginning of each translation, a program places the words of all idioms into tables. The first word of every idiom is merged with the HIGH FREQUENCY WORD DICTIONARY, consecutive words are arranged in separate tables (i.e. 2nd, 3rd ... 7th IDIOM CORRESPONDENCE DICTIONARIES) and the meanings are placed into the MEANING FILE.

FIG. 5 graphically illustrates the sequence of operation involved in the main dictionary lookup and the type of procedures that take place in the high speed core memory at that time. As mentioned before, all the words which are not found in the HIGH FREQUENCY WORD DICTIONARY are put into a so-called "low frequency" file which was recorded on magnetic tapes. Subsequently, these words are alphabetically sorted and attached with a serial number code identifying their order in the original Russian source text. The words are brought in now in alphabetic sequence into the high speed core memory 12 to undergo the main dictionary lookup.

During main dictionary lookup, the STEM LOOKUP DICTIONARY is used. The dictionary is in the same alphabetic sequence that the text words in the LOW FREQUENCY FILE were sorted into. The dictionary encompasses all the words in the source language and associated with each word grammar codes and meanings in several subject fields are attached. In the case of those languages which are highly inflected, like Russian, the dictionary contains mostly stems and hence the name STEM LOOKUP DICTIONARY.

During the dictionary lookup, a stem and ending analysis takes place and on the basis of such an analysis, additional grammatical information is obtained. Referring to FIG. 5, the first word of the sentence being used as the illustration appears in alphabetic sequence is OBYCNY1.

The illustration shows how this word is matched with the dictionary entry. A portion of the dictionary is presented with the dictionary codes presently available. The dictionary contains OBYCN indicating that this is an adjective and has declensional pattern 197, and also the code "PS" in field L.S. shown in Table 4 indicates that it can be a principal word and a supplementary word of a compound. The word in question has a general meaning "usual". General meaning is given by the fact that after PS there is a zero (0) which means "general glossary". A one (1) means "physics glossary", and a three (3) means "computer glossary". The meanings are "usual", "usual" and "ordinary". Also illustrated here is another entry from the dictionary which, immediately following the word OBCYN0, is in the adverbial form with the meaning "usually".

During dictionary lookup, the program MDL first attempts to match the full word with a dictionary entry. If unsuccessful, then one letter is dropped and comparison is reattempted. If unsuccessful, then a second letter is dropped, and at that point, a match is obtained with OBYCN.

At this juncture, on the basis of the morphological code 197, the routine SYSNOUN within MDL compares the chopped off endings with all allowable endings which may follow this stem to decide a certain form. In this case, the ending is Y1, which means that the stem form functions here as nominative singular masculine. The ending A4 would have been nominative singular feminine. OE would have been nominative neuter singular. OG0 would have been genitive masculine or neuter singular, and also accusative if it refers to an animate being, etc. In addition to obtaining the grammatical codes from the dictionary during dictionary lookup, the operation attaches all other codes from the dictionary (Preposition, Case, Translation, etc ) as well as meanings with synthesis code to the word.

The next text word would be PEREVOD. The illustration presents all the codes and meanings that are attached to PEREVOD in the dictionary and also signifies that PEREVOD has been entered with paradigmatic set number 044. This number indicates that the possible endings that can be attached to this word are A, U, OM, and E in singular, and Y, OV, AM, Y, AMI and AX in plural. After the paradigmatic code number 044, a Russian word appears which indicates an example of the type of declension that may take place with 044.

Note that NOV (appearing at mid-page) carries code number 197, the same code number which is attached to OBYCN. This identical numbering means that both words have the same declension pattern. Such a coding system facilitates the work of the native Russians who are continually adding new words to the low frequency dictionary.

During MAIN DICTIONARY LOOKUP, all the words receive grammatical and target meaning information (with synthesis codes) for all those subject fields in which the words may function with different meanings.

After such a lookup, a sort program sorts the words again into original text sequence using the attached serial number and stores them on tape or disk in a sorted low frequency file. The sorted words are then brought back into the core memory 12 in two files. One is the HIGH FREQUENCY FILE and the other is the RE-SORTED LOW FREQUENCY FILE.

The computer program GETSENTN now merges the words from the two files and for each sentence in the computer memory a so-called analysis area is set up where the sentence can be syntactically analyzed resulting in a computer intermediate language which expresses structure and semantic functions of all the words in the sentence and their syntactic interconnections.

FIG. 6 illustrates schematically that the program LSLOOKUP (LSLU) determines the first two words of the sentence to be a Limited Semantic (L.S.) compound, and the meaning "human translation" was attached instead of "usual" or "ordinary translation".

On the top of the Figure, the first three words of the sentence appear. At this time, the program LSLU reads into the core memory 12 from disk 14 the portions of the LIMITED SEMANTICS DICTIONARY which are relevant to the principal word of this compound, which is PEREVOD. Every expression for which the word PEREVOD (translation "transfer") functions as a principal word is being read into the high speed core memory. A list of entries appears on the bottom left and right sides of the page. The left group contains those LIMITED SEMANTICS DICTIONARY entries where the word PEREVOD appears at the beginning, and the right side contains a few entries where the word PEREVOD appears as a second word preceded by an adjective. The particular matching compound is encircled. The word OBYCN carries an indication (L.S. II) that it may participate in a LIMITED SEMANTICS compound. The LIMITED SEMANTICS record of the word PEREVOD is arranged in a way that first all the compounds are listed where this principal word is the first word then all those where it is the second, third, fourth, and so on. The compound shown here has been located among those expressions where the word PEREVOD functions as the second word of a compound and there is no third member. The reflexive indicator in the second line applies in only those instances when the principal word is a verb, so it can be disregarded in this case. In the comparison area in the high speed core memory (shown) the compounds were looked up belonging to PEREVOD where PEREVOD is the second word of a compound. The LIMITED SEMANTICS numbers L.S. #A23 and L.S. #B39 are attached to the words OBYCN and PEREVOD by the programs CLS1, CLS2 and CLS3 during the creation of the L.S. DICTIONARY FILE. The program LSLU detects the LIMITED SEMANTICS words and compares the L.S. numbers against the LIMITED SEMANTICS entries for PEREVOD. Finding a match between the numbers A23 and B39 attached to PEREVOD and between these same numbers as they occur after dictionary lookup attached to the words in the sentence, this compound is translated by LSLU as "human translation".

The actual L.S. numbers are sequentially assigned each time a new L.S. compound dictionary is generated. They are unique numbers and each word can have only one such number. The numbers are arranged in exactly the same sequence as the words appear in the compounds. A program organizes different groups according to the position of the principal word. Such organization is taken into account during the L.S lookup. As far as this sentence is concerned, only the first two words have been located as an L.S compound, and in the hexadecimal printout which illustrates the generated computer intermediate language there is a corresponding mark indicating that these words form a compound.

Table 18 illustrates a typical page from the listings of LIMITED SEMANTICS compounds. The listings correspond to the arrangement where these compounds are kept on magnetic tapes for update purposes. In order to use the listings during translation, a special program arranges them on disks, assigns each participating word an L.S. number, locates the principal word and sets up an actual direct sub-system of compounds in the source language which is used by the translation system.

Table 24 is a reproduction of a computer printout which illustrates the analysis area in the computer core memory at the time the sentence is analyzed. On the top of the page, the parameter information appears as an exact duplication of the instructions that the system received before being called upon to carry out the translation. It contains those parameters under which the translation should be carried out. Its appearance is only for reference so that when desired, the analyst should be able to locate the conditions under which the System carried out the translation and instructions the System used to carry out the translation. The parameter information is explained later.

The STRPASS programs generate syntactic codes to express the interconnections between words in a sentence. The following describes the most important of the codes generated by STRPASSES for the first eight words of the example Russian sentence shown in FIG. 4.

Byte 111 of the first word contains the sequence number i.e. 02 of the subject of the first sentence unit, and byte 108 contains similar information i.e. 03 of the predicate for the first sentence unit (main clause). These two informations also appear printed separately on the top left side of the Table 24.

Byte 16 of the first word contains the sentence sequence number of the second word (02). This information in this byte expresses the fact that the first word belongs to the second word in an agreement relationship, and the second word is the principal word of the syntactic unit. It can also be said that the first word "points" or is linked to the second word in byte 16.

Byte 26 of the second word points to the first word of the source text indicating that the first word of this agreement relationship is the first word of the sentence.

Byte 21 of the third word, MOJET, points to word 04. The 21-31 relationship expresses an infinitive government structure, i.e., the word which governs the infinitive contains the sentence sequence number of the infinitive (03) in byte 21, while the infinitive contains the sentence sequence number of its governor in byte 31.

Byte 18 of word 04, OBLADAT6, points to the word 05, MASSO1, expressing that the latter is the direct object of OBLADAT6. Byte 28 of MASSO1 points back to word 04, OBLADAT6, expressing the direct object dependency relationship.

Byte 20 of MASSO1 points to word 06, NEDOSTATKOV, and byte 30 of NEDOSTATKOV points back to word 05, MASSO1. These codes express adnominal genitive relationship.

The comma, word 07, has 'FF' in byte 51, expressing that it is making a sentence cut.

The first seven words in the sentence contain 'F1' in byte 140. This 'F1' means that they belong to a main clause. Starting with word 08, the F1 changes to 01, a signalling that a qualifying clause begins.

The qualifying clause initiator KOTORYE contains 06 in byte 52, which means that it refers to the sixth word in the sentence, i.e., to the word NEDOSTATKOV. NEDOSTATKOV contains 08 in byte 52, pointing to KOTORYE.

Word OF is an opening parenthesis (part of speech DO).

All the words which belong to the sentence unit surrounded by parentheses are marked with '50' in byte 148.

The SYSTRAN Dictionaries contain both slashed and single meanings. Sometimes the person who reads the translation prefers two meanings separated by slashes, in the case of multiple meanings. Others prefer the closest possible meaning. The parameter slash indicates to the System that slashed entries should be printed. In the absence of this parameter, each time a slashed entry occurs in the target language, the meaning which most closely reflects the real meaning of the source language is printed.

The parameter entry W indicates that during the translation process, the console typewriter should indicate each time 50 sentences have been translated.

The asterisks indicate the facility to insert additional programs for special printouts, diagnostics, etc. G stands for GETSENTN (get sentence). The syntactic passes 0–4 are denoted by their respective numbers—0, 1, 2, 3, 4. L is the L.S. program. X means Lexical Routines. P represents prepositions, R—rearrangement, E English synthesis, or the synthesis into whatever target language it takes place, D—diagnostics, P—print, and L—Syntactic level program which is only at the end because it was added at a later stage to the system.

Next to the parameter information is the date when the translation was carried out followed by an indication as to which topical glossary had preference during translation. Should no meaning be available in the indicated glossaries, general meanings are used. The sentence sequence number in the translation is next followed by the page number indexing each particular sentence. On the following line, SSU means the subsentence unit. The subsentence units are established during various levels in the analysis phase. Each subsentence unit should have a predicate and a subject if the predicate is not impersonal. The sentence sequence number of the subject and predicate is printed next to the SSU indication. Each time a new subsentence unit begins, there is a new SSU print.

Preceding each source language word is a sentence sequence number. On this same line appear the primary and secondary parts of speed followed by the source language word as it appeared in the input.

Primary parts of speech (POS) broadly reflect the parts of speech function of the word while the secondary POS further specifies such function. Primary POS's have been selected to enable automatic branching and consequently immediate entering of the routines controlled by the parts of speech.

Next is a target language meaning and an indication whether the particular word under consideration functioned as a member of a compound or a member of an idiom. Also between the source language print and the meaning, certain symbolic letters may appear indicating the lexical subroutine which was called upon during the translation of this word. Such lexical routines are arranged on the basis of their symbolic notation in a binary table and each time a particular word occurs which carries an indication that its translation may require a lexical routine a binary search is carried out among the lexical routines to establish which routine should go into effect.

The 160 bytes appearing after each word which is analyzed for translation purposes is a unique SYSTRAN feature. These bytes contain compressed dictionary information, addresses to additional information, and, as a result of the analysis, coded information which reflects the syntactic and semantic interconnections of all words in the sentence. The information placed in these bytes by sequences of programs can also be regarded as a computer intermediate language which analyzed the sentence to such degree that automatic translation of the sentence can be carried out.

The condensed dictionary information, as well as the variable length information which is cross-referenced from the bytes area, is attached to the individual words either as a result of the dictionary lookup or, if the entry was a high frequency word, the displacement was used to retrieve and attach the information from the high frequency grammar and meaning table at the time when the analysis area was set up for the particular sentence.

Table 19 gives a resume of all the information possible in the 160 bytes of the analysis area shown in Appendix A. Tables 20 and 21 show the codes for the primary and secondary parts of speech.

It should be noted here that some modifications take place whenever the part of speech approach is applied to other source languages, although the basic semantic characteristics of the speech structure is used consistently. For example, the Russian qualifying clause initiator KOTORYE carries a particular part of speech code—7C. The same 7C is being applied in every source language which has a corresponding clause initiator. The same approach is used for other clause initiators, for certain types of adverbs, etc.

The contents of the 160 bytes is exhaustive. Additional information, available on the basis of various addresses in the byte fields, is printed after the 160th byte. Such information is, for example, the C/P (case preposition) information which is case translation applicable in the case of those languages which are highly inflected and the words function in different cases. Such cases are translated into the target language by different prepositions which are indicated in the C/P field. In addition, particular source language prepositions must be translated in different ways depending upon what type of codes are attached to the individual words for the translation of prepositions. Word 02 PEREVOD carries the preposition code 14 (in the English Preposition Table, Table 15) for the Russian preposition PRI, meaning that should this word be governed by the Russian preposition PRI, then the translation should be DURING. The same Russian word may also strongly govern the Russian preposition NA (22 on the English Preposition Table) indicating that if PEREVOD governs NA and NA governs in accusative, the translation should be INTO.

The last line contains target meaning information and synthesis codes.

The first word in the sentence, the adjective OBYCNY1, for example, has 90 in the first byte. This indication is made up of the target language part of speech indication (DPQ), which is 80 for adjectives. Added to this is 10, which indicates that AN is used to modify this adjective, since it begins with a vowel. Byte 2 is not used for adjectives at the present time. Byte 3 indicates which word is to be synthesized. In this case, since there is only one word in the English meaning, the number 1 has been placed there. Byte 4 contains the comparative and superlative codes for the adjective. In this case, one can say "more ordinary" or "most ordinary" rather than adding the endings "er" and "est" as, for instance, one would for "black".

The noun PEREVOD, the second word in Byte 1, has 40 indicating the DPQ for nouns. 10 was not added here since the noun does not begin with a vowel. If it had begun with a vowel, a 50 would have been indicated. Byte 2 holds the code for articles. Byte 3 contains the sequence number of the word to be synthesized. In this case, the second word changes. The 04 in Byte 4 indicates that the plural of the noun is made by adding "s".

The verb OBLADAT6 (fourth word) has C0 in Byte 1, which, again is the DPQ of the word. 10 also would have been added if the verb in the English has a vowel beginning. This is used for the participles which are generated from the verb and which may require articles. Also indicated in this byte is the sequence number of the word to be synthesized. It may be left out, as here, if only one word appears in the English meaning. Byte 2 has a code if there is a different meaning in the English for the reflexive form of the verb. Byte 3 contains the code reflecting the choice of translation in English for the verb if it appears in the reflexive in Russian. Byte 4 indicates the conjugation pattern of the verb.

The computer prepared intermediate language, expressed symbolically in the bytes area, makes it possible for a synthesis program to carry out the actual translation. All the computer generated codes as well as target language requirements are taken into consideration during the final translation process. Words are placed into the required form, phrases are built up, and the word order is determined based on the requirements of the target language. If the target language has articles (i.e. English) definite and indefinite articles are placed before noun phrases whenever required. The multiple meaning problems are handled on four levels: idioms, L.S. compounds, lexical routines, and generalized routines to resolve semantic problems. These routines consider the influence of semantic categories within defined syntactic relationships. To words with multiple meanings, generalized routines are attached. They should be interrogated in a sequence as they follow each other.

MEMORY SWITCHES

STRPASS 1 is the most important syntactic pass through the sentence. The program carries out its operation right to left and "remembers" the various conditions with the help of so-called memory switches. These switches are set to remember the types of words that have been encountered previously, and to indicate to the program the type of decision to be made at individual words. Routines are initiated by the parts of speech. The remembering is carried out on the basis of the types of words encountered. Certain words "clear" all these switches, i.e., they signify certain breaks in the sentence in regard to syntactic interconnections.

Table 25 illustrates the sequence with which the switches are set for this analysis field illustrated in Table 24 for the example Russian sentence. Each word in the example is indicated by its sentence sequence number shown to the left in Table 24. After the sentence sequence number all those switches which were "on" at the time the word was analyzed by the program of pass 1, are printed with their symbolic names.

At the time words 1D and 1C are encountered, switches are not yet set.

When 1B is analyzed, the NSW (noun switch) is set by 1C. This is how "P." is remembered.

At word 1A, the reserve noun switch (RNS) is set with word 1C.

At word 19, only the ILI switch is set. This switch was set by the Russian conjunction I at the same time the reserve noun switch was cleared.

At word 18, it can be seen that the noun switch was set with word 19, and that the ILI switch is still on.

At the time word 17 is reached, the noun switch (NSW) and the left agreement unloading switch (LAG) are set, indicating that an agreement relationship started, i.e., word 18 modifies word 19. (After it is established that the preposition (word 17) governs the noun (word 19), both NSW and LAG are cleared).

Word 16 sets the NSW.

The next noun, word 15, causes the noun switch set by word 16, to become a reserve noun switch, while the noun switch is then set by word 15.

Word 14 will be recognized as modifying word 15, and consequently the LAG switch will be set.

When a new noun (word 13) is encountered, the previous noun switch will become a reserve noun switch, and the left agreement unloading switch (LAG) will become a reserve left agreement unloading switch (RLA).

At word 11, the RNS will be set by word 13 since a new noun (word 12) has been encountered. This noun will not set a new switch since it is preceded by a comma, which prevents immediate syntactic relationships to the left. The comma has cleared the reserve noun and reserve left agreement unloading switches, and set the comma switch (COM).

The beginning parenthesis, word OF, part of speech DO clears all the switches.

New switches are set with words OE and OD. (NSW, LAG). After finding that word OC governs OE, and that word OD is in agreement with OE, these switches are cleared.

Word OB, being an infinitive, sets the infinitive (INF) and verb form (VER) switches. After it is established that OA governs the infinitive, only the verb form switch remains.

Due to its particular function, the word KOTORYE sets the NSW. The comma before KOTORYE clears all the switches, and when the word NEDOSTATKOV (06) is encountered, only the comma switch is set. Word 06 sets the noun switch. This switch was changed to the reserve noun switch when word 05, MASSO1, was encountered.

After it is established that word 04 governs the noun switch, such switch is cleared. Word 04 sets the INF switch, which is in turn cleared after it has been established that word 03 governs 04. At that point, only the verb switch and comma switch are set.

Word 02 sets the noun switch, and word 01 the LAG switch. These switches are still on when the beginning of the sentence, i.e., a first zero word (dummy word) is encountered. It should be noted that only by having a word area (160 bytes) cleared and considered before every sentence can it be assured that indications about the status of the first word can be given, and that looping operations can begin with the first word.

The final English target language translation of the Russian source language text shown in FIG. 4 is shown in Table 23.

In addition to the uniqueness of the translation approach, special MACRO instructions were developed to facilitate a more direct communication with the computer. The advantage of these special instructions, expressly developed for machine translation purposes over other computer languages is, that they consider the direct requirements of natural language translation. The MACRO instructions are converted using a special MACRO assembly and this assembly at the same time eliminates most of the coding errors. In the following, the MACRO instructions inherent to the SYSTRAN System are listed with a brief description of their function.

CMPWC—Compare beginning characters of the source language and branch under certain conditions.

CMPWD—Compare source word and branch if certain conditions are met.

CMPWE—Compare the end characters of the source language and branch under certain conditions.

CMPWP—Compare a word pointer (address indication) with another pointer in the sentence.

DICTM—Put in a special meaning or any word overruling any other dictionary meaning.

GOTO—Branch to another location.

IFOFF—Test a switch and branch if off.

IFON—Test a switch and branch if on.

MVEHM—Move the analysis area of a homograph word to replace the analysis area of a word in the original sentence sequence.

SCANL/SCANR—Scan left or right in the sentence, within sentence or subsentence boundaries looking for certain grammar codes, words or any other information pertinent to the translation program. The scan also allows the jumping of words, phrases or clauses.

SETBN—Set a bit on (Indicate certain information in the most economic way).

SETBF—Turn off the information set on.

SETBM—Merge the information in 16 bits (2 bytes).

SETCH—Set a character equal to the value of another character.

SETMA—Set a meaning to appear after the main meaning of a word.

SETMB—Set a meaning to appear before the main meaning of a word.

SETMN—Set the main meaning of a word and mark it translated.

SETMT—Make the source word equal to the target meaning.

SETTR—Mark a word translated.

SETWI—Set indicator equal to sentence sequence number of a word pointed to by a word pointer.

SETWP—Set a word pointer to a specified word or dictionary meaning entry.

SMSG—Provide a snap dump of the analysis area preceded by an identifying message.

SWOFF—Set a memory switch off.

SWON—Set a memory switch on.

TESTB—Test a set of bits relative to another set of bits and branch if the condition is satisfied.

TESTX—Test contents of a series of bits or test character relative to another test character.

The modularity of the translation system enables the inclusion of more MACRO instructions as the necessity during the processing of natural languages arises.

TABLE 1
LIST OF COMPUTER PROGRAMS USED IN SYSTRAN DESCRIPTION

TRANSLATION PROGRAMS

| Name | Description | FIG. No. For Flow Chart | Appendix Showing Listing |
|---|---|---|---|
| MTST | MT/ST text edit and conversion | | F |
| LOADTXT | Initial text scan for high frequency words and idioms | 7 | G |
| MDL | Main dictionary lookup of low frequency words | 8 | H |
| RUMO | RMD word ending analysis program | 34 | I |
| SYSNOUN | SYSTRAN noun/adjective word ending analysis program | 35 | J |
| SYSVERB | SYSTRAN verb word ending analysis program | 36 | K |
| INITCALL | Translation control sequencing | 9 | L |
| GETSENTN | Analysis area creation | 10 | M |
| STRPASS0 | Structural analysis pass 0 | 11 | N |
| STRPASS1 | Structural analysis pass 1 | 12–15 | O |
| STRPASS2 | Structural analysis pass 2 | 16 | P |
| STRPASS3 | Structural analysis pass 3 | 17 | Q |
| STRPASS4 | Structural analysis pass 4 | 18 | R |
| LSLOOKUP | L.S. compound analysis | | S |
| LEXICAL | Multiple meaning analysis on the basis of environment | 20 | T |
| SEMANTIC | Generalized multiple meaning resolution program | 21 | |
| PREPTR | Preposition translation | 19 | U |
| REARR | Rearrangement | | W |
| TLSYN (ESYN) | Target language synthesis (English synthesis, translation) | 24–33 | X |
| PPRINT | Diagnostic print program | 23 | Y |
| TRPRINT | Translation print program | | Z |
| DICTIONARY UPDATING PROGRAMS | | | |
| DEDIT | Stem entry edit | | JJ |
| DUPDT | Stem dictionary update | | A |
| AVSPASS | Additional verb stem update | | NN |
| HFC | High frequency dictionary creation | | II |
| DICTLOAD (DISKLOAD) | Main dictionary load | | KK |
| IEDIT | Idiom/L.S. entry edit | | B |
| IUPDT | Idiom/L.S. dictionary update | | D |
| CLS1 | L.S. expression scan for high frequency words | | |
| CLS2 | L.S. main dictionary lookup for low frequency words | | |
| CLS3 | L.S. compound creation | | DD |
| CLS4 | L.S. dictionary creation | | EE |
| DUPDTLS | Update L.S. information in stem dictionary | | FF |

TABLE 1-continued
LIST OF COMPUTER PROGRAMS USED IN SYSTRAN DESCRIPTION TRANSLATION PROGRAMS

| Name | Description | FIG. No. For Flow Chart | Appendix Showing Listing |
|---|---|---|---|
| DPRINT | Print stem dictionary | | LL |
| IPRINT | Print idiom/L.S. dictionary | | C |
| TGPRT | Print stem topical glossaries | | MM |
| DISPLAY | | | AA |
| LEVELS | | | BB |
| LEXICAL ROUTINES | | | CC |
| MACROS | | | GG |
| PROJ3 | | | HH |

TABLE 2-A
Verb RTN-A (Non-refl. or refl. & IVB = 1)

| | Tense | Aspect | Person | Number | Cond. | Quest. | Neg. | Refl. | Aux. 1 | Pron. A | Aux. 2 | Neg. | Aux. 3 | Verbal Form |
|---|---|---|---|---|---|---|---|---|---|---|---|---|---|---|
| 1 | PR | I | 3 | 1 | | N | N | | | T | | | | 2 |
| 2 | PR | I | 3 | 1 | | N | Y | | | T | 7 | Y | | 1 |
| 3 | PR | I | 3 | 1 | | Y | | | 7 | T | | T | | 1 |
| 4 | PR | I | | | | N | N | | | T | | | | 1 |
| 5 | PR | I | | | | N | Y | | | T | 16 | Y | | 1 |
| 6 | PR | I | | | | | Y | | 16 | T | | T | | 1 |
| 7 | PR | P | | | | | N | | | T | 10 | T | | 1 |
| 8 | PR | P | | | | | Y | | 10 | T | | T | | 1 |
| 9 | PA | | | | N | N | N | N | | T | | | | 3 |
| 10 | PA | | | | N | N | Y | N | | T | 8 | Y | | 1 |
| 11 | PA | | | | N | Y | | N | 8 | T | | T | | 1 |
| 12 | PA | | | | Y | N | | | | T | 11 | T | | 1 |
| 13 | PA | | | | Y | Y | | | 11 | T | | T | | 1 |
| 14 | | | | | | | N | | | | | | | 1 |
| 15 | | | | | | | Y | | | | 7 | Y | | 1 |
| 16 | PA | | | | N | N | N | Y | | T | 5 | | | 4 |
| 17 | PA | | | | N | N | Y | Y | | T | 5 | Y | | 1 |
| 18 | PA | | | | N | Y | | Y | 5 | T | | T | | 1 |

Note:
If B105 = 80φ, consider 3S
If B105 = 40φ, consider not 3S

TABLE 2-B
Verb RTN-B (Refl. IVB = 0 or 2 + Subj. Human)

| | Tense | Aspect | Person | Number | Cond. | Quest. | Neg. | Aux. 1 | Pron. A | Aux. 2 | Neg. | Aux. 3 | Verbal Form | Refl. Pr. |
|---|---|---|---|---|---|---|---|---|---|---|---|---|---|---|
| 1 | PR | I | 3 | 1 | | N | N | | T | | | | 2 | Y |
| 2 | PR | I | 3 | 1 | | N | Y | | T | 7 | Y | | 1 | Y |
| 3 | PR | I | 3 | 1 | | Y | | 7 | T | | T | | 1 | Y |
| 4 | PR | I | | | | N | N | | T | | | | 1 | Y |
| 5 | PR | I | | | | N | Y | | T | 16 | Y | | 1 | Y |
| 6 | PR | | | | | | Y | 16 | T | | T | | 1 | Y |
| 7 | PR | P | | | | | N | | T | 10 | T | | 1 | Y |
| 8 | PR | P | | | | | Y | 10 | T | | T | | 1 | Y |
| 9 | PA | | | | N | N | N | | T | | | | 3 | Y |
| 10 | PA | | | | N | N | Y | | T | 8 | Y | | 1 | Y |
| 11 | PA | | | | N | Y | | 8 | T | | T | | 1 | Y |
| 12 | PA | | | | Y | N | | | T | 11 | T | | 1 | Y |
| 13 | PA | | | | Y | Y | | 11 | T | | T | | 1 | Y |
| 14 | | | | | | | N | | | | | | 1 | Y |
| 15 | | | | | | | Y | | | 7 | Y | | 1 | Y |

Note:
If B105 = 80φ, consider 3S
If B105 = 40φ, consider not 3S

TABLE 2-C
Vert RTN-C (Refl. & IVB = 3 or IVB = 2 & Subj. nφt human)

| | Tense | Aspect | Person | Number | Cond. | Quest. | Neg. | Aux. 1 | Pron. A | Aux. 2 | Neg. | Aux. 3 | Verbal Form |
|---|---|---|---|---|---|---|---|---|---|---|---|---|---|
| 1 | PR | I | 3 | | | N | | | T | 4 | T | | 4 |
| 2 | PR | I | 3 | | | Y | | 4 | T | | T | | 4 |
| 3 | PR | I | 1 | 1 | | N | | | T | 12 | T | | 4 |
| 4 | PR | I | 1 | 1 | | Y | | 12 | T | | T | | 4 |
| 5 | PR | I | | | | N | | | T | 13 | T | | 4 |

TABLE 2-C-continued

| | | | | | | | | Aux. | Pron. | Aux. | | Aux. | Verbal |
|---|---|---|---|---|---|---|---|---|---|---|---|---|---|
| | Tense | Aspect | Person | Number | Cond. | Quest. | Neg. | 1 | A | 2 | Neg. | 3 | Form |
| 6 | PR | I | | | | Y | | 13 | T | | T | | 4 |
| 7 | PR | P | | | | N | | | T | 10 | T | 15 | 4 |
| 8 | PR | P | | | | Y | | 10 | T | | T | 15 | 4 |
| 9 | PA | | 2 | 1 | | N | | | T | 14 | T | | 4 |
| 10 | PA | | 2 | 1 | | Y | | 14 | T | | T | | 4 |
| 11 | PA | | | | N | N | | | T | 5 | T | | 4 |
| 12 | PA | | | | N | Y | | 5 | T | | T | | 4 |
| 13 | PA | | | | Y | N | | | T | 11 | T | 15 | 4 |
| 14 | PA | | | | Y | Y | | 11 | T | | T | 15 | 4 |
| 15 | | | | | | | N | | | | | 15 | 4 |
| 16 | | | | | | | Y | | | 7 | Y | 15 | 4 |

Note:
If B105 = 80 φ, consider 3(N21)
If B105 = 40 φ, consider 3(N21)

TABLE 2-D

Verb RTN - D (SYNCODE = 224)

| | Tense | Aspect | Person | Number | Cond. | Quest. | Neg. | B21 NZ | Aux. 1 | Pron. A | Aux. 2 | Neg. | Aux. 3 | Verbal Form |
|---|---|---|---|---|---|---|---|---|---|---|---|---|---|---|
| 1 | PR | I | 1 | 1 | | N | | | | T | 12 | T | | 6 |
| 2 | PR | I | 1 | 1 | | Y | | | 12 | | | T | | 6 |
| 3 | PR | I | 2 | 1 | | N | | | | T | 13 | T | | 6 |
| 4 | PR | I | 2 | 1 | | Y | | | 13 | T | | T | | 6 |
| 5 | PR | I | | | | N | | | | T | 4 | T | | 6 |
| 6 | PR | I | | | | Y | | | 4 | T | | T | | 6 |
| 7 | PR | P | | | | N | N | | | T | 10 | T | 15 | 6 |
| 8 | PR | P | | | | Y | N | | 10 | T | | T | 15 | 6 |
| 9 | PA | | 2 | 1 | | N | | | | T | 14 | T | | 6 |
| 10 | PA | | 2 | 1 | | Y | | | 14 | T | | T | | 6 |
| 11 | PA | | | | N | N | | | | T | 5 | T | | 6 |
| 12 | PA | | | | N | Y | | | 5 | T | | T | | 6 |
| 13 | PA | | | | Y | N | | | | T | 11 | T | 15 | 6 |
| 14 | PA | | | | Y | Y | | | 11 | T | | T | 15 | 6 |
| 15 | | | | | | | N | | | | | | 15 | 6 |
| 16 | | | | | | | Y | | | | 7 | Y | 15 | 6 |
| 17 | PR-FU | P | | | | N | | Y | | T | 10 | T | | 7 |
| 18 | PR-FU | P | | | | Y | | Y | 10 | T | | T | | 7 |

Note:
If B105 = 80 φ, consider
If B105 = 40 φ, consider  } N 11/21

TABLE 3

MASTER DICTIONARIES

MASTER STEM
MASTER IDIOM/LS EXPRESSION

TRANSLATION DICTIONARIES
STEM LOOKUP AND GRAMMAR

HIGH FREQUENCY WORD AND GRAMMAR
IDIOM CORRESPONDENCE
LIMITED SEMANTICS
HIGH FREQUENCY WORD AND GRAMMAR
IDIOM CORRESPONDENCE
L.S. COMPOUND

TABLE 4

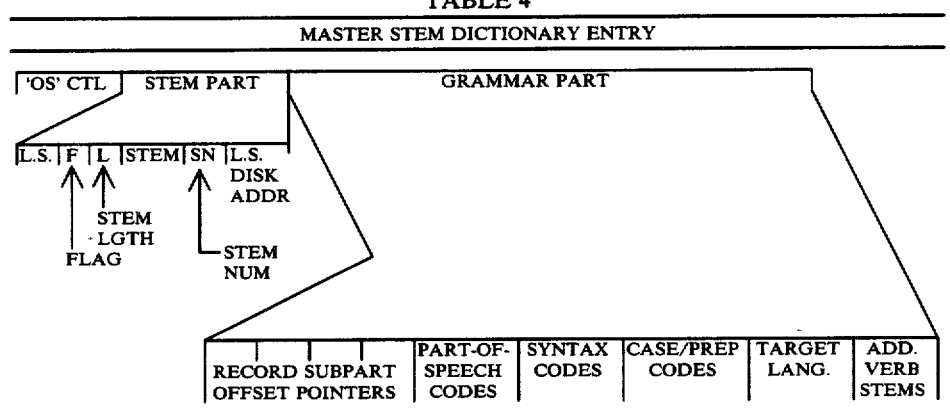

TABLE 5
PART-OF-SPEECH CODES
FULL FORM STEMS
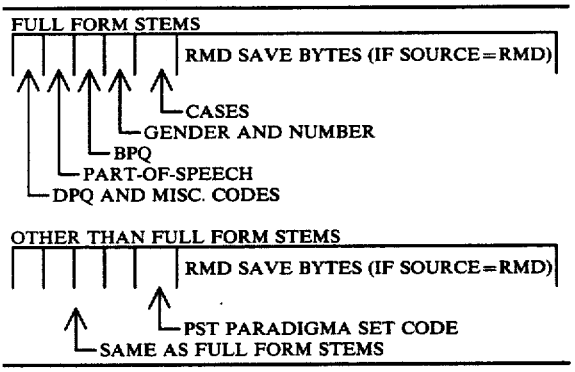
OTHER THAN FULL FORM STEMS
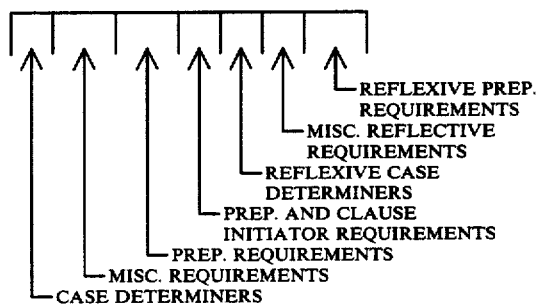
TABLE 6-continued
SYNTAX CODES
(REFLECTIVE INFORMATION AVAILABLE FOR VERBS ONLY)
TABLE 7
CASE/PREPOSITIONAL TRANSLATION CODES
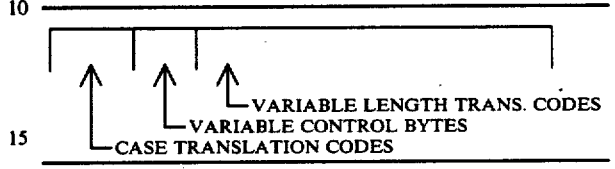
TABLE 8
TARGET LANGUAGE
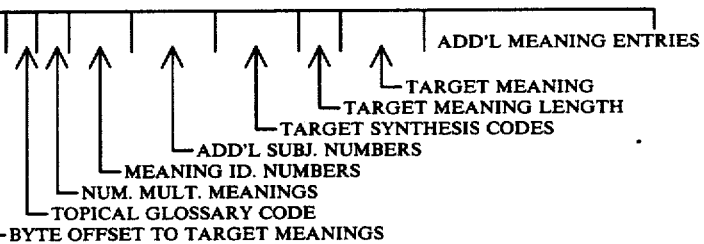
TABLE 9
ADDITIONAL VERB STEMS
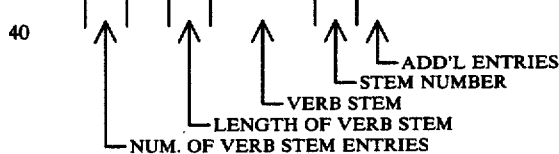
TABLE 6
SYNTAX CODES
TABLE 10
MASTER IDIOM/L.S. DICTIONARY RECORD
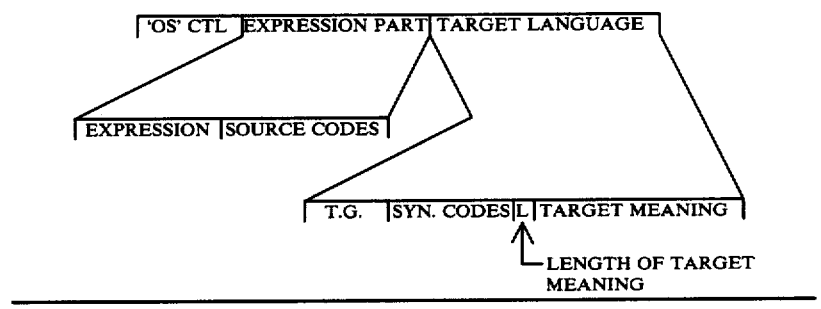

TABLE 11
STEM LOOKUP AND GRAMMAR TRANSLATION DICTIONARIES
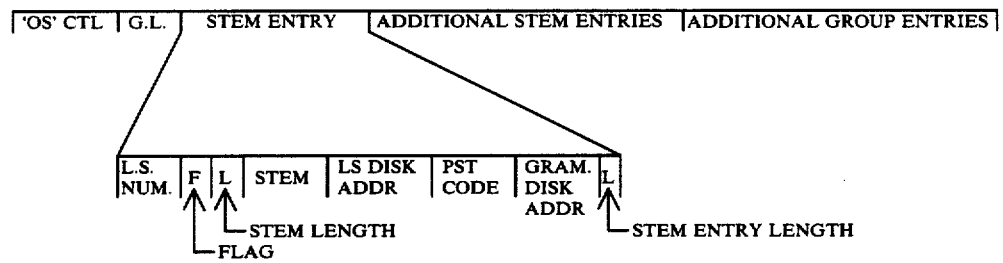
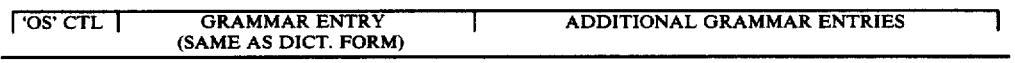
TABLE 12
HIGH FREQUENCY WORD AND GRAMMAR DICTIONARIES
TABLE 12-continued
HIGH FREQUENCY WORD AND GRAMMAR DICTIONARIES
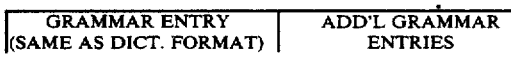
TABLE 13
IDIOM CORRESPONDENCE DICTIONARY
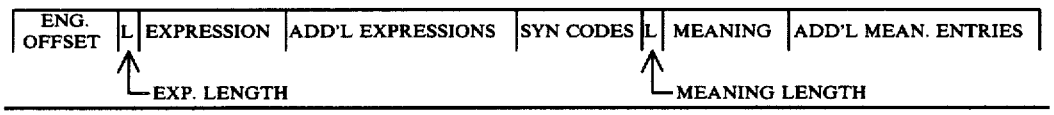
TABLE 14
L.S. COMPOUND MASTER DICTIONARY
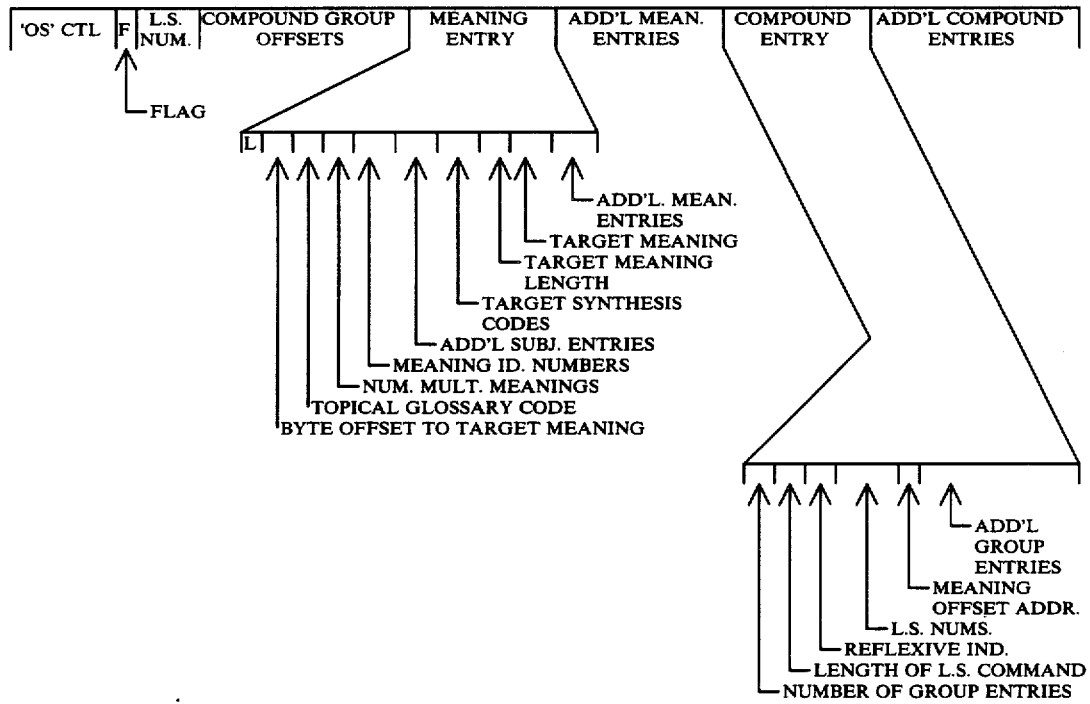

TABLE 15

Listing of English Prepositions

| | |
|---|---|
| 99 No English Preposition to be inserted ("Blank") | 46 DOWN |
| 01 ABOUT | 47 NEXT TO |
| 02 ACCORDING TO | 48 OPPOSITE |
| 03 AFTER | 49 BESIDE |
| 04 AGAINST | 50 BESIDES |
| 05 ALONG | 51 THROUGH |
| 06 AS | 52 PER |
| 07 AT | 53 AROUND |
| 08 AT THE POINT OF | 54 AWAY FROM |
| 09 BECAUSE OF | 55 NEAR |
| 10 BEFORE | 56 DUE TO |
| 11 BEHIND | 57 OF UP TO |
| 12 BEYOND | 58 DOWN TO |
| 13 BY | 59 USING |
| 14 DURING | 60 ON THE BASIS OF |
| 15 FOR | 61 WITH RESPECT TO |
| 16 FOR THE SAKE OF | 62 ONTO |
| 17 FROM | 63 OVER TO |
| 18 FROM BEHIND | 64 IN TERMS OF |
| 19 IN | 65 AS A RESULT OF |
| 20 IN FRONT OF | 66 MADE OF |
| 21 IN THE PRESENCE OF | 67 PRIOR TO |
| 22 INTO | 68 HAVING REACHED |
| 23 OF | |
| 24 OFF | |
| 25 ON | |
| 26 OUT OF | |
| 27 OVER | |
| 28 THROUGH | |
| 29 TO | |
| 30 TOWARD | |
| 31 UNDER | |
| 32 UNTIL | |
| 33 UP TO | |
| 34 WITH | |
| 35 WITHIN | |
| 36 WITHOUT | |
| 37 OUTSIDE | |
| 38 ACROSS | |
| 39 BELOW | |
| 40 BETWEEN | |
| 41 AMONG | |
| 42 SINCE | |
| 43 UPON | |
| 44 AS FAR AS | |
| 45 PAST | |

TABLE 16

EXAMPLE OF CONTENT OF HIGH FREQUENCY WORD DICTIONARY

| STEM | SN | POS-CDS | CPST | RMD-SAVE-BYTES | SYNTAX-CODES | CPS | TARGET-MEANINGS |
|---|---|---|---|---|---|---|---|
| K | | | | | 2000000000000 | S 0 | 00000000 TO |
| | | | | | | | 00000000 TOWARD |
| KAK | 00 | 20 B83300 | 0000 | 0000 | 00000000 00000000 | S 0 | 00000000 FOR |
| | | CASES - (NONE,NONE,NONE,NONE) | | | 07000000 00000000 | | 00000000 AS |
| | | | | | 00000000000080 | | 00000000 WHAT |
| KEM | 00 | 20 747301 | 0800 | | 00000000 00000000 | 0 | 00000000 WHOM |
| | | CASES - (NONE,NONE,NONE,NONE) | | | 01000000 00000000 | | |
| KOGO | 00 | 20 747301 | 4000 | | 00000000 00000000 | 0 | 00000000 WHOM |
| | | CASES - (NONE,NONE,NONE,NONE) | | | 00000000000080 | | |
| KOMU | 00 | 20 747301 | 2000 | | 00000000 00000000 | 0 | 00000000 WHOM |
| | | CASES - (NONE,NONE,NONE,NONE) | | | 02000000 00000000 | | 00000000 WHOM |
| KOTORA4 | 00 | 20 707641 | 8000 | | 00000000 00000000 | 0 | 00000000 WHICH |
| | | CASES - (NONE,NONE,NONE,NONE) | | | 01000000 00000000 | | 00000000 WHO |
| | | | | | | | 00000000 THAT |

TABLE 16 (cont'd)
EXAMPLE OF CONTENT OF
HIGH FREQUENCY WORD DICTIONARY

```
KOTOROE      00 20 707621   9000                    00000000 00000000   0 00000000 WHICH
             CASES -(NONE,NONE,NONE,NONE)           01000000 00000000     00000000 WHO
                                                                          00000000 THAT
KOTOROGO     00 20 7076A1   4000                    00000000 00000000   0 00000000 WHICH
             CASES -(NONE,NONE,NONE,NONE)           01000000 00000000     00000000 WHO

KOTOROM      00 20 7076A1   0400                    00000000 00000000 S 0 00000000 WHICH
             CASES -(NONE,NONE,NONE,NONE)           01000000 00000000     00000000 WHOM

KOTOROMU     00 20 7076A1   2000                    00000000 00000000 .S 0 00000000 WHICH
             CASES -(NONE,NONE,NONE,NONE            00000008000              00000000 WHOM
             PO    -(NONE,ALONG)                    01000000 00000000

KOTORO1      00 20 707641   6000                    00000000 00000000   0 00000000 WHICH
             CASES -(NONE,NONE,NONE,NONE)           01000000 00000000     00000000 WHO

KOTORUH      00 20 707641   1000                    00000000 00000000 S 0 00000000 WHICH
             CASES -(NONE,NONE,NONE,NONE)           01000000 00000000     00000000 WHOM

KOTORYE      00 20 7076E2   0090                    00000000 00000000   0 00000000 WHICH
             CASES -(NONE,NONE,NONE,NONE)           01000000 00000000     00000000 WHO
                                                                          00000000 THAT
KOTORYM      00 20 7076E3   0820                    00000000 00000000 S 0 00000000 WHICH
             CASES -(NONE,NONE,NONE,NONE)           01000000 00000000     00000000 WHOM

KOTORYMI     00 20 7076E2   0008                    00000000 00000000   0 00000000 WHICH
             CASES -(NONE,NONE,NONE,NONE)           01000000 00000000     00000000 WHOM

KOTORYX      00 20 7076E2   0054                    00000000 00000000 S 0 00000000 WHICH
             CASES -(NONE,NONE,NONE,NONE)           01000000 00000000     00000000 WHOM

KOTORY1      00 20 707681   9000                    00000000 00000000 S 0 00000000 WHICH
             CASES -(NONE,NONE,NONE,NONE)           01000000 00000000     00000000 WHICH
                                                                          00000000 WHO
                                                                          00000000 THAT
KROME        00 20 50BB00   0000                    400000000000       S 0 00000000 BESIDES
```

RUSSIAN IDIOM EXPRESSION              R CODES    TG  E CODES   ENGLISH MEANING

```
I , SLEDOVATEL6NO                     80000000   0    00000000 AND THEREFORE
I BEZ TOGO PLOXO                      80000001   0    00000000 IT IS BAD ENOUGH AS IT IS
I DELO S KONQOM                       8000C001   0    00000000 AND THE CASE IS CLOSED
I KONQY V VODU                        8000C001   0    00000000 AND NONE WILL BE THE WISER
I NAOBOROT                            8000C001   0    00000000 AND VICE VERSA
I SLOVOM I DELOM                      8000C001   0    00000000 BY WORD AND DEED
I SOTRUDNIKAMI                        8000C000   0    00000000 AND COAUTHORS
I T. D.                               8000C000   0    00000000 ETC.
I T. P.                               8000C000   0    00000000 AND SO ON
I TAK                                 8000C001   0    00000000 AND THUS
```

TABLE 16 (cont'd)

| RUSSIAN IDIOM EXPRESSION | R CODES | TG | E CODES | ENGLISH MEANING |
|---|---|---|---|---|
| I TOGDA | 80000001 | 0 | 00000000 | AND THEN |
| I TOT I DRUGO1 | 80000001 | 0 | 00000000 | BOTH |
| I V ODMON TOL6KO SLUCAE | 80000001 | 0 | 00000000 | AND IN ONLY ONE INSTANCE |
| I V TOM I V DRUGOM SLUCAE | 80000001 | 0 | 00000000 | IN EITHER CASE |
| I VMESTE S TEM | 80000000 | 0 | 00000000 | AND AT THE SAME TIME |
| I VOT TOMU | 80000001 | 0 | 00000000 | AND SO TO HIM |
| I XOT4 | 80000001 | 0 | 00000000 | AND ALTHOUGH |
| I ZA POSLEDNIE GODY | 80000001 | 0 | 00000000 | ALSO DURING RECENT YEARS |
| I ZA SCET | 80000001 | 0 | 00000000 | ALSO OWING TO |
| I ZA VREM4 | 80000001 | 0 | 00000000 | ALSO DURING THE TIME |
| IDET BO1 | 80000001 | 0 | 00000000 | BATTLE IS FOUGHT |
| ILI NAOBOROT | 80000001 | 0 | 00000000 | OR VICE VERSA |
| ILI NEZADOLGO DO IX NACALA | 80000000 | 0 | 00000000 | OR NOT LONG BEFORE THEIR BEGINNINGS |
| IM UDALOS6. | 80000000 | 0 | 00000000 | THEY MANAGED |
| IMEH5IES4 U NAS | 80000001 | 0 | 00000000 | IN OUR POSSESSION |
| IMEH5I1S4 U NAS | 80000001 | 0 | 00000000 | IN OUR POSSESSION |
| IMENEM ZAKONA | 80000001 | 0 | 00000000 | IN THE NAME OF THE LAW |
| IMENNO KOGDA | 80000001 | 0 | 00000000 | JUST WHEN |
| IMENNO PO3TOMU | 80000001 | 0 | 00000000 | FOR THIS VERY REASON |
| IMET6 V SVOEM SOSTAVE | 80000001 | 0 | 00000000 | INCLUDE |
| IME1TE V VIDU , CTO | 80000001 | 0 | 00000000 | DON'T FORGET THAT |
| INACE GOVOR4 | 80000000 | B | 00000000 | IN OTHER WORDS |
| INOGO PUTI NET | 80000000 | 0 | 00000000 | THERE IS NO OTHER WAY |
| INO1 RAZ | 80000000 | 0 | 00000000 | UNTIL THE NEXT TIME |
| IONIZADIONNA4 KAMERA S METALLIZIROVANNYMI | 80000000 | 0 | 00000404 | METAL WALL IONIZATION CHAMBER |
| ISXOD4 IZ | 80000000 | 1 | 40000000 | ON THE STRENGTH OF |
| ISXOD4 IZ 3TOGO | 80000001 | 0 | 00000000 | HENCE |
| ITAK | 80000001 | 0 | 00000099 | THUS |
| ITAK , CTO | 80000001 | 0 | 00000000 | SO THAT |
| ITAK , CTOBY | 80000001 | 0 | 00000000 | SO THAT |
| ITAK , KAK | 80000001 | 0 | 00000000 | AND SINCE |
| ITAK CTO | 80000001 | 0 | 00000000 | SO THAT |
| ITAK ESLI | 80000001 | 0 | 00000000 | SO IF |
| ITAK KAK | 80000001 | 0 | 00000000 | AND SINCE |
| IZ - ZA | 80000000 | 0 | 00000000 | BECAUSE OF |
| IZ BLAGODARNOSTI | 80000001 | 0 | 00000000 | IN GRATITUDE |
| IZ BO4ZNI | 80000001 | 0 | 00000000 | OUT OF FEAR |
| IZ DIFRAGMY | 80000000 | 2G | 00000000 | CIRCLE-IN |
| IZ DOSTOVERNYX ISTOCNIKOV | 80000001 | 0 | 00000000 | FROM RELIABLE SOURCES |
| IZ GLUBINY DUWI | 80000001 | 0 | 00000000 | VERY SINCERELY |
| IZ GODA , V GOD | 80000001 | 0 | 00000000 | YEAR IN , YEAR OUT |
| IZ GODA V GOD | 80000000 | 0 | 00000000 | FROM YEAR TO YEAR |
| IZ ISKRY VOZGORITS4 PLAM4 | 80000001 | 0 | 00000000 | THE SPARK WILL KINDLE A FLAME |

TABLE 17

EXAMPLE OF CONTENT OF IDIOM CORRESPONDENCE DICTIONARY

| Russian Idiom Expression | R Codes | TG | E Codes | English meaning |
|---|---|---|---|---|
| I, SLEDOVATEL6NO | 80000000 | 0 | 00000000 | and therefore |
| I BEZ TOGO PLOXO | 80000001 | 0 | 00000000 | it is bad enough as it is |
| I DELO S KONQOM | 80000001 | 0 | 00000000 | and the case is closed |
| I KONQY V VODU | 80000001 | 0 | 00000000 | and none will be the wiser |
| I NAOBOROT | 80000001 | 0 | 00000000 | and vice versa |
| I SLOVOM I DELOM | 80000001 | 0 | 00000000 | by word and deed |
| I SOTRUDNIKAMI | 80000000 | 0 | 00000000 | and coauthors |
| I T. D. | 80000000 | 0 | 00000000 | etc. |
| I T. P. | 80000000 | 0 | 00000000 | and so on |
| I TAK | 80000001 | 0 | 00000000 | and thus |
| I TOGDA | 80000001 | 0 | 00000000 | and then |

| | | | | |
|---|---|---|---|---|
| PEREVESTI DUX | 00000000 | 0 | 00000327 | TAKE BREATH |
| PEREVESTI MAWINO1 | 00200000 | 0 | 02000100 | MACHINE TRANSLATE |
| PEREVESTI NA KAL6KU | 00200000 | 7 | 00000100 | TRACE |
| PEREVESTI V TVERDOE SOSTO4NIE | 00200000 | 0 | 01003105 | SOLIDIFY |
| PEREVESTI VZGL4D | 00000000 | 0 | 00000011 | SHIFT GAZE |
| PEREVIAVAEMY1 TUMOR | 00000000 | 0 | 40000204 | TRANSPLANTED TUMOR |
| PEREVIJNO1 DVIGATEL6 | 00000000 | 7 | 00000204 | FIELD ENGINE |
| PEREVOD CISEL | 00000000 | 0 | 40000104 | TRANSLATION OF NUMBERS |
| PEREVOD DNIMOV V SANTIMETRY | 00000000 | 1 | 50000304 | INCH CENTIMETER CONVERSION |
| PEREVOD EDINIQ MKS V EDINIQY SGS | 00000000 | 1 | 40000104 | CONVERSION OF MKS TO CGS UNITS |
| PEREVOD IZ ODNIX EDINIQ MER V DRUGIE | 00000000 | 7 | 00000104 | RECALCULATION |
| PEREVOD PO PREDLOJENI4M | 00000000 | 8 | 00000204 | SENTENCE-FOR-SENTENCE TRANSLATION |
| PEREVOD PO PREDLOJENI4M | 00000000 | 0 | 10000204 | SENTENCE-FOR-SENTENCE TRANSLATION |
| PEREVOD PREDPRI4TI1 NA IZGOTOVLENIE MIRNO7 PRODUKCII | 00000000 | 7 | 00000104 | RECONVERSION |
| PEREVOD PREDPRI4TI4 NA POTOCNOE PROIZVODSTVO | 00000000 | 7 | 00000007 | CONVEYERIZING |
| PEREVOD QEXA NA POTOCNOE PROIZVODSTVO | 00000000 | 7 | 00000007 | CONVEYERIZING |
| PEREVOD REMN4 | 00000001 | 0 | 40000000 | BELT SHIFTING |

TABLE 19

INFORMATION CONTAINED IN EACH BYTE OF INFORMATION IN ANALYSIS AREA

BYTE 0: Word sequence-number in the source language sentence.

BYTE 1: Primary parts of speech indication in the source language.

BYTE 2: Singular cases for nouns, adjectives, participles. Person and number indication for verbs. Individual bit indication for pronouns.

BYTE 3: Plural cases for nouns and adjectives. Tense and mood for verbs.

BYTE 4: Gender and number information for nouns, adjectives, participles, verbs. Additional information for verbs.

BYTE 5: Indication of direct object requirement.

BYTE 6: Various dictionary codes (condensed).

BYTE 7: Various dictionary codes (condensed).

BYTE 8: Secondary parts of speech.

BYTE 9: Codes indicating, with bits, the strong prepositional requirements.

BYTE 10: Codes indicating, with bits, the strong prepositional requirements.

BYTE 11: Some semantic codes, like Human and Inanimate. Codes expressing clause initiators which this word may govern.

BYTE 12: Condensed parts of speech information.

BYTES 13-15: Address in the core storage indicating additional grammatical and meaning information.

BYTE 16: Agreement information. Words that participate in agreement points to the central word of the agreement.

BYTE 17: Agreement relationship where the agreeing word is to the right of the central word. The word points to the central word.

BYTE 18: Government indication. A pointer to the governed word. In the case of multiple government, the pointer in this location points to the last object.

BYTE 19: The same as BYTE 18, in the case that one word has two direct objects. The pointer to the second direct object is indicated.

BYTE 20: Pointer to the adnominal genitive of this word.

BYTE 21: Pointer to the infinitive governed by this word.

BYTE 22: Pointer to a clause initiator governed by the word.

BYTE 23: Pointer to a second clause initiator governed by the word.

BYTE 24: Pointer to a strongly governed preposition. In the case of multiple prepositions, the pointer points to the last preposition.

BYTE 25: The same as BYTE 24 in the case that the particular word governs more than one different preposition.

BYTE 26: A central word of an agreement points to the first word of the agreement.

BYTE 27: A central word of an agreement points to the last word of the agreement which is to the right of this word.

BYTE 28: An object points back to its governor.

BYTE 29: An object points back to its governor, in the case that the same governor has more than one object.

BYTE 30: An adnominal genitive points back to its governor.

BYTE 31: An infinitive points to its governor.

BYTE 32: A subordinate clause initiator points back to its governor.

BYTE 33: A subordinate clause initiator points back to its governor.

BYTE 34: Indications for rearrangement purposes.

BYTE 35: A strongly governed preposition points back to its governor.

BYTE 36: Various types of information relating to subject or non-subject functions, like definite subject, multiple subject, apposition, etc.

BYTE 37: Predicate information. The fact that the word is a predicate or can become a predicate.

BYTE 38: Condensed information. The word is governed by another word.

BYTE 39: Condensed information. The word has a governing function in the sentence.

BYTE 40: Enumeration codes.

BYTE 41: Ambiguity codes on the basis of which they can be resolved.

BYTE 42: Merged case information.

BYTE 43: Cases in which the word finally functions in the sentence.

BYTE 44: Gender and number in which the word has been established to function in the sentence.

BYTE 45: Eliminated government codes. Government codes which are still there after syntactic analysis.

BYTE 46: Eliminated secondary government codes.

BYTE 47: Enumeration pointer.

BYTE 48: Enumeration pointer to a word which is in the same form.

BYTE 49: Pointer to a word which is not in the same form.

BYTE 50: Additional types of information, like types of phrases.

BYTE 51: Indication of subsentence boundaries.

BYTE 52: A relative pronoun has a pointer pointing to the word in the previous subsentence unit which it replaces.

BYTE 53: Miscellaneous data, like the word already translated. For example, some routines translate the word and it should be avoided that the synthesis routine translates it again. Also, indications such as certain words have been rearranged and must be translated differently, or abbreviation indication words cannot have genitive attributes, etc.

BYTE 54: Commands to the target language synthesis program.

BYTE 55: Sequence number of a word if it is a homograph.

BYTE 56: Lexical routine indication.

BYTE 57: Used in the rearrangement program.

BYTE 58: Original dictionary gender number information.

BYTE 59: Sequence with which the word functions in the target language.

BYTE 60: Length of the meaning in the target language to be printed.

BYTES 61-63: Address of the meaning to be printed in the target language.

BYTE 64: Length of the word in the source language.

BYTES 65-84: Contains the word in the source language. The hexadecimal indication of this word appears on the right side above the byte indication and the interpretation of this hexadecimal information appears immediately after the parts of speech.

BYTES 85-87: Address for the information, where data is available, concerning the translation of cases (wherever applicable) and the prepositions.

BYTES 88-90: Limited Semantics number of the particular word. This is a unique number assigned to each word during L.S. update.

BYTE 91: Source language information concerning the origin of the ending. Regular high frequency dictionary, for instance, whether it is a homograph, etc.

BYTE 92: Indication that the word functions in an idiom or L.S. compound and what position the word takes in such an expression.

BYTES 93-95: Address pointing to the possible meanings of an L.S compound principal word.

BYTE 96: Information concerning dashes, short form adjectives and participles. A lexical routine places a code into this byte to indicate whether adverbial endings should or should not be used.

BYTE 97: Pass zero (0) places code into this byte assuring priorities in assigning functions for a participle.

BYTE 98: Type of pronoun, if any, that should be inserted in the target language work synthesis when translating the verbal form.

BYTE 99: Phrase pointer, a comma, which begins a phrase points to a comma which ends the phrase.

BYTE 100: A comma which ends a phrase points to a comma which begins the phrase.

BYTE 101: Indication of the topical glossary from which the target meaning has been taken.

BYTE 102: Temporarily empty.

BYTE 103: Data concerning auxiliaries to be used when translating participles.

BYTE 104: Indication of which preposition should be translated by special subroutine.

BYTE 105: Indication for capitalization.

BYTE 106: Data for saxonic genitives, whenever applicable.

BYTE 107: Data concerning synthesis in the target language.

BYTE 108: The first word of a sentence or sentence unit contains the sentence serial number of the word which functions as predicate. In addition, this information is placed on the top left side of the printout.

BYTE 109: One predicate points to the next predicate within the same sentence unit.

BYTE 110: The first predicate points to the last predicate.

BYTE 111 The first word of a sentence or sentence unit points to the first subject in the unit.

BYTE 112: The first subject in the sentence unit points to the next subject.

BYTE 113: The first subject points to the last subject.

BYTES 114-115: Pointers used to express apposition relationship of the dash.

BYTE 116: Miscellaneous information.

BYTES 117-159: Condensed semantic codes used in generalized programs to translate words with multiple meanings. The bits, in these bytes, express individual semantic categories and, on the basis of syntactic relationships and semantic categories, the correct meanings can be selected during translation.

TABLE 20

TABLE OF CODES FOR PRIMARY PARTS OF SPEECH

| Part of Speech | Meaning | Secondary Parts of Speech |
|---|---|---|
| 00 | | |
| 04 | Finite verb, imperative | 3A, 3B, 3C, 41, 42, 48, 49, 4A, 4B. |
| 08 | Short form adjective or participle | 24, 2C, 37, 82 |
| 0C | Net | 66 |
| 10 | Pure noun | 10 |
| 14 | Proper noun | 11 |
| 18 | Prof or title | 12 |
| 1C | Abbreviation | 13 |
| 20 | Pure adjective or superlative adjective | 20, 28 |
| 24 | Noun adjective ambiguity | 21 |
| 28 | Pronoun adjective | 22 |
| 2C | Ordinal numbers | 25, 26 |
| 30 | Adverb (other than MNOGO, MALO type) TOL6KO, E5E | 30, 32, 34, 35, 6B |
| 34 | MNOGO, MALO type adverbs | 31 |
| 38 | Short form neuter singular adjective or participle | 23, 2D, 81 |
| 3C | JE | 67 |
| 40 | Finite auxiliary | 45 |
| 44 | Infinitive auxiliary | 46 |
| 48 | Infinitive | 43, 44 |
| 4C | Gerund | 80, 89, 8A |
| 50 | Preposition | 51, 52, 53, AO-BF |
| 54 | NE | 65 |
| 58 | EST6 | 47 |
| 5C | A, NO, XOT4, NAPRIMER, ZATO, ITAK, P03TOMU, ODNAKO, POCEM4 | 63, 64 |
| 60 | Comma | 09 |
| 64 | I | 62 |
| 68 | ILI | 62 |
| 6C | Conjunction POKAMEST | 63 |
| 70 | Personal pronouns - only subject | 72 |
| 74 | Personal pronouns - never subject | 73 |
| 78 | EE, EGO, IX | 75, 7B, 7C, 7D |
| 7C | KOTORYl | 76 |
| 80 | Past passive participle | 83 |
| 84 | Present passive participle | 84 |
| 88 | Past active participle | 85, 86 |
| 8C | Present active participle | 87, 88 |
| 90 | CEM | 74 |
| 94 | Comparative, BOLEE, MENEE | 27, 29, 2A, 2B, 2E, 38 |
| 98 | BY | 60 |
| 9C | LI | 67 |
| A0 | Cardinal numbers | 14, 15, 16, 17, 18, 19, 1A |
| A4 | Literal cardinal numbers ending in 11 | 17 |
| A8 | DAJE, particle, DA | 60, 67, 6A |
| AC | Interjection | 68 |
| B0 | Pronouns - subject or not subject | 71 |
| B4 | CTOBY, KOGDA | 59 |
| B8 | KAK | 33 |
| BC | PUST6, SKOL6KO, POSKOL6KU, CTO, GDE, KUDA, OTKUDA, KAK, TOL6KO, IBO | 8A, 8B, 8C, 99, 9A, 9B, 9E |
| C0 | Dash | 03 |
| C4 | Colon | 07 |
| C8 | Quotation mark | 93 |
| CC | Period, semi-colon, exclamation mark, question mark | 05, 06, 08, 92 |
| D0 | Open bracket or open parenthesis | 01, 90 |
| D4 | Closed bracket or parenthesis | 02, 91 |
| D8 | Dots | 04 |
| DC | Disregarded words | |
| E0 | Words not found in dictionary | |
| E4 | DAJE-Adverb conjunction participle ambiguity | 60 |
| E8 | PREJDE-Adverb preposition ambiguity | 36 |
| EC | Mathematical expression characters <, >, =. | 0C |
| F0 | Hyphen | 0B |
| F4 | | |
| F8 | | |
| FC | Comma within idiom | |

TABLE 21

TABLE OF CODES FOR SECONDARY PARTS OF SPEECH

| Parts of Speech | Meaning | Primary Part of Speech |
|---|---|---|
| 00 | | |
| 01 | Open bracket | D0 |
| 02 | Closed bracket | D4 |
| 03 | Dash | C0 |
| 04 | Dots | D8 |
| 05 | Period | CC |
| 06 | Semi-colón | CC |
| 07 | Colon | C4 |
| 08 | Exclamation mark | CC |
| 09 | Comma | 60 |
| 0A | % | DC |
| 0B | Hyphen | F0 |
| 0C | Mathematical expression characters <, >, =. | EC |
| 0D | | |
| 0E | | |
| 0F | | |
| 10 | Pure noun | 10 |
| 11 | Proper noun | 14 |
| 12 | Prof or title | 18 |
| 13 | Abbreviation | 1C |
| 14 | Literal cardinal number 1 | A0 |
| 15 | Written cardinal numbers | A0 |
| 16 | Literal cardinal numbers ending in 1 but not in 11 | A0 |
| 2C | Short form adjective ambiguity | 08 |
| 2D | Short form neuter adjective adverb | 38 |
| 2E | Comparative feminine ambiguity | 94 |
| 2F | | |
| 30 | Adverb | 30 |
| 31 | MNOGO, MALO, Type adverbs | 34 |
| 32 | Old adverb code | 30 |
| 33 | KAK | B8 |
| 34 | MOJNO | 30 |
| 35 | TOL6KO | 30 |
| 36 | PREJDE | E8 |
| 37 | Ambiguity: short form masculine third person plural . | 08 |
| 38 | Comparative participle | 94 |
| 39 | | |
| 3A | ITE second person plural imperative ambiguity | 04 |
| 3B | W6 imperative, second person singular ambiguity | 04 |
| 3C | NULL (LEG) ambiguity imperative | 04 |
| 3D | Predicate - often | 30 |
| 3E | Predicate - rarely | 30 |
| 3F | Predicate - never | 30 |
| 40 | | |
| 41 | Non-reflexive finite verb | 04 |
| 42 | Reflexive finite verb | 04 |
| 43 | Non-reflexive infinitive | 48 |
| 44 | Reflexive infinitive | 48 |
| 45 | Finite auxiliary | 40 |

TABLE 21-continued
TABLE OF CODES FOR SECONDARY PARTS OF SPEECH

| Parts of Speech | Meaning | Primary Part of Speech |
|---|---|---|
| 46 | Infinite auxiliary | 44 |
| 47 | EST6 | 58 |
| 48 | Imperative | 04 |
| 49 | | 04 |
| 4A | | 04 |
| 4B | | 04 |
| 4C | | |
| 4D | | |
| 4E | | |
| 4F | | |
| 50 | | |
| 51 | Old preposition code | 50 |
| 52 | Old preposition code | 50 |
| 53 | Preposition adverb ambiguity | 50 |
| 54 | | |
| 55 | | |
| 56 | | |
| 57 | | |
| 58 | | |
| 59 | CTOBY, KOGDA, ESLI | B4 |
| 5A | | |
| 5B | | |
| 5C | | |
| 5D | | |
| 5E | | |
| 5F | | |
| 60 | DAJE | A8, E4, 98 |
| 61 | | |
| 62 | Connective conjunctions - I, ILI | 64, 68, |
| 63 | Conjunctions - POKAMEST, VVIDU | 5C, 6C |
| 64 | No agreement conjunctions - TOGDA, TAK, T.P., T.K., T.E., T.D., ZATO, ITAK, XOTA, NAPRIMER, TO-EST6, PO3TOMU, ODNAKO, NESMOTR4 | 5C |
| 65 | NE | 54 |
| 66 | NET | 0C |
| 67 | Particle | A8, 3C, 9C |
| 68 | Interjection | AC |
| 69 | | |
| 6A | DA | A8 |
| 6B | E5E | 30 |
| 6C | LIBO, CE1, KAKO1, BUDTO, SLOVNO, KTO, POKA, NEJELI, LIW6, CUT6, EDVA, EJELI | B4 |
| 6D | VOT | DC |
| 6E | | |
| 6F | | |
| 70 | | |
| 71 | Pronouns - subject or not subject | B0 |
| 72 | Personal pronouns - only subject | 70 |
| 73 | Personal pronouns - never subject | 74 |
| 74 | CEM | 90 |
| 75 | EE, EGO, IX | 78 |
| 76 | KOTORY1 | 7C |
| 77 | | |
| 78 | | |
| 79 | | |
| 7A | | |
| 7B | EE | 78 |
| 7C | EGO | 78 |
| 7D | IX | 78 |
| 7E | | |
| 7F | | |
| 80 | Non-reflexive gerund | 4C |
| 81 | Short form neuter singular participle | 38 |
| 82 | Short form participle | 08 |
| 83 | Past passive participle | 80 |
| 84 | Present passive participle | 84 |
| 85 | Non-reflexive past active participle | 88 |
| 86 | Reflexive past active participle | 88 |
| 87 | Non-reflexive present active participle | 8C |
| 88 | Reflexive present active participle | 8C |
| 89 | Reflexive gerund | 4C |
| 8A | PUST6 | BC, 4C |
| 8B | SKOL6KO | BC |
| 8C | POSKOL6KU | BC |
| 8D | | |
| 8E | | |
| 8F | | |
| 90 | Open parenthesis | D0 |
| 91 | Closed parenthesis | D4 |
| 92 | Question mark | CC |
| 93 | Quotation mark | C8 |
| 94 | | |
| 95 | | |
| 96 | | |
| 97 | Paragraph mark | DC |
| 98 | Title mark | DC |
| 99 | CTO | BC |
| 9A | GDE | BC |
| 9B | KUDA, OTKUDA, OTCEGO | BC |
| 9C | | |
| 9D | | |
| 9E | | BC |
| 9F | | |
| A0 | DO | 50 |
| A1 | IZ, IZO | 50 |
| A2 | IZ-ZA | 50 |
| A3 | K, KO | 50 |
| A4 | NA | 50 |
| A5 | NAD | 50 |
| A6 | POD | 50 |
| A7 | O, OB | 50 |
| A8 | OKOLO | 50 |
| A9 | OT | 50 |
| AA | PERED | 50 |
| AB | CEREZ | 50 |
| AC | PO | 50 |
| AD | PRI | 50 |
| AE | PROTIV, PROTIVU | 50 |
| AF | RADI | 50 |
| B0 | S, SO | 50 |
| B1 | U | 50 |
| B2 | V, VO | 50 |
| B3 | ZA | 50 |
| B4 | POSLE | 50 |
| B5 | DL4 | 50 |
| B6 | BEZ | 50 |
| B7 | BLAGODAR4 | 50 |
| B8 | KROME | 50 |
| B9 | MEJDU | 50 |
| BA | VSLEDSTVIE | 50 |
| BB | SREDI, SRED6 | 50 |
| BC | NESMOTR4 | 50 |
| BD | MIMO | 50 |
| BE | VNUTRI | 50 |
| BF | | 50 |
| C0 | TOT | 28 |
| C1 | TOMU | 28 |
| C2 | TE | 28 |
| C3 | TAKO1 | 28 |
| C4 | TOM | 28 |
| C5 | TO | 28 |
| C6 | TOGO | 28 |
| C7 | TEX | 28 |
| C8 | TEM | 28 |
| C9 | TA | 28 |
| CA | TO1 | 28 |
| CB | TU | 28 |
| CC | TEMI | 28 |

TABLE 21-continued

TABLE OF CODES FOR SECONDARY PARTS OF SPEECH

| Parts of Speech | Meaning | Primary Part of Speech |
|---|---|---|
| CD | | |
| CE | | |
| CF | 3TO | 28 |
| D0 | | |
| D1 | | |
| D2 | | |
| D3 | | |
| D4 | VSE | 28 |
| D5 | VSEM | 28 |
| D6 | NIKAK (FULL FORM) | 30 |
| D7 | NIKAK (STEM) | 28 |
| 17 | Literal cardinal numbers ending in 11 | A0, A4 |
| 18 | All other literal cardinal numbers (next to last or last may be . / -) | A0 |
| 19 | Literal cardinal numbers ending in % (010) | A0 |
| 1A | Literal cardinal numbers ending in degree 'K., 'C. | A0 |
| 1B | | |
| 1C | | |
| 1D | | |
| 1E | | |
| 1F | | |
| 20 | Pure adjective | 20 |
| 21 | Noun adjective ambiguity | 24 |
| 22 | Pronoun adjective | 28 |
| 23 | Short form neuter singular adjective | 38 |
| 24 | Short form adjective | 08 |
| 25 | Literal ordinal numbers | 2C |
| 26 | Written ordinal numbers | 2C |
| 27 | Irregular comparative | 94 |
| 28 | Adjective superlative | 20 |
| 29 | Adjective comparative | 94 |
| 2A | Comparative neuter ambiguity | 94 |
| 2B | BOLEE, MENEE | 94 |
| D8 | | |
| D9 | | |
| DA | | |
| DB | | |
| DC | | |
| DD | | |
| DE | | |
| DF | | |
| E0 | | |
| E1 | | |
| E2 | | |
| E3 | | |
| E4 | | |
| E5 | | |
| E6 | | |
| E7 | | |
| E8 | | |
| E9 | | |
| EA | | |
| EB | | |
| EC | | |
| ED | | |
| EE | | |
| EF | | |

TABLE 23

SYSTRAN TRANSLATION OF RUSSIAN SENTENCE SHOWN IN FIG. 4

Human translation can possess a mass of deficiencies, which can in principle be absent from machine translation (for instance, the hypertrophy of the features of the individual style of a human translator in the translated text and so on).

TABLE 24

```
SSU SUBJ-02    PRED-03
01 2020 OBYCNY1                                    L4 MN-
   002-900081 000001 008-20000000 41024967 016-020000000 00000000 024-000000000 00000000 00000000 032-000000000 00000000 040-0000    D6C2-8C3D5E8F1
   042-901081 000000 048-00000000 00800000 056-000000001 00000000 084-400000000 00F09E80 00000000 092-000000004 00000000 100-00F30000 00020000
   108-030000 020000 114-00000000 00000000 122-000000000 00000000 130-000000000 00000000 00000000 138-0000F100 00000000 146-00000000 00000000
   154-000000 000000 C/P-
   TG-3  92000104 ORDINARY
02 1010 PEREVOD                                    L3 MN-HUMAN TRANSLATION
   002-900081 000003 008-10900820 80024F0F 016-000000000 00000000 024-000000100 00000000 00000100 032-000000000 80000008 040-0000    D7C5D9C5E5D6C4
   042-908081 000000 048-00000000 00000000 056-000008002 1104C5A0 084-400249E8 0116BC40 00000000 092-000000003 00000000 100-00F30000 00000000
   108-030000 000000 114-00000000 00000000 122-000000000 00000000 130-000000000 00000000 00000000 138-0000F100 00000000 146-00000000 00000000
   154-000000 000000 C/P-00000000 PRI  -0014 NA  -22000000
   TG-3  40040204 HUMAN TRANSLATION
03 0441 MOJET                                MOC6R     MN-CAN
   002-2080E1 008080 008-41000060 10027700 016-000000000 00040000 024-000000000 00000000 00000000 032-000000000 00800021 040-0000    D4D6C1C5E3
   042-A020E1 000000 048-00040000 00800000 056-00BC00C3 0305271C 084-400000000 00C34D20 00000000 092-000000000 00000000 100-00000000 00000000
   108-000000 020000 114-00000000 00000000 122-000000000 00000000 130-000000000 00000000 00000000 138-0000F100 00000000 146-00000000 00000000
   154-000000 000000 C/P-
   TG-   00000000 CAN                          MN-POSSESS
04 ;343 OBLADAT6
   002-000010 080081 008-43000004 10024AA7 016-000000500 00000000 024-000000000 00000000 00000003 037-000000000 00002080 040-0000    D6C2D3C1C4C1E3F6
   042-000000 000000 048-00000000 00000000 056-000000004 0804C5B1 084-40024A98 00EB63C0 00000000 092-80024A23 00000000 100-00F00000 00000b000
   108-000000 000000 114-90000000 00000000 122-000000000 00000000 130-000000000 00000000 00000000 138-0000F100 00000000 146-00000000 00000000
   154-000000 000000 C/P-99990000
   TG-0  00000013 POSSESS
```

TABLE 24 (cont'd)

```
                                              MN-MASS                          D4C1F2E2D6F1
05  1010 MASS01          008-10010020 80024AD4 016-00000000 024-00000000 032-00000000 00008040 040-0000
    002-080041 000001    048-00060000 00000000 056-00004005 0604C5B9 084-40024ABB 092-80024AB4 00000000 100-00F30000
    042-080841 000000    114-00000400 00000000 122-00000000 S,SO      130-00000000 138-0000F100 00000000 146-00000000 00400004
    108-000000 000000    040000 C/P-00000000 S,SO -3400
    154-000000
    TG-3   40080102 MASS 8000010E BULK
06  1010 NEDOSTATKOV                               MN-OF DEFICIENCIES                            D5C5C4D6E2E3C1E3D2D6E5
    002-04D82 000001     008-10000020 80024B8A 016-00000000 00000000 024-00000000 032-00000000 00000500 040-0000
    042-404082 000000    048-00000000 08080000 056-00008006 0F04C5BF 084-40024B7B 092-80024AE7 00D30B4C 00004000 100-00F00000
    108-000000 000000    114-00000200 00000000 122-00000000 130-00002000          138-0000F100 00000000 146-00000000 00000000
    154-000000 000000    C/P-00000000
    TG-0   40070100F,DEFICIENCY 5000010F INADEQUACY
07  6009 ,                                                                                           6B
    002-000000 000001    008-09000000 04026A59 016-00000000 00000000 024-00000000 032-00000000 00000000 040-0000
    042-000000 000000    048-000000FF 00000000 056-00000007 01D4C5CE 084-40000000 092-00000000 00005620 100-00000000
    108-000000 000000    114-00000000 00000000 122-00000000 130-00000000 138-0000F100 00000000 146-00000000 00000000
    154-000000 000000    C/P-
    TG-0   00000000    ,

SSU SUBJ-08    PRED-0A                                                                             D2D6F3D6D9E8C5
08  7076 KOTORYE        008-76000000 00027455 016-00000000 00000000 024-00000000 032-00000000 80000000 040-0000
    002-0090E2 000000   048-00000000 06080000 056-00000008 0604C5CF 084-40027440 092-00000000 00969B20 100-00000D00 00000000
    042-9080E2 000000   080000 114-00000000 00000000 122-00000000 130-00000000 138-00000100 00000000 146-0D000000 00000000
    108-0A0000 000000   C/P-00000000
    154-000000
    TG-    00000000 WHICH 00000000 WHO 00000000 THAT
09  30 3F PRINQIPIAL6NO        POS30               MN-IN PRINCIPLE                                D7D9C9D5D8C9D7C9C1D3F6D5D6
    002-000000 000000    008-3F000000 08024BA9 016-00000000 00000000 024-00000000 032-00000000 00000800 040-0000
    042-000000 000000    048-00000000 00000000 056-0100000A 0004C505 084-40000000 092-00000000 01442D00 00004000 100-00F00000
    108-000000 000000    114-00000000 00000000 122-00000000 130-00000000 138-00000100 00000000 146-00000000 00000000
    154-000000 000000    C/P-
    TG-0   10000000 IN PRINCIPLE
0A  0441 NOGUT                MOC6R                MN-CAN                                          D4D6C7E4F3
    002-0480E2 000000   008-41000060 10024BBB 016-00000000 00000000 024-00000000 032-00000000 00800021 040-0000
    042-8404E2 000000   048-000B0000 00000000 056-00BBE209 0305271C 084-40000000 092-00000000 00C33000 100-00F00000
    108-000000 000000   080000 114-00000000 00000000 122-00000000 130-00000000 138-00000100 00000000 146-00000000 00000000
    154-000000          C/P-
    TG-0   00000000 CAN
0B  4843 OTSUTSTVOVAT6                             MN-BE ABSENT                                    D6E3E2E4F3E2F3E5D6E5C1F3F6
    002-000010 000000   008-43000000 10024BD3 016-00000000 00000000 024-00000000 032-00000000 0000000A 040-0000
    042-000000 000000   048-00000000 00000000 056-0000000B 0A04C5E1 084-40024BC4 092-00000000 01063EC0 00002000 100-00F00000
    108-000000 000000   080000 114-00000000 00000000 122-00000000 130-00000000 138-00000100 00000000 146-00000000 00000000
    154-000000 000000   C/P-00000000 V,VO   -00001700 NA
    TG-0   01002224 BE ABSENT 01002224 BE ABSENT
0C  5082 V                                         MN-FROM                                         D6E3E2E4F3E2F3E5D6E5C1F3F6
    002-000000 140001   008-B2000000 00028776 016-00000000 00000000 024-00000000 032-00000000 00000082 040-0000
    042-000000 000000   048-00000000 00820000 056-00000000 0401E353 084-40000000 092-00000000 01C36F20 100-00000000 23000000
    108-000000 000000   114-00000000 00000000 122-00000000 130-00000000 138-00000100 00000000 146-00000000 00000000
    154-000000 000000   C/P-
    TG-    00000000 IN 00000000 INTO
0D  2020 MAWINNOM                                  MN-MACHINE                                      D4C1E6C9D5D5D6D4
    002-0400A1 000001   008-20000000 41024BF0 016-0E000000 00000000 024-00000000 032-00000000 00000800 040-0000
    042-040481 000000   048-00000000 00000000 056-0000000D 0704C5EB 084-40000000 092-00000000 00B55380 100-00F00000
    108-000000 000000   114-00000000 00000000 122-00000000 130-00000000 138-00000100 00000000 146-00000000 00000000
    154-000000 000000   C/P-
```

TABLE 24 (cont'd)

```
0E  TG-0   80000l0E MACHINE            PROP           MN-TRANSLATION                                              D7C5D9C5E5D6C4C5
    1010   PEREVODE
    002-040081 000003 008-10900820 80024C7D 016-00000000 00000000 024-00000000 00000000 032-00000000 00008208 040-0000
    042-040481 000000 048-00000800 00000000 056-00D180CE 0B04C5F2 084-40024C70 0116BC40 092-80024BFD 00000000 100-00F30000 00000000
    108-000000 000000 114-00000000 00000000 122-00000000 00000000 130-00000000 00000000 138-00000100 00000000 146-00000000 00000000
    154-000000 000000 C/P-00000000 PRI -0014 NA -22000000
    TG-3   40040104 TRANSLATION 40000104 CONVERSION 40000104 REDUCTION

0F  D090   (                            MN-(
    002-000000 030000 008-90000000 000269A3 016-00000000 00000000 024-00000000 00000000 032-00000000 00000040 040-0000
    042-000000 000000 048-00000000 00000000 056-0000000F 0104C5FD 084-40000000 00000A20 092-00000000 00000000 100-00000000 00000000
    108-000000 000000 114-1D000000 00000000 122-00000000 00000000 130-00000000 00000000 138-00000000 00000000 146-00000000 00000000
    154-000000 000000 C/P-
    TG-   00000000 ( 10  5C64   NAPRIMER                      I1 MN-FOR INSTANCE ,                                                      4D
    002-000000 000000 008-64000000 00024CAB 016-00000000 00000000 024-00000000 00000000 032-00000000 00000000 040-0000
    042-060000 000000 048-00000000 00800000 056-00000010 0F024CB1 084-40000000 00CD5C20 092-00000001 00000000 100-00F00000 00000000
    108-000000 000000 114-00000000 00000000 122-00000000 00000000 130-00000000 00000000 138-00005000 00000000 146-00000000 00000000
    154-000000 000000 C/P-
    TG-0   00000099 FOR INSTANCE ,       I2 MN- 11  6099   ,
    002-000000 000000 008-09000000 04000000 016-00000000 00000011 024-00000000 00000000 032-00000000 00005620 040-0000
    042-000000 000000 048-00000000 00800000 056-00000011 0F000000 084-40000000 00000000 092-00000002 00000000 100-00000000 00000000
    108-000000 000000 114-00000000 00000000 122-00000000 00000000 130-00000000 00000000 138-00005000 00000000 146-00000000 00000000
    154-000000 000000 C/P-

12  101C   GIPERTROFI4                  MN-THE HYPERTROPHY                                                        D5C1D7D9C9D4C5D9
    002-800041 000000 008-10000020 80024CBF 016-00000000 13000000 024-00000000 00000000 032-00000000 00000000 040-0000
    042-800041 000000 048-00150000 00000000 056-00004012 0F04C5FE 084-40000000 005FA140 092-00000001 00000000 100-00F00000 00000000
    108-000000 000000 114-00000600 00000000 122-00000000 00000000 130-00000000 00000000 138-00005000 00000000 146-00000000 00000000
    154-000000 000000 C/P-
    TG-0   40040UE HYPERTROPHY 13  1010   CERT                         MN-OF THE FEATURES                                                        6B
    002-004042 000000 008-10000020 80024D9E 016-00000000 15000000 024-00000000 00000000 032-00000000 00001200 040-0000
    042-404042 000000 048-00000000 00000000 056-00004013 0F04C60D 084-40000000 002E6A40 092-80024000 00000000 100-00F00000 00000000
    108-000000 000000 114-00000600 00000000 122-00000000 00000000 130-00000000 00000000 138-00005000 00000000 146-00000000 00000000
    154-000000 000000 C/P-
    TG-0   40040004 FEATURE 14  2020   INDIVIDUAL6NOGO              MN-OF THE INDIVIDUAL                                                      C7C9D7C5D9F3D9D6C6D9F4
    002-5000A1 000001 008-20000000 41024DAB 016-15000000 0F04C60D 024-00000000 00000000 032-00000000 00001300 040-0000
    042-504081 000000 048-00000000 00000000 056-00000014 11040610 084-40000000 006FE680 092-00000000 00000000 100-00F00000 00000000
    108-000000 000000 114-00000000 00000000 122-00000000 00000000 130-00000000 00000000 138-00005000 00000000 146-00000000 00000000
    154-000000 000000 C/P-
    TG-0   91000004 INDIVIDUAL 15  1010   STIL4                        MN-STYLE                                                                  C3C5D9E3
    002-400081 000000 008-10080000 80024DC4 016-00000000 16000000 024-00000000 00000000 032-00000000 00001400 040-0000
    042-404081 000000 048-00160000 00000000 056-000008015 0504C62D 084-40024DBB 0196F140 092-00000000 00000000 100-00F00000 00000000
    108-000000 000000 114-00000000 00000000 122-00000000 00000000 130-00000000 00000000 138-00005000 00000000 146-00000000 00000000
    154-000000 000000 C/P-
    TG-0   40040004 STYLE 16  1812   CELOVEKA-PEREVODCIK CLVKR    MN-OF A HUMAN TRANSLATOR                                                  C9D5C4C9E5C9C4E4C1D3F6D5D6C7D6
    002-500081 000000 008-12000080 80024DCF 016-12000000 00000000 024-00000000 00000000 032-00000000 00001500 040-0000
    042-504081 000000 048-00000000 00000000 056-00A48016 15D4C632 084-40000000 002DA540 092-00000000 00000000 100-00F00000 00000000
    108-000000 000000 114-00000600 00000000 122-00000000 00000000 130-00000000 00000000 138-00005000 00000000 146-00000000 00000000
    154-000000 000000 C/P-
    TG-0   40000204 HUMAN TRANSLATOR
```

TABLE 24-(cont'd)

```
17  5082 V                                          MN-IN                                        E5
    002-000000 140001 008-B2000000 00028776 016-00001B00 00000000 024-00000000 00000000 032-00000000 00000082 040-0000
    042-000000 000000          000000 00800000 056-00000017 0201E364 084-40000000 01C36F20 092-00000000 00000000 100-00000000 23000000
    108-000000 000000 114-00000000          122-00000000 00000000 130-00000000 00000000 138-00005000 00000000 146-00000000 00000000
    154-000000 000000          000000 C/P-
    TG-    00000000 IN    00000000 INTO
18  8083 PEREVEDENNOM        PRDR                   MN-THE TRANSLATED                           D7C5D9C5E5C5C4C5D5D5D6D4
    002-0400A1 080040 008-83000000 2101D1D8 016-19000000 00000000 024-00000000 00000000 032-00000000 00000800 040-0000
    042-040481 000000          000000 00000000 056-00D00018 0F04C647 084-40000000 0116A500 092-80024DE5 00000000 100-00F30000 00000000
    108-000000 000000 114-00000000          122-00000000 00000000 130-00000000 00000000 138-00005000 00000000 146-00000000 00000000
    154-000000 000000          000000 C/P-
    TG-3  00003100 TRANSLATE
19  1010 TEKSTE                                     MN-TEXT                                     E3C5D2E2E3C5
    002-040081 000001 008-10000000 80024EE6 016-00000000 00000000 024-00001800 00000000 032-00000000 00008208 040-0000
    042-040481 000000          000000 00000000 056-00008019 0404C656 084-40024EDF 01A53340 092-80024E9D 00000000 100-00F00000 00000000
    108-000000 000000 114-00000000          122-00000000 00000000 130-00000000 00000000 138-00005000 00000000 146-00000000 00000000
    154-000000 000000          000000 C/P-00000000
    TG-0  40000004 TEXT
1A  6462 I                   ISBR                   MN-,                                        C9
    002-000000 000001 008-62000000 04024EF0 016-00000000 00000000 024-00000000 00000000 032-00000000 00000100 040-8000
    042-000000 000000          000000 00800000 056-0023001A 010301FD 084-40000000 006D8D00 092-80024E9D 00000000 100-00F00000 00000000
    108-000000 000000 114-00000000          122-00000000 00000000 130-00000000 00000000 138-00005000 00000000 146-00000000 00000000
    154-000000 000000          000000 C/P-
    TG-0  00000000 AND
1B  1013 T.                  ETCR                   MN-                                         E34B
    002-FCFCE3 000001 008-13000020 80024EF9 016-00000000 00000000 024-00000000 00000000 032-00000000 00008208 040-0002
    042-FC04E1 000000          000000 048-001C0000 00000000 056-0083E31B 00000000 084-40000000 D1A29B00 092-00000000 00000000 100-00F00000 00000000
    108-000000 000000 114-00000000          122-00000000 00000000 130-00000000 00000000 138-00005000 00000000 146-00000000 00000000
    154-000000 000000          000000 C/P-
    TG-0  40000100 P.
1C  1C13 P.                                         MN-ETC.                                     D74B
    002-FCFCE3 000001 008-13000020 80024F02 016-00000000 00000000 024-00000000 00000000 032-00000000 00000000 040-0800
    042-FC07CE3 000000          000000 048-10000000 00000000 056-0000E31C 04D3C1D8 084-40000000 04D3C1D8 092-00000000 01099700 100-00F00000 00000000
    108-000000 000000 114-00000000          122-00000000 00000000 130-00000000 00000000 138-00005000 00000000 146-00000000 00000000
    154-000000 000000          000000 C/P-
    TG-0  40000100 P.
1D  D491 )                                          MN-)                                        5D
    002-000000 000000 008-91000000 000269E2 016-00000000 00000000 024-00000000 00000000 032-00000000 00000040 040-0000
    042-000000 000000          000000 048-00000000 00000000 056-0000001D 0104C65A 084-40000000 00004E20 092-00000000 00000000 100-00F00000 00000000
    108-000000 000000 114-000F0000          122-00000000 00000000 130-00000000 00000000 138-00005000 00000000 146-00000000 00000000
    154-000000 000000          000000 C/P-
    TG-0  00000000 )
1E  0005 .                                          MN-.                                        4B
    002-000000 000000 008-05000000 000269E31 016-00000000 00000000 024-00000000 00000000 032-00000000 00000000 040-0000
    042-000000 000000          000000 048-000000FF 00000000 056-0000001E 0104C65B 084-40000000 00000520 092-00000000 00000000 100-00000000 00000000
    108-000000 000000 114-00000000          122-00000000 00000000 130-00000000 00000000 138-00005000 00000000 146-00000000 00000000
    154-000000 000000          000000 C/P-
    TG-   00000000 .
```

TABLE 25

```
WD-1D
WD-1C
WD-1B NSW-1C
WD-1A RNS-1C
WD-19 ILI-1A
WD-18 NSW-19 ILI-1A
WD-17 NSW-19 LAG-18 ILI-1A
WD-16 ILI-1A
WD-15 NSW-16 ILI-1A
WD-14 NSW-15 RNS-16 ILI-1A
WD-13 NSW-15 RNS-16 LAG-14 ILI-1A
WD-12 NSW-13 RNS-15 RLA-14 ILI-1A
WD-11 RNS-13 RLA-14 ILI-1A
WD-10 ILI-1A COM-11
WD-0F
WD-0E
WD-0D NSW-0E
WD-0C NSW-0E LAG-0D
WD-0B
WD-0A INF-0B VER-0B
WD-09 VER-0A
WD-08 VER-0A
WD-07 NSW-08 VER-0A
WD-06 COM-07
WD-05 NSW-06 COM-07
WD-04 NSW-05 RNS-06 COM-07
WD-03 INF-04 RNS-06 VER-04 COM-07
WD-02 VER-03 COM-07
WD-01 NSW-02 VER-03 COM-07
WD-00 NSW-02 LAG-01 VER-03 COM-07
```

APPENDIX INDEX

| NAME OF PROGRAM | APPENDIX |
|---|---|
| DUPDT | A |
| IEDIT | B |
| IPRINT | C |
| IUPDT | D |
| MTST | F |
| LOADTXT | G |
| MDL | H |
| RUMO | I |
| SYSNOUN | J |
| SYSVERB | K |
| INITCALL | L |
| GETSENTN | M |
| STRPASS0 | N |
| STRPASS1 | O |
| STRPASS2 | P |
| STRPASS3 | Q |
| STRPASS4 | R |
| LSLOOKUP | S |
| LEXICAL | T |
| PREP | U |
| REARR | W |
| ESYN | X |
| PPRINT | Y |
| TRPRINT | Z |
| DISPLAY | AA |
| LEVELS | BB |
| LEXICAL ROUTINES | CC |
| CLS3 | DD |
| CLS4 | EE |
| DUPDTLS | FF |
| MACROS | GG |
| SEMANTIC | HH |
| HFC | II |
| DEDIT | JJ |
| DISKLOAD | KK |
| DPRINT | LL |
| TGPRT | MM |
| AVSPASS | NN |

I claim:

1. A method for translation between source and target natural languages using a programmable digital computer system, the steps comprising:

(a) storing in a main memory of the computer system a source text to be translated;

(b) scanning and comparing such stored source words with dictionaries of source language words stored in a memory and for each source text word for which a match is found, storing in a file in main memory each word and in assocation with each such word, coded information derived from such dictionary for use in translation of such word, the coded information including memory offset address linkages to a memory in the computer system where grammar and target language translations for the word are stored;

(c) analyzing the source text words in its file of words, a complete sentence at a time, and converting the same into a sentence in the target language utilizing the coded information and including the steps of (1) utilizing the memory offset address linkages for obtaining the target language translations of words from a memory; and (2) reordering the target language translation into the proper target language sequence;

the step of analyzing additionally comprising the steps of analyzing each source word in multiple passes through each sentence of the source text assigning codes thereto, considering all the codes which previous passes have attached to a word and assigning target language synthesis codes attached to the meaning with which the code functions in the sentence, placing the word into a form corresponding to the target language dependent upon the analysis and consideration of all relevant codes assigned to the words.

2. A method according to claim 1 including the steps of:

storing a dictionary of high frequency source words and associated offset address linkages, the offset address linkages identifying the storage location of grammar and meaning information for the source words;

storing a dictionary of low frequency source words in association with grammar code meanings for each word;

comparing the source language text words with the high frequency dictionary words and upon detecting an equality with a word, storing the word and associated offset address linkages together in a high frequency file; and comparing the source language text words with the low frequency dictionary words and upon detecting an equality, storing the word and the associated grammar code meanings in a low frequency file.

3. A method according to claim 2 including the step of merging the words of the high and low frequency files together.

4. A method according to claim 2 wherein the high frequency dictionary has frequently encountered source words including prepositions and conjunctions.

5. A method according to claim 2 wherein:

second and succeeding idiom words, if any, in a source idiom are stored in at least one dictionary in memory;

the high frequency dictionary includes the first words of source language idioms and associated therewith address linkages to second and subsequent words in the same idiom which are located in the idiom dictionary, the first word and subsequent words, if any, of an idiom having an associated target language meaning stored in association therewith; and during comparison with the high frequency dictionary comprising the steps of:
- (a) detecting those words that are equal and are first words of idioms;
- (b) utilizing the offset address linkages to locate the additional word or words in the same idiom located in the idiom dictionary;
- (c) comparing the located further words in the idiom with the words in the source text which follow the first idiom word for an equality; and
- (d) upon detecting such an equality, storing the first idiom word together with the target language meaning into the high frequency file.

6. A method according to claim 5 comprising the step of storing each one of the second and subsequent idiom words together with an idiom tag into the high frequency file, the idiom tag designating that the word is not the first word of the idiom.

7. A method according to claim 6 comprising the step of storing the first word of an idiom together with a tag into the high frequency file, the tag designating that the word is the first word of an idiom.

8. A method according to claim 7 wherein the step of analyzing comprises the step of selecting the target meaning associated with a first idiom word as the translation of the first and subsequent idiom words.

9. A method according to claim 2 including the step of storing an indication in association with the words in the low frequency file, of whether the words are principal and/or participating words in limited semantic compounds.

10. A method, according to claim 9, wherein a separate file is stored containing limited semantic numbers for each principal word, the limited semantic numbers indicating all participating words, the limited semantic numbers of participating words being attached to the principal words in the same sequence in which the participating words form compound expressions with the principal word.

11. A method, according to claim 10, wherein during the steps of analyzing and searching the file of words to establish whether a principal word is surrounded by supplementary words, if supplemental words are established, comparing the limited semantic numbers of the supplementary words against the limited semantic numbers stored in a limited semantic dictionary for each principal word, if a match is encountered, translating the principal and supplementary words forming a compound into the corresponding meaning.

12. A method, according to claim 11, including a method of translation of compounds including the steps of declining or conjugating the principal word according to synthesis codes of the target language and attaching these codes to each compound.

13. A method according to claim 9, in which during scanning and comparing with dictionaries, information is attached to the principal word concerning all the compound expressions within which the principal word may function as key word in a compound, the attached information containing either sequences of limited semantic numbers or an address of an auxiliary storage device where such information is located, and including the additional steps of bringing into a main working memory from the auxiliary storage device during analyzing the file of words, the limited semantic numbers assigning a subject field code to the source text, if the same compound expression of the source language indicated by the limited semantic numbers have different target meanings, then selection of the correct meaning for the compound depending upon the subject field code in which the translation takes place.

14. A method, according to claim 1, wherein during the steps of scanning, comparing and storing, there is included the step of attaching part of speech codes to source text words and wherein during the step of analyzing there is included the step of attaching parts of speech codes used to branch into a required routine including the step of adding the value of part of speech to a fixed address.

15. A method for translation between source and target natural languages using a programmable digital computer system, the steps comprising:
- (a) storing in a main memory of the computer system a source text to be translated;
- (b) scanning and comparing such stored source words with dictionaries of source language words stored in a memory and for each source text word for which a match is found, storing in a file in main memory each word and in association with each such word, coded information derived from such dictionary for use in translation of such word, the coded information including memory offset address linkages to a memory in the computer system where grammar and target language translations for the word are stored;
- (c) analyzing the source text words in its file of words, a complete sentence at a time, and converting the same into a sentence in the target language utilizing the coded information and including the steps of
    - (1) utilizing the memory offset address linkages for obtaining the target language translations of words from a memory; and
    - (2) reordering the target language translation into the proper target language sequence;
    the step of analyzing additionally comprising the step of keeping track of previously encountered conditions by setting a series of memory switches, each time a new part of speech is encountered a series of previously set switches are selectively turned off while additional switch or switches are selectively turned on, and including the step of executing a routine for interrogating the state of the switches in a predetermined order.

16. A method, according to claim 15, wherein during the step of analyzing there is included the step of assigning each word of the sentence definite coded information as to whether it belongs to a main clause or subordinate clause, and including routines assigned for searching source words within such clauses for predicate(s) and subject(s).

17. A method, according to claim 15, in which during the step of analyzing there is included the step of supplying each source word in a sentence with pointers which express the interdependency relationships among all words in the sentence.

18. A method for translation between source and target natural languages using a programmable digital computer system, the steps comprising:
- (a) storing in a main memory of the computer system a source text to be translated;
- (b) scanning and comparing such stored source words with dictionaries of source language words stored in a memory and for each source text word for which a match is found, storing in a file in main memory each word and in association with each such word, coded information derived from such dictionary for use in translation of such word, the coded information including memory offset address linkages to a memory in the computer system where grammar and target language translations for the word are stored;

(c) analyzing the source text words in its file of words, a complete sentence at a time, and converting the same into a sentence in the target language utilizing the coded information and including the steps of (1) utilizing the memory offset address linkages for obtaining the target language translations of words from a memory; and (2) reordering the target language translation into the proper target language sequence;

the step of analyzing additionally comprising the steps of analyzing a sequence of words in the source language within phrases and clauses in relation to the target language word sequence, the target language word sequence being expressed symbolically by assigned numbers and printing out the translation of the words taking into consideration each source word, and comprising the additional steps of placing the translated words formed after analyzing in a print area in a sequence specified by the relationships between the source and target languages and set up previously by the numbers given after each word and transferring the translation when the print area is filled either directly onto a printer or onto a temporary auxiliary storage device.

19. A method for translation between source and target natural languages using a programmable digital computer system, the steps comprising:

(a) storing a source text to be translated, (b) scanning and comparing the source text words with dictionaries of source language words and for each source text word for which a match is found, storing in a file the word and in association with each such word, coded information derived from such dictionary for use in translation of such word, the coded information including offset address linkages to a memory in the computer system where an idiom dictionary is located;

(c) storing in at least one idiom dictionary in memory second and succeeding idiom words, if any, in a source idiom;

(d) storing at least one further dictionary having the first words of source language idioms and associated therewith address linkages to second and subsequent words in the same idiom which are located in the idiom dictionary, the first word and subsequent words, if any, of an idiom having an assocated target language meaning stored in association therewith;

(e) said step of scanning and comparing comprising the steps of:

(1) comparing the source text words with the words in the at least one further dictionary;

(2) detecting those words that are equal and are first words of idioms;

(3) utilizing the offset address linkages to locate the additional word or words in the same idiom located in the idiom dictionary;

(4) comparing the located further words in the idiom with the words in the source text which follow the first idiom word for an equality; and (5) upon detecting such an equality, storing the first idiom word together with the target language meaning into a file;

(f) analyzing the file of words, sentence by sentence, and responsive to the associated information including the offset address linkages (1) obtaining the target language translation of words from memory; and (2) reordering the target language translation into the proper target language sequence.

20. A method according to claim 19 comprising the step of storing each one of the second and subsequent idiom words together with an idiom tag into such file, the idiom tag designating that the word is not the first word of the idiom.

21. A method according to claim 20 comprising the step of storing the first word of an idiom together with a tag into such file, the tag designating that the word is the first word of an idiom.

22. A method for translation between source and target natural languages a using programmable digital computer system, the steps comprising:

(a) converting a source text to be translated from visual indicia to computer intelligible binary coded signal;

(b) storing the converted source text to be translated;

(c) scanning and comparing the converted source text words with dictionaries of source language words and for each source text word for which a match is found, storing in a file the word and in association with each such word, coded information derived from such dictionary for use in translation of such word;

(d) storing in at least one idiom dictionary in memory second and succeeding idiom words, if any, in a source idiom;

(e) storing at least one further dictionary having the first words of source language idioms and associated therewith address linkages to second and subsequent words in the same idiom which are located in the idiom dictionary, the first word and subsequent words, if any, of an idiom having an associated target language meaning stored in association therewith;

(f) said step of scanning and comparing comprising the steps of:

(1) comparing the converted source text words with the words in the at least one further dictionary;

(2) detecting those words that are equal and are first words of idioms;

(3) utilizing the offset address linkages to locate the additional word or words in the same idiom located in the idiom dictionary;

(4) comparing the located further words in the idiom with the words in the converted source text which follow the first idiom word for an equality; and (5) upon detecting such an equality, storing the first idiom word together with the target language meaning into a file;

(g) analyzing the file of words, sentence by sentence, and responsive to the associated information including the offset address linkages (1) obtaining the target language translation of words from memory; and
(2) reordering the target language translation into the proper target language sequence;
(h) converting the proper target language sequence from computer intelligible binary coded signals back to visual indicia.

23. The method of claim 22 wherein the last step of converting comprises the step of printing.

24. The method of claim 23 wherein the method comprises a series of program steps operating a model 360/65 computer of the International Business Machines Corporation.

* * * * *

UNITED STATES PATENT AND TRADEMARK OFFICE
CERTIFICATE OF CORRECTION

PATENT NO. : 4,706,212

DATED : November 10, 1987

INVENTOR(S) : Peter P. Toma

It is certified that error appears in the above-identified patent and that said Letters Patent is hereby corrected as shown below:

On the Front Page

[22] Filed:   Change "Mar. 31, 1971" to
              -- Aug. 31, 1971 --.

In the Specification

```
Column 1, line 12, after "1.96" delete the period.
Column 1, line 31, change "was" to -- were --.
Column 2, line 2, change "consideration"
             to -- considerations --.
Column 2, line 13, after "sentence" insert a period.
Column 2, line 41, change "dictioary" to -- dictionary --.
Column 3, line 26, change "System" to -- system --.
Column 3, line 55, change "program" to -- programs --.
Column 4, line 8, change "considerable" to
             -- considerably --.
Column 4, lines 55,56, change "systran macro" to
             -- SYSTRAN MACRO --.
Column 6, line 38, change "are" to -- is --.
Column 7, line 12, before "i.e." insert a comma.
Column 7, line 67, change "STRPASS 1" to -- STRPASS1 --.
Column 8, line 2, change "STRPASS 1" to -- STRPASS1 --.
Column 8, line 5, change "STRPASS 2" to -- STRPASS2 --.
Column 8, line 7, change STRPASS 3" to -- STRPASS3 --.
Column 8, line 8, after "18" delete the semicolon.
Column 8, line 9, change "STRPASS 4" to -- STRPASS4 --.
Column 9, line 33, change "attached" to -- attach --.
Column 9, line 34, change "STRPASS-0" to -- STRPASS0 --.
Column 9, line 34, change "STRPASS-4" to -- STRPASS4 --.
Column 9, line 66, change "A" to -- A. --.
Column 10, line 54, after "words" delete "a words".
```

UNITED STATES PATENT AND TRADEMARK OFFICE
CERTIFICATE OF CORRECTION

PATENT NO. : 4,706,212

DATED : November 10, 1987

INVENTOR(S) : Peter P. Toma

It is certified that error appears in the above-identified patent and that said Letters Patent is hereby corrected as shown below:

```
Column 10, line 54, after "word" delete the comma.
Column 10, line 55, after "not)" delete the comma.
Column 10, line 61, change "Opon" to -- Upon --.
Column 10, line 61, after "countering" insert
                    -- such a word --.
Column 11, line 2, change "table" to -- TABLE --.
Column 11, line 15, change "high frequency file" to
                    -- HIGH FREQUENCY FILE --.
Column 11, line 20, change "low frequency file" to
                    -- LOW FREQUENCY FILE --.
Column 11, line 24, after "program" delete the comma.
Column 11, line 29, change "main dictionary lookup" to
                    -- MAIN DICTIONARY LOOKUP --.
Column 11, lines 50,51, change "stem dictionary" to
                    -- STEM DICTIONARY --.
Column 11, line 52, change "main dictionary lookup" to
                    -- MAIN DICTIONARY LOOKUP --.
Column 11, line 57, change "stem dictionaries" to
                    -- STEM DICTIONARIES --.
Column 14, line 13, before "recognized" delete the
                    second "it".
Column 14, line 45, change "to function that word." to
                    -- to the function of that word. --.
Column 14, line 21, change "lustrating" to -- illustrating --.
Column 15, line 13, change "is" to -- in --.
Column 15, line 16, change "activates" to -- activated --.
Column 15, line 30, change "ccalled" to -- called --.
Column 16, line 6, change "lebel" to -- label --.
Column 16, line 11, change "C" to -- C. --.
Column 16, line 14, change "language synthesis" to
                    -- Language Synthesis --.
Column 16, line 33, after "C" insert a comma.
Column 17, line 52, change "foras" to -- forms --.
```

UNITED STATES PATENT AND TRADEMARK OFFICE
CERTIFICATE OF CORRECTION

PATENT NO. : 4,706,212

DATED : November 10, 1987

INVENTOR(S) : Peter P. Toma

It is certified that error appears in the above-identified patent and that said Letters Patent is hereby corrected as shown below:

```
Column 18, line 42, after "stem" insert a period.
Column 19, line 19, change "Trars lation" to
                    -- Translation --.
Column 19, line 20, make the sentence beginning with
                    "(c)" a new paragraph.
Column 19, line 59, change "sane" to -- same --.
Column 20, line 6, change "formating" to -- formatting --.
Column 20, line 12, change "formated" to -- formatted --.
Column 20, line 13, change "Master Dictionary" to
                    -- MASTER DICTIONARY --.
Column 21, line 32, change "Formating" to -- Formatting --.
Column 21, line 36, change "formated" to -- formatted --.
Column 21, line 48, change "samc" to -- same --.
Column 22, line 24, change "L S." to -- L.S. --.
Column 22, lines 54,55, change "mcaning" to -- meaning --.
Column 23, line 58, change "STEAM" to -- STEM --.
Column 24, line 12, change "he" to -- the --.
Column 26, line 24, after "idiom" delete -- is --.
Column 26, line 38, change "'grammer offset38." to
                    -- "grammer offset". --.
Column 26, line 45, change "ie" to -- i.e. --.
Column 29, line 43, change "S" to -- S. --.
Column 31, line 31, change "speed" to -- speech --.
Column 33, line 11, change "symbolically" to
                    -- symbolically --.
Column 34, line 20, after "OD" delete the period.
```

Attached is a copy of the TABLES indicating in red
   the changes to be made which are described below:

```
Column 41, line 14, TABLE 5, draw a horizontal line under the
                    first five vertical lines, joining these
                    five lines.
```

UNITED STATES PATENT AND TRADEMARK OFFICE
CERTIFICATE OF CORRECTION

PATENT NO. : 4,706,212

DATED : November 10, 1987

INVENTOR(S) : Peter P. Toma

It is certified that error appears in the above-identified patent and that said Letters Patent is hereby corrected as shown below:

Column 42, line 5, TABLE 6, change "REFLECTIVE" to -- REFLEXIVE --.

Column 42, line 30, TABLE 8, change "ADD"L SUBJ. NUMBERS" to -- ADD'L SUBJ. ENTRIES --.

Column 42, lines 38,39, TABLE 9, delete the fourth vertical line; put the second arrow between the second and third vertical lines.

Column 43, line 18, TABLE 11, change "(SAME AS DICT. FORM)" to -- (SAME AS DICT. FORMAT) --.

Column 43, line 24, TABLE 12, after "GRAM" insert a period.

Column 51, line 20, insert the title -- TABLE 18 -- after TABLE 17 and before TABLE 19.

In the Claims

Column 72, line 26, change "a using" to -- using a --.

Signed and Sealed this

Tenth Day of April, 1990

Attest:

HARRY F. MANBECK, JR.

Attesting Officer

Commissioner of Patents and Trademarks